(12) United States Patent
Penland, Jr.

(10) Patent No.: US 9,663,903 B2
(45) Date of Patent: *May 30, 2017

(54) INDUSTRIAL MATS HAVING PLASTIC OR ELASTOMERIC SIDE MEMBERS

(71) Applicant: QUALITY MAT COMPANY, Beaumont, TX (US)

(72) Inventor: Joe Penland, Jr., Beaumont, TX (US)

(73) Assignee: Quality Mat Company, Beaumont, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,113

(22) Filed: Jun. 21, 2016

(65) Prior Publication Data
US 2016/0298302 A1 Oct. 13, 2016

Related U.S. Application Data

(63) Continuation of application No. 15/155,685, filed on May 16, 2016, which is a continuation-in-part of (Continued)

(51) Int. Cl.
*E01C 9/08* (2006.01)
*E01C 5/20* (2006.01)
(Continued)

(52) U.S. Cl.
CPC ............. *E01C 9/086* (2013.01); *B32B 7/005* (2013.01); *B32B 15/095* (2013.01);
(Continued)

(58) Field of Classification Search
CPC ... E01C 9/08; E01C 9/086; E01C 5/00; E01C 5/001; E01C 5/18; E01C 5/20; E01C 11/24

See application file for complete search history.

(56) References Cited

U.S. PATENT DOCUMENTS

| 2,836,529 A | 5/1958 | Morris |
| 3,078,612 A | 2/1963 | Wait |

(Continued)

FOREIGN PATENT DOCUMENTS

| CA | 2 233 776 A1 | 12/1999 |
| CA | 2 637 470 A1 | 1/2010 |

(Continued)

OTHER PUBLICATIONS

Invitation to Pay Additional Fees, Appl. No. PCT/US2016/020067, Jun. 20, 2016.

(Continued)

*Primary Examiner* — Abigail A Risic
(74) *Attorney, Agent, or Firm* — Winston & Strawn LLP

(57) ABSTRACT

A mat that includes first and second side beams, a core structure located between and connected to the side beams, with the support structure including longitudinal members and having a height that is less than that of the side beams, a plurality of joining rods that attach the side beams to the support structure, with the joining rods passing through the sides of the side beams and the sides of the longitudinal members of the support structure; one or more elongated members attached to the upper portion of the support structure to form with the beams the top surface of the mat, and one or more elongated members attached to the lower portion of the support structure to form with the beams the bottom surface of the mat. If desired, steel plates can be provided between the beams and longitudinal members to increase the strength and ruggedness of the mat.

33 Claims, 26 Drawing Sheets

Related U.S. Application Data application No. 15/081,340, filed on Mar. 25, 2016, now Pat. No. 9,476,164, which is a continuation-in-part of application No. 15/056,212, filed on Feb. 29, 2016, now Pat. No. 9,447,547, which is a continuation-in-part of application No. 14/839,888, filed on Aug. 28, 2015, now Pat. No. 9,315,949.

(60) Provisional application No. 62/054,186, filed on Sep. 23, 2014, provisional application No. 62/138,143, filed on Mar. 25, 2015, provisional application No. 62/158,196, filed on May 7, 2015, provisional application No. 62/211,662, filed on Aug. 28, 2015, provisional application No. 62/211,664, filed on Aug. 28, 2015.

(51) Int. Cl.

| | | |
|---|---|---|
| *E01C 5/14* | (2006.01) | |
| *E01C 5/22* | (2006.01) | |
| *E01C 5/00* | (2006.01) | |
| *B32B 7/00* | (2006.01) | |
| *B32B 15/095* | (2006.01) | |
| *B32B 21/04* | (2006.01) | |
| *B32B 21/12* | (2006.01) | |
| *B32B 27/08* | (2006.01) | |

(52) U.S. Cl.
CPC ............ *B32B 21/045* (2013.01); *B32B 21/12* (2013.01); *B32B 27/08* (2013.01); *E01C 5/006* (2013.01); *E01C 5/14* (2013.01); *E01C 5/20* (2013.01); *E01C 5/22* (2013.01); *B32B 2307/712* (2013.01); *B32B 2471/04* (2013.01); *E01C 2201/10* (2013.01); *E01C 2201/12* (2013.01)

(56) References Cited

U.S. PATENT DOCUMENTS

| | | |
|---|---|---|
| 4,324,037 A | 4/1982 | Grady, II |
| 4,462,712 A | 7/1984 | Penland, Sr. |
| 4,600,336 A | 7/1986 | Waller, Jr. |
| 4,629,358 A | 12/1986 | Springston et al. |
| 4,889,444 A | 12/1989 | Pouyer |
| 4,932,178 A | 6/1990 | Mozingo |
| 5,020,937 A | 6/1991 | Pouyer |
| 5,032,037 A | 7/1991 | Phillips |
| 5,050,366 A | 9/1991 | Gardner et al. |
| 5,139,845 A | 8/1992 | Beckerman et al. |
| 5,163,776 A | 11/1992 | Pouyer |
| 5,241,163 A | 8/1993 | Vachtsevanos et al. |
| 5,273,373 A | 12/1993 | Pouyer |
| 5,342,260 A | 8/1994 | Markland |
| 5,402,609 A | 4/1995 | Kelley, Jr. |
| 5,535,694 A | 7/1996 | Czipri |
| 5,653,551 A | 8/1997 | Seaux |
| 5,822,944 A | 10/1998 | Penland, Sr. |
| 5,888,612 A | 3/1999 | Needham et al. |
| 6,214,428 B1 | 4/2001 | Henderson |
| 6,231,994 B1 | 5/2001 | Totten |
| 6,380,309 B1 | 4/2002 | Parker et al. |
| 6,474,905 B1 | 11/2002 | Smith, Jr. |
| 6,497,956 B1 | 12/2002 | Phillips et al. |
| 6,511,257 B1 | 1/2003 | Seaux et al. |
| 6,649,110 B1 | 11/2003 | Seaux et al. |
| 6,662,508 B1 | 12/2003 | Else |
| 6,695,527 B2 | 2/2004 | Seaux et al. |
| 6,722,831 B2 | 4/2004 | Rogers |
| 6,821,623 B2 | 11/2004 | Kvesic |
| 7,137,226 B2 | 11/2006 | Fiutak et al. |
| 7,303,800 B2 | 12/2007 | Rogers |
| 7,404,690 B2 | 7/2008 | Lukasik et al. |
| 7,413,374 B2 | 8/2008 | Rogers et al. |
| 7,427,172 B2 | 9/2008 | Lukasik |
| D609,956 S | 2/2010 | Lukasik |
| 7,818,929 B2 | 10/2010 | Fiutak et al. |
| 7,934,885 B2 | 5/2011 | Fournier |
| 8,061,929 B2 | 11/2011 | Dagesse |
| 8,070,004 B2 | 12/2011 | Williams et al. |
| 8,088,477 B2 | 1/2012 | Curtis et al. |
| 8,382,393 B1 | 2/2013 | Phillips |
| 8,613,373 B2 | 12/2013 | Holtby et al. |
| 8,784,001 B1 | 7/2014 | Phillips |
| 8,906,480 B2 | 12/2014 | Fiutak et al. |
| 8,936,073 B1 | 1/2015 | Phillips |
| 9,133,598 B2 | 9/2015 | Hsu |
| 2002/0110418 A1 | 8/2002 | Renick |
| 2004/0037644 A1 | 2/2004 | Renick |
| 2004/0071914 A1 | 4/2004 | Fiutak et al. |
| 2004/0253055 A1 | 12/2004 | Polivka, Jr. |
| 2005/0022363 A1 | 2/2005 | Harrison |
| 2006/0034654 A1 | 2/2006 | Sanders |
| 2006/0265976 A1 | 11/2006 | Fiutak |
| 2007/0056228 A1 | 3/2007 | Penland, Sr. et al. |
| 2007/0237581 A1 | 10/2007 | Lukasik et al. |
| 2008/0028703 A1 | 2/2008 | Brandstrom |
| 2008/0085154 A1 | 4/2008 | Lukasik |
| 2008/0152861 A1 | 6/2008 | Barker |
| 2008/0292397 A1 | 11/2008 | Farney et al. |
| 2009/0087261 A1 | 4/2009 | Fournier |
| 2009/0301004 A1 | 12/2009 | Dagesse |
| 2011/0233363 A1 | 9/2011 | Wold |
| 2011/0280657 A1 | 11/2011 | Martinez |
| 2012/0063844 A1 | 3/2012 | Wold |
| 2013/0284872 A1 | 10/2013 | Tubbs |
| 2013/0306804 A1 | 11/2013 | Holtby et al. |
| 2013/0318896 A1 | 12/2013 | Rogers |
| 2014/0154462 A1 | 6/2014 | Fiutak et al. |
| 2014/0183319 A1 | 7/2014 | Tubbs |
| 2014/0186573 A1 | 7/2014 | Tubbs |
| 2014/0193196 A1 | 7/2014 | Fournier |
| 2014/0199119 A1 | 7/2014 | Stasiewich |
| 2014/0205377 A1 | 7/2014 | Hill |
| 2014/0341649 A1 | 11/2014 | Bryan et al. |

FOREIGN PATENT DOCUMENTS

| | | |
|---|---|---|
| EP | 1 600 558 A1 | 11/2005 |
| EP | 2 705 950 A1 | 3/2014 |
| WO | 95/25076 | 9/1995 |
| WO | 2006/002507 A1 | 1/2006 |
| WO | 2006/048654 A1 | 5/2006 |
| WO | 2007/112537 A1 | 10/2007 |

OTHER PUBLICATIONS

Forest Products Laboratory. Wood Handbook—Wood as an Engineering Material—4. Mechanical Properties of Wood. U.S. Department of Agriculture. Online version available at: app.knovel.com/hotlink/pdf/id:kt0052LP04/wood-handbook-wood-an/mechanical-properties (1999).
"Inflammable". Wiktionary. Archived Sep. 6, 2014.
Richard West Co., Inc., Steel Reinforced Crane Mat, downloaded from the Internet on May 11, 2016 see http://www.richardwestcompany.com/products.html).
U.S. Appl. No. 14/839,888, Non-Final Rejection, Nov. 6, 2015.
U.S. Appl. No. 14/839,888, Notice of Allowance, Jan. 14, 2016.
U.S. Appl. No. 14/839,888, Notice of Allowability, Feb. 19, 2016.
U.S. Appl. No. 14/839,900, Non-Final Rejection, Oct. 29, 2015.
U.S. Appl. No. 14/839,900, Notice of Allowance, Jan. 20, 2016.
U.S. Appl. No. 14/855,336, Non-Final Rejection, Feb. 9, 2016.
U.S. Appl. No. 15/056,212, Non-Final Rejection, Apr. 22, 2016.
U.S. Appl. No. 15/056,212, Notice of Allowance, Jun. 9, 2016.
U.S. Appl. No. 15/081,340, Non-Final Rejection, May 6, 2016.
U.S. Appl. No. 15/081,340, Notice of Allowance, Jun. 15, 2016.
International Search Report and Written Opinion, Appl. No. PCT/US2016/020081, Jun. 2, 2016.
"Crane Mat", retrieved from http://www.qmat.com/products/crane-mats/ (2015).

(56) References Cited

OTHER PUBLICATIONS

U.S. Appl. No. 15/244,614, Non-Final Rejection, Dec. 15, 2016.
International Search Report and Written Opinion, Appl. No. PCT/US20161020067, Aug. 8, 2016.

INDUSTRIAL MATS HAVING PLASTIC OR ELASTOMERIC SIDE MEMBERS

CROSS-REFERENCE TO RELATED APPLICATIONS

This application is a continuation-in-part of U.S. application Ser. No. 15/155,685 filed May 16, 2016, which is a continuation-in part of application Ser. No. 15/081,340 filed Mar. 25, 2016, which is a continuation-in-part of U.S. application Ser. No. 15/056,212 filed Feb. 29, 2016, which in turn is a continuation-in-part of U.S. application Ser. No. 14/839,888 filed Aug. 28, 2015, now U.S. Pat. No. 9,315,949, which claims the benefit of U.S. provisional applications No. 62/054,186 filed Sep. 23, 2014, 62/138,143 filed Mar. 25, 2015 and 62/158,196 filed May 7, 2015. This application also claims the benefit of U.S. provisional applications No. 62/211,662 filed Aug. 28, 2015 and 62/211,664 filed Aug. 28, 2015. The entire content of each of the foregoing applications is expressly incorporated herein by reference thereto.

BACKGROUND

The present invention relates to a reusable system for the construction of roadways and equipment support surfaces in areas having poor ground integrity characteristics. More particularly, the present invention relates to a system of durable mats which can be interconnected to form roadways and/or equipment support surfaces. More particularly still, the present invention relates to a reusable system of mats which can be quickly and easily positioned in a single layer to form roadways and/or equipment support surfaces, and which can thereafter be easily removed and stored until needed again.

Mats for this use are generally known in the art and are available from Quality Mat Company, Beaumont, Tex. In remote and unstable environments, a stable roadway (or any roadway) often does not exist, such that temporary roadways are assembled by aligning planks, boards or mats along the desired path. The mats provide temporary structures for various construction projects as well as for use in environmental or disaster cleanup projects. These mats enable trucks and other equipment to drive over, store equipment on, or create campsites on otherwise unstable, soft or moist land or damaged areas by providing a relatively level and stable surface.

While conventional wood mats provide useful service at a reasonable cost, the wood core, which is typically made of white oak, can deteriorate over time due to moisture causing gradual rotting and degradation of the wood material. This causes the mat to be discarded, because unlike some of the other materials that are used on the upper and lower layers of the mat, the core cannot be replaced without essentially making an entirely new mat.

Also, conventional crane mats that are typically 4 feet wide and utilize 8×8 inch to 12×12 inch beams that are up to 40 feet in length, utilize beams that are made of oak and preferably white oak as that material provides acceptable performance of the mats for a significant service life at a reasonable cost. Such mats are also available from Quality Mat Company, Beaumont, Tex. These mats, which are often called timber mats or crane mats, typically utilize virgin wood utilize virgin wood that is shaped and cut to length to meet design demands. Due to weather conditions and other environmental factors, however, the availability of trees that can be harvested to make such large size and length beams is reduced, thus making it difficult to obtain suitable quantities to make large numbers of mats.

Accordingly, alternatives are needed for crane mat constructions to conserve the amount of wood beams that need to be included. Also, the materials that may be considered as alternatives need to possess the necessary physical properties to be able to withstand harsh outdoor conditions as well as to support heavy equipment. And of course cost is a factor in determining the selection of alternate materials, as it is not cost-effective to provide a mat that is multiple times more expensive than one that can be made of wood.

Thus, there is a need for improvement in these types of mat constructions both to provide longer service lives as well as to conserve natural resources, and these needs are now satisfied by the industrial mats of the present invention.

SUMMARY OF THE INVENTION

The invention now provides an industrial mat comprising a core structure having a height, width and length, the core structure comprising elongated members configured, arranged and positioned to form a mat having upper and lower surfaces, front and rear ends and outer sides; first and second beams or bumper members having a height, width and length with top and bottom surfaces and inner and outer sides, with the inner side of the first beam or bumper member positioned adjacent an outer side of the mat and the inner side of the second beam or bumper member positioned adjacent the other outer side of the mat, and with the beams or bumper members having sufficient properties to absorb impact and shock to protect the core structure from damage due to impact during transport or installation of the mat; and a plurality of fasteners that attach the beams or bumper members to the core structure. Preferably, first and second beams or bumper members are made of a thermoplastic, thermosetting plastic, or elastomeric material in the form of a solid structure, a hollow structure that optionally includes a filler material therein, or layers of sheets or elongated members that are joined together.

The first and second beams or bumper members are located in positions that align at least the top surfaces of the beams or bumper members with the top surfaces of the core structure to extend the upper surface of the mat. Alternatively, the first and second beams or bumper members each may have a height that is essentially the same as the height of the core structure, so that both the top and bottom surfaces of the beams or bumper members align respectively with both the top and bottom surfaces of the core structure to extend the upper and lower surfaces of the mat. Alternatively, one beam or bumper member may be sized to provide about one half the height of the core structure and be attached to an upper portion of one outer side of the core structure, or the other beam or bumper member may be sized to provide one half the height of the core structure and be attached to the opposite outer side of the core structure in a lower position, or both bumper members are sized as noted in order to facilitate and form an interlocked structure of conjoined adjacent mats.

The beams or bumper members may be made in unitary or plural sections to obtain its overall length and attached to the core structure by the plurality of fasteners. Also, additional beams or bumper members may be attached to the front and rear portions of the mat by additional fasteners for further protection of the mat. The beams or bumpers preferably have a generally rectangular or square cross-sectional configuration. Preferably, the beams or bumper members are removably attached to the core structure so that they can be replaced when damaged. For this, the beams or bumper members are attached to the core structure by fasteners comprising joining rods that pass through the beams and the core structure. The beams or bumper members extend away from the core structure to protect it from impact when being moved, installed or recovered after use.

The core structure has a thickness of between 6 and 24 inches a length of between about 4 and 60 feet, and each beam or bumper member has width by height dimensions of between about 1×6 inches and about 24×24 inches and a length of between about 4 and 60 feet. Preferably, the core structure has a width of about 4 to 8 feet, a height of between 8 and 16 inches and a length of between about 6 and 30 feet and wherein the beams have width and height dimensions of between about 8×8 inches and about 16×16 inches and lengths of between about 6 and 30 feet.

The core structure generally comprises elongated members of wood, engineered wood, thermoplastics, thermosetting plastics or elastomers that are joined together by the plurality of fasteners or by additional fasteners, adhesives, welding, or any combination thereof.

The core structure may also comprise two or three longitudinal members which are made of oak or other hardwoods, pine or other softwoods, or mixtures thereof. For these embodiments, wood is preferred and to reinforce the core structure, a metal plate may be provided between each pair of adjacent beams or bumper members and longitudinal members, wherein each metal plate has a height that is essentially the same as that of the beams, bumper members or longitudinal members on each peripheral side of the metal plates. The plates may be steel plates and the plates, beams or bumper members and longitudinal members each have essentially the same height and length.

Another core construction comprises at least two layers or plies of elongated members with the uppermost layer or ply having a top surface that forms the top surface of the mat and the lowermost layer or ply having a bottom surface that forms the bottom surface of the mat. These elongated members are typically joined together by a plurality of fasteners. Preferably, the core structure comprises two or three layers or plies of elongated members of wood or engineered wood which are joined together by fasteners.

The invention also relates to industrial mats having substantially flat top and bottom surfaces and comprising first and second side beams having a height, width and length with a top surface, sides, and a bottom surface; a core structure located between and connected to a side of first and second side beams, with the support structure having a height that is less than that of the side beams, a width and a length, with the support structure comprising first and second longitudinal members; a plurality of joining rods that attach the side beams to the support structure, with the joining rods passing through the sides of the side beams and the sides of the longitudinal members of the support structure; one or more first elongated members attached to the upper portion of the support structure, wherein the top surface of the mat is formed by the top surfaces of the beams and the first elongated member(s); and one or more second elongated members attached to the lower portion of the support structure, wherein the bottom surface of the mat is formed by the bottom surfaces of the beams and the second elongated member(s).

The first and second longitudinal members are typically rectangular beams or members that provide flat side faces for contact with the side beams; the side beams are made of solid cut wood or engineered lumber; the first and second elongated members have the same thickness and are boards or sheets made of solid cut wood, engineered lumber, plastic or recycled materials; and the elongated members are bolted to the support structure. Preferably, the side beams are timbers of engineered lumber or oak or other hardwoods, or are solid or filled or unfilled hollow rectangular plastic members that optionally may be reinforced, the longitudinal members are timbers of pine or other softwoods, and the first and second elongated members are boards of uniform width which are spaced to provide water drainage between adjacent boards.

These mats generally include side beams having width and height dimensions of between about 1×6 inches and about 24×24 inches and a length of between about 4 and 60 feet and longitudinal members having width and height dimensions of between about 1×5 inches and about 24×22 inches, wherein the height and length of the longitudinal members is 0.5 to 2 inches less than that of the side beams on each peripheral side of the longitudinal members. Preferably, the beams have width and height dimensions of between about 8×8 inches and about 16×16 inches and lengths of between about 6 and 30 feet and the longitudinal members have width and height dimensions of between about 8×6 inches and about 16×14 inches, wherein the height and length of the longitudinal members is about 1 to 2 inches less than that of the side beams on each peripheral side of the longitudinal members.

The invention includes crane mats that include between 2 and 4 longitudinal members of pine or softwood timbers. To strengthen the mat while reducing weight, a steel plate can be provided between each pair of adjacent beams or longitudinal members. These steel plates have a thickness of between about ⅛ inch and about 1 inch, and a height and length that are essentially the same as to 2 inches less than that of the longitudinal members on each peripheral side of the steel plates. Preferably, the height and length of the steel plates are about ½ inch as to 2 inches less than that of the longitudinal members on each peripheral side of the steel plates.

The side beams preferably have the same dimensions and are attached to the longitudinal members to locate their upper surfaces about 1 to about 3 inches above the longitudinal members and to locate their lower surfaces about 1 to about 3 inches below the longitudinal members, wherein the first and second plurality of elongated members each have a thickness of about 1 to about 3 inches to provide the substantially flat upper and lower surfaces of the mat.

Some of the first and second plurality of elongated members and adjacent longitudinal members have one or more openings to provide access to one or more of the joining rods to facilitate lifting or manipulation of the mat. And these mats can include lighting elements embedded in the elongated members to provide light to assist in the use of the mat during the night or on days that are dark due to poor weather conditions.

To provide mats that can be interlocked together when installed, the first side beam may be sized to provide about one half the height of the mat, with the first side beam attached to an upper portion of the support structure, or the second side beam is sized to provide one half the height of the mat and is attached to the second side of the support structure in a lower position, or both the first and second beams are sized as recited in order to provide interlocking structures. Thus, the first side beam of one mat sits upon the second side beam of an adjacent mat to form an interlocked structure of conjoined mats. Preferably, the first side beam may be sized to provide about one half the height of the mat, with the first side beam extending above the support structure by about 1 to about 3 inches with the elongated member or members adjacent the first side beam having a thickness of about 1 to about 3 inches. Additionally, the second side beam may be sized to extend below the support structure by about 1 to about 3 inches with the elongated member or members adjacent the first side beam having a thickness of about 1 to about 3 inches.

Another embodiment of the invention relates to an inventory of industrial mats having different core or internal constructions of wood, engineered wood, thermoplastics, elastomers, thermosetting plastics, metal, or of coated or encapsulated components. Each mat that has a different core or internal construction includes identification means that indicates the core or internal construction of that mat. The identification means comprises an external color code, a radio frequency identification (RFID) tag, or an alphanumeric indicator applied to an outer surface of the mat or that is provided upon a plate that is applied to an outer surface of the mat.

When the identification means comprises an external color code, that color code is placed in the same position on each mat for easy identification. Typically, the external color code is placed along a longitudinal side of each mat so that the color coding is visible when the mats are stacked upon each other.

Alternatively, the identification means may be a RFID tag that is attached to the mat and that can be scanned to identify the core or internal construction of the mat.

Furthermore, the identification means can be an external alphanumeric indicator that is applied to an outer surface of the mat or that is provided upon a plate that is applied to an outer surface of the mat. These are preferably placed on the mat is an area where they are visible and where they would not be subject to contact by equipment that is placed on or that travels over the mat. Again, the side of the mat is a good location for such identification means.

And in addition to the mat identification means, each mat can be provided with a surface color that indicates a potential use or non-use of the mat. These colors can include red to indicate that portions of the mat need to be kept free of equipment, yellow for indicating that caution is needed or green to indicate portions of the mat that are designed to accommodate travel or movement by trucks or heavy equipment upon and over the mat.

BRIEF DESCRIPTION OF THE DRAWINGS

The appended drawing figures provide additional details of the invention, wherein.

DETAILED DESCRIPTION OF THE INVENTION

Figure 1:
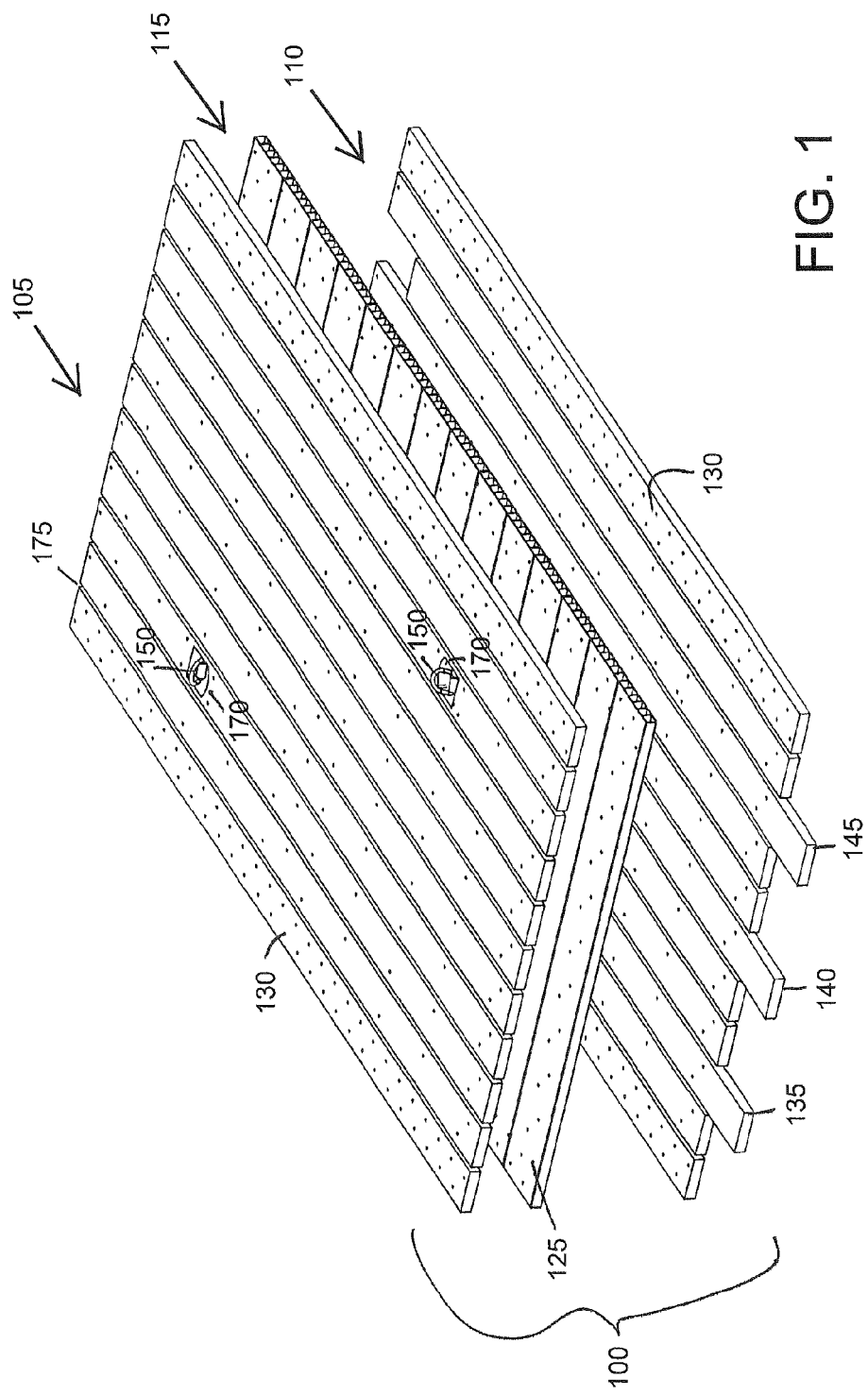
FIG. 1 is an exploded view of one embodiment of the mat of the invention which includes a core structure of fiberglass reinforced polyester beams and outer wood board layers.

The invention generally provides a number of different mats each having an environmentally resistant core and that includes replaceable elongated members, such as wood boards, on the top and/or bottom surfaces of the mat. These members can be replaced as they wear or are damaged while the environmentally resistant core can be reused and provided with new elongated members. The core is typically made of steel components, thermoplastic members, thermoplastic units, and thermoset gratings. In some cases, wood can be used for core components.

The new and improved industrial mats of the present invention now provide additional advantages over conventional mats. For one, the use of a support structure that is not made of wood conserves timber resources which would otherwise be harvested to provide the long length beans for construction of the mats. Now, only the side beams of wood are used with the support structure providing the remaining width of the mat. And in the preferred arrangements, the support structure is not of the same height as the side beams to allow other, thinner elongated members to be applied to the top and bottom of the support structure so that the upper and lower surfaces of the mat are substantially uniform. These members may be wood but shorter lengths and thinner cross sections are used.

The wood members of the mat that are to experience abuse or wear are preferably made of hardwoods such as white oak, red oak, beech, hickory, pecan, ash or combinations thereof. Also, engineered wood materials as described herein can instead be used. And as disclosed further herein, certain longitudinal members of the core construction can be made of softwoods such as pine because it is a lower cost, readily available wood material. As softwoods are not as abrasion and abuse resistant as hardwoods, the invention contemplates using the softwoods as internal components and protecting them with upper, lower and side materials of hardwoods, engineered lumber or plastic materials.

For other embodiments, the use of fiberglass reinforced thermosetting resins, generally in the form of a pultrusion, for the side beams and elongated members can be used to essentially eliminate any wood in the mats. This further conserves timber resources.

The term "fiberglass reinforced thermosetting plastic material" or "fiberglass reinforced plastic" means a thermosetting material that is reinforced generally with glass fibers or other types of fiber strengthening materials, such as carbon, aramid, basalt or other fiber materials. The thermosetting material is usually a polyester, epoxy, vinylester or even a phenol formaldehyde resin. Skilled artisans are well aware of these and equivalent materials that are suitable to meet this definition.

The use of a non-wood support structure enables that component to be reused in the event that the side beams or elongated members become damaged or experience deterioration due to use and exposure to harsh environmental conditions. By being made of more robust and environmentally resistant materials, it is possible to disconnect the joining rods to take apart the mats and remove the damaged side beams or elongated members, and then add new components to the structure to form a new mat. In effect, this reduces the demand for wood beams or elongated members by 50 to as much as 100%.

Certain terms that are used herein are defined hereinbelow to assist in the understanding of the invention.

The term "industrial mat" is intended to cover relatively large mats having widths of at least about 4 feet with lengths running from about 4 feet to 40 feet and incorporating elongated members, beams, or other components having square or rectangular cross sections of sizes of at least about 1×6 inches to 24×24 inches with lengths from about 4 feet to as much as 40 feet or more. Preferred dimensions are described throughout the specification. As noted, previous and current mats of this type that are commercially available are primarily constructed of monolithic wood.

The term "non-wood" to describe the support structure is used for its ordinary meaning. The components of the structure are generally not made of wood but instead are made of meat, a thermosetting plastic or other materials that are resistant to degradation due to environmental factors such as moisture from water, snow or ice, organisms that can cause wood rot, or similar external factors that affect wood.

The term "substantially" is used for its ordinary meaning to indicate that the dimensions are not precise or exact. A skilled artisan can readily determine what tolerances are acceptable to provide a surface that is considered to be flat based upon the size of the side beams and the type of service that the mat is expected to provide. There is no requirement that the beams and elongated members be flush with each other along the top and bottom surfaces of the mat. Typically, the term "substantially" will mean that the top surfaces of the beams and elongated members can vary by as much as a few inches although in the more preferred embodiments the variance is less than 1 inch.

Additionally, all dimensions recited herein are approximate and can vary by as much as ±10% to in some case ±25%. In some situations, the term "about" is used to indicate this tolerance. And when the term "about" is used before reciting a range, it is understood that the term is applicable to each recited value in the range. Often, the craftsmanship and engineering procedures that are followed in construction of these mats minimize these tolerances as much as possible or industrially practical.

The invention contemplates the use of various components in the mat structure. Typically, elongated members of wood boards have been used and the term "elongated members" as used herein means structures that assimilate wood boards or are otherwise configured with rectangular cross sections and lengths which are preferably the full length of the mat. Shorter lengths of these structures can be used, however, as they are typically bolted to the other components to form the mat. These elongated members are typically solid but they can be hollow tubular components which are optionally filled with other materials such as foams or particles. The sizes for such elongated members are about 1 to 4 inches thick, about 6 to 12 inches wide and typically the length of the mat. Shorter boards can be used if desired and often are used when the mat is longer than 20 feet but full length boards for the entire length of the mat is preferred when possible. Lengths of 12 to 16 feet are common. For solid members, the preferred dimensions are 2 inches thick, 8 inches wide and a length that is the same as that of the mat (e.g., often 12, 14 or 16 feet or longer if desired). In general, these elongated members are made of wood, engineered wood, thermoplastics, thermosetting plastics or elastomers. When made of wood, oak or other hardwoods, pine or other softwoods, or mixtures thereof can be used.

Other embodiments utilize components in the form of a structured unit. This can be a sheet or plate, or a layer which is solid or that includes cells or other openings to reduce weight or provide openings to facilitate joining of the components by bolting or permanent or other non-permanent means. Typically, the size of such units ranges from about 1 to 4 inches thick, about 4 to 12 feet wide and typically the length of the mat. It is also possible to use multiple units in large mats, such as units that represent a portion (e.g., ⅓ or ½) of the size of the mat. The preferred dimensions are about 2 to 4 inches thick, 8 feet wide and a length that is the same as that of the mat (e.g., often 12, 14 or 16 feet or longer if desired).

The mat components can be joined together using any type of fastener. "Fastener" is defined herein as any hardware device that mechanically joins or affixes two or more components together, including but not limited to bolts, screws, nails, rivets, rods, anchors or combinations thereof. These devices are generally elongated and typically include a head on one end and a structure on the other end that can be secured in place in or outside of the component to be joined. For example, the opposite end can include a pointed end and/or screw threads, or a nut, cap, clip, pin or other member that forms a larger portion that resists or prevents withdrawal of the fastener from the joined components. Typically, these devices have a circular or conical cross-section, but they can instead be oval, polygonal or any combination of circular and straight perimeters. A "removable fastener" is one that is attached in a way that it can be removed and reused, with typical examples including bolts and nuts, rod members with removable clips, end members or pins, or the like. Of course, these removable fasteners would have a body with a cylindrical threaded end to receive washers and nuts.

Typically bolting is used as it allowed the components of the outer layers of the mat to be removed if damaged or deteriorated and replaced with other components while the environmentally resistant core of the mat can be reused. For certain mats, some or all of the components that are used can be permanently joined together by welding or an adhesive.

A wide range of thermoplastic or polymeric materials can be used for the core structure of the mats of this invention. These materials would be molded or cast to the desired size and thickness of the mat. Useful materials include:

Acrylonitrile butadiene styrene (ABS)
Acrylic (PMA)
Celluloid
Cellulose acetate
Cyclo olefin Copolymer (COC)
Ethylene-Vinyl Acetate (EVA)
Ethylene vinyl alcohol (EVOH)
Fluoroplastics (PTFE, alongside with FEP, PFA, CTFE, ECTFE, ETFE)
Ionomers
Kydex, a trademarked acrylic/PVC alloy
Liquid Crystal Polymer (LCP)
Polyacetal (POM or Acetal)
Polyacrylates (Acrylic)
Polyacrylonitrile (PAN or Acrylonitrile)
Polyamide (PA or Nylon)
Polyamide-imide (PAI)
Polyaryletherketone (PAEK or Ketone)
Polybutadiene (PBD)
Polybutylene (PB)
Polybutylene terephthalate (PBT)
Polycaprolactone (PCI)
Polychlorotrifluoroethylene (PCTFE)
Polyethylene terephthalate (PET)
Polycyclohexylene dimethylene terephthalate (PC (PC)T)
Polycarbonate
Polyhydroxyalkanoates (PHAs)
Polyketone (PK)
Polyethylene (PE)
Polyetheretherketone (PEEK)
Polyetherketoneketone (PEKK)
Polyetherimide (PEI)
Polyethersulfone (PES)—see Polysulfone
Polyethylenechlorinates (PEC)
Polyimide (PI)
Polylactic acid (PLA)
Polymethylpentene (PMP)
Polyphenylene oxide (PPO)
Polyphenylene sulfide (PPS)
Polyphthalamide (PPA)
Polypropylene (PP)
Polystyrene (PS)
Polysulfone (PSU)
Polytrimethylene terephthalate (PTT)
Polyurethane (PU)
Polysulfone (PSU)
Polytrimethylene terephthalate (PTT)
Polyvinyl chloride (PVC)
Polyvinylidene chloride (PVDC)
Styrene-acrylonitrile (SAN)

It is also possible to utilize fiberboard as the elongated members or sheets that form the core structure. The fiberboard material is made of recycled plastic or polymeric materials from used carpets, plastic packaging and the like. They can be provided in the desired sizes for use as the core structure of the mats of this invention. In addition to being environmentally resistant due to their plastic content, these fiber boards are environmentally friendly by allowing recycling of used materials that contain plastic or polymeric materials.

The core structure may also be made of an elastomeric material. The elastomers are usually thermosets (requiring vulcanization) but may also be thermoplastic. Typical elastomers include:

Unsaturated rubbers that can be cured by sulfur vulcanization—these are preferred from a strength and hardness standpoint:
Natural polyisoprene: cis-1,4-polyisoprene natural rubber and trans-1,4 polyisoprene gutta-percha;
Synthetic polyisoprene;
Polybutadiene;
Chloropene rubber, i.e., polychloroprene;
Butyl rubber (i.e., copolymer of isobutylene and isoprene) including halogenated butyl rubbers (chloro butyl rubber; bromo butyl rubber);
Styrene-butadiene Rubber (copolymer of styrene and butadiene); and
Nitrile rubber (copolymer of butadiene and acrylonitrile).
Saturated (i.e., non-vulcanizable) rubbers include:
Ethylene propylene rubber (EPM);
Ethylene propylene diene rubber (EPDM);
Epichlorohydrin rubber;
Polyacrylic rubber;
Silicone rubber;
Fluorosilicone Rubber;
Fluoroelastomers;
Perfluoroelastomers;
Polyether block amides; and
Chlorosulfonated polyethylene.

The elastomeric, thermoplastic or thermosetting materials disclosed herein can also be provided with conventional fillers to increase weight and hardness. They also can be reinforced with particulates, fibers such as glass, fabric or metal screening or scrim to reduce elongation and provide greater rigidity. Also, when the entire mat is made of elastomeric, thermoplastic or thermosetting materials, the entire mat can be made as an integral component.

The polymeric or elastomeric core structure can be made as a flat sheet provided that it has the necessary weight and rigidity. These variables can be controlled by the selection of the particular polymer or by providing a particular configuration for the core. For example, the core structure can be made with a honeycomb or open cell structure.

The term "honeycomb structure" refers to a structure that has openings or open cells therein which can be used to reduce weight or can be filled with other materials. The shape of the cells can be hexagonal, square, rectangular, or of another polygonal shape, or they can even be round. The cells can be adjacent to each other or spaced as desired and can extend in either the horizontal or vertical or direction.

With this construction, the weight of the mat can be increased and the resistance to liquid absorption improved by filling the cells of the honeycomb structure of the core structure with one or more of various materials, including sand, dirt, gravel, particles of plastics, ceramics, glass or other materials, various foam materials, or even of recycled materials such as particles of ground vehicle tires or other recyclable materials. The latter are preferred to fill the core structure to provide an environmentally friendly or "green" mat.

The plastic core structure can also be provided in two half sections in the vertical direction, i.e., an upper section and a lower section. The upper section can be designed with protrusions or raised and lower areas on its lower surface with the lower section designed with complementary recesses or lower and raised areas on the surface that faces the upper section so that the upper and lower section can be joined together by engagement of the protrusions and recesses or raised and lower areas.

Alternatively, the core structure can be made of a metal frame or ladder structure. Typically, steel, stainless steel or aluminum are used and the frame or structure can be bolted, riveted or welded together. The metal frame or structure if made of steel can be further protected by galvanizing, painting or otherwise depositing powder or liquid coating material thereon to prevent moisture from contacting the steel. For example, the entire core structure when made of steel can be coated with a paint or even with a thermoplastic or thermosetting resin.

The metal frame or ladder structure can be used as is or can be configured with netting, mesh or other material that allows any frame openings to be provided with a filler to modify the weight of the mat. If additional weight is desired, heavier filler material can be used. To fill in the interior sections of the frame without adding too much weight to the mat, a plastic or rubber filler of low density particles or foam can be used.

Another crane mat construction includes a row of beams or timbers that are joined together, wherein the outer timbers are made of various plastic or elastomer constructions. In particular, the outer timbers can be made of a thermoplastic, thermosetting plastic, or elastomer in the form of a solid structure, a hollow structure that optionally includes a filler material therein, layers of sheets or elongated members that are joined together by fasteners, an adhesive or welding, or other combinations of the foregoing. The inner timbers can be of the same materials or they are preferably made of engineered or virgin wood, typically including softwoods such as pine, hardwood such as oak or mixed softwoods and/or hardwoods. The upper and/or lower surfaces of the mat can include elongated members of any type material to provide additional protection to the mat in particular when less abrasion and abuse resistant timbers such as pine or certain plastics or elastomers are used. These elongated members can be positions over only the inner timbers or they can be provided over all timbers, as desired or necessary due to the selection of timber materials. An example of a preferred construction would be a mat that has typically has four or five timbers with the first and last being made of plastic or an elastomer and the second, third and if present the fourth being made of pine, mixed softwoods, oak or mixed hardwoods. Preferred plastics include HDPE or FRP but any of the other materials disclosed herein can be used instead.

Another embodiment of the invention will utilize wood components for the core construction, with softwoods such as pine, cedar other conifer tree materials and preferably pine utilized for this purpose. Pine is an abundant, low cost wood material that is readily available in the sizes needed for industrial mats. It does not possess the same abrasion and abuse resistance as hardwoods such as oak. Thus, pine or other softwood can be used as a core construction material in the mats of the invention provided that it is protected by outer components of the mat that are made of more rugged materials. In a crane mat, for example, the outer side beams can be oak timbers of the desired size, with the pine beams being used at a smaller size than the oak timbers such that the oak timbers extend both above and below the pine timbers. Then, the spaces between the exposed surfaces of the pine and oak timbers can be provided with one or more elongated members of wood, engineered lumber, plastic or recycle materials. These materials can be used in the form of boards or as a sheet member to form with the oak timbers the exposed upper and lower mat surfaces of the mat which are configured to be relatively flat. These outer components protect the pine from damage while the pine lowers the cost of the mat compared to the more expensive and less readily available oak or other hardwoods.

And in a preferred embodiment where plastic side timbers are used, each adjacent beams and timbers of the mat may be separated by a steel plate which would be essentially the same in height and length dimensions as the plastic and pine timbers. In other situations, a slightly smaller plate can be used, for example, one that is one half inch to 2 inches smaller than the pine timber on each peripheral side of the plate. These plates would also have a preferred thickness of about ⅛ to ½ inch although thicker plates can be used in larger mats. And for smaller size mats, other metal plates, e.g., aluminum, can be used instead of steel.

In other embodiments, the steel plates can extend to the upper or lower surfaces of the mat and are covered by the upper and lower elongated members. In a 12" thick mat, for example, the non-plastic timers can have a height of about 8" with elongated members having a thickness of about 2" provided on each of the top and bottom surfaces of these timbers. The side plastic timbers would have a height of 12" so that the upper and lower surfaces of the mat would be essentially flat. Similarly, in an 8" thick mat, the plastic timbers would have a height of 8" and the inner timbers would have a height of 4". Again, upper and lower boards having a thickness of about 2" would be provided on each of the top and bottom surfaces. The elongated members can be made of any of the materials disclosed herein. And when the elongated members are boards, they can be spaced to allow certain voids to be present between them which act as channels that allow water to drain from the mat.

The assembled mat in the preferred embodiments can vary depending upon the specific type of mat. 2-ply or 3-ply laminated mats will typically include elongated members that are about 2×8 inches with the mat having a width of approximately 8 feet and a length of about 12, 14 or 16 feet. General industrial mats would typically have a thickness of approximately 6 inches which is made up of a core construction that is 2 or 4 inches thick, an upper layer that is 2 inches thick and a lower layer that is 2 inches thick. For a three layer mat, each layer would be 2 inches thick, while for a two layer mat, the core would be 4 inches thick and the upper outer layer would be 2 inches thick. A crane or timber mat would be about 4 to 8 feet wide with beams having typical width and height dimensions of 6×6, 8×8, 10×10 or 12×12 inches and a length of between about 20 and 40 feet. The core structure may be made of any environmentally resistant material disclosed herein and in the desired shape and configuration. The number of top, bottom, and core structure components will be dictated by the final dimensions of the mat for the particular application or end use.

Also, the preferred embodiments will include spacing in between top, middle, and bottom boards with is no wider than about 1½ inches.

Yet another embodiment of the invention relates to the protection of a conventional two or three ply wood mat that is typically made of oak or mixed hardwood with end beams, timbers or bumpers of plastic or elastomers. In some embodiments, the upper and lower surfaces of these wood mats can be provided with additional elongated members made of plastic or elastomers as described herein. In one arrangement, the upper and lower plies of the mats can be made with thinner wood boards with the difference in thickness made up by the addition of the plastic or elastomer boards. These exterior boards can be made of any plastic or elastomer including recycled materials.

The core structure can be made up of different environmentally resistant materials. For example, a core structure of a sheet or plate of a thermoplastic or thermosetting material can be provided with a thin sheet of metal for additional reinforcement or for maintaining filler material in the cells or openings of the sheet or plate. A steel sheet can be used upon a layer of a thermoplastic material in the form of a sheet or other structure to provide stiffening of the core structure.

The core structure made of environmentally resistant materials prevents degradation from exposure to weather conditions in the event that water or other liquids enter into the core. Preferred specific environmentally resistant materials for the core structure include:

- various thermosetting materials, including Epoxy, Melamine formaldehyde (MF), Phenol-formaldehyde (PF), Polyester, Polyurethane (PU), Polyimide (PI), Silicone (SI) or Urea formaldehyde (UF). These materials can be reinforced with fibers or filler (carbon, glass, metal, etc.);
- a thermoplastic material (any of the various plastics mentioned hereinabove) and in particular, HDPE, PET and SBR as disclosed in U.S. Pat. No. 6,380,309;
- a honeycomb structure with filled cells and upper and lower plate surfaces that are molded or otherwise constructed, as disclosed in U.S. Pat. No. 8,061,929;
- open face filled cellular structures of thermoplastics, polyolefins or vulcanized rubber as disclosed in U.S. Pat. No. 6,511,257;
- molded sheets of thermoplastic resin as disclosed in U.S. Pat. No. 5,888,612;
- a metal structure or frame of aluminum or stainless steel or of steel that is coated, painted or galvanized to assist in preventing rusting when contacting water; or
- a reinforced plastic composite material as disclosed in U.S. Pat. No. 4,629,358.

The edges of the core structure can be protected as disclosed in US patent application 2014/0193196 or with wood or synthetic laminate to avoid mechanical damage to core structure edges. Additionally, a bumper structure of wood or plastic material as disclosed herein can also be used.

For certain open cell core structures, reinforcement with sheets or other cell closing materials can be used to improve stiffness and strength of the core structure while also retaining the filler in the cells or openings.

It is also possible to use a metal plate as the core. The metal plate can include openings or apertures to reduce weight. A plate of a thermosetting plastic can instead be used, and it can be solid or have openings therein. The plates can be 2 to 4 inches thick. A fiberglass reinforced thermosetting plastic grating having openings that are 2×2 or 3×3 inches is preferred.

To reduce the weight of the mat, the core structure can be made of a honeycomb or lath structure, or with a plurality of openings. For very open structures, the cells or openings can be filled as noted above with a material that is lighter than the metal to maintain the weight at a desired level. The openings can be covered with upper and/or lower sheeting to retain the filler therein. Any material can be used for the sheeting as the metal core structure is providing the necessary strength and rigidity to the mat. Typically, the sheeting may be plywood, plastic, metal or composite material, and can be solid or in mesh form. The sheeting can be attached to the mat preferably by riveting, bolting or by an adhesive. The sheeting and core structure can be maintained in position be being sandwiched between the outer layers, with the entire structure held together by bolting or riveting. If necessary, holes for the bolts or other fasteners can be drilled through the metal plate or sheeting to facilitate assembly by allowing passage of the fasteners therethrough.

And as noted herein, pine or other soft wood timbers can be used for the core of the mat. These materials would have slightly smaller height and length dimensions and those of the side beams. For example, for a crane or timber mat that includes side beams having typical width and height dimensions of 6×6, 8×8, 10×10 or 12×12 inches and a length of between about 20 and 40 feet, the pine timbers would have width and height dimensions of about 6×4, 8×6, 10×8 or 12×10 inches with the same length. And when steel plates are used, these could have the same height and length as the pine timbers but the could instead have a height of about 2 to 4, 4 to 6, 6 to 8, or 6 to 8 inches and a length of between about 19 feet 8 inches and 39 feet 8 inches, respectively.

Generally, the mat construction for a laminated mat comprises one of the cores disclosed herein along with upper and lower layers of elongated members or beams. For the upper and lower layers, the thickness of the boards will be approximately 1.75 inches but may be between 1.5 and 3 inches. Length will be as desired but will preferably be 12, 14 or 16 feet. The width of the boards will vary depending upon location on the core. That is, the width of the top and bottom layer boards will be approximately 8 inches (single width) or 16 inches (double width). Approximately means they may be slightly less such as 7.5 to 8.5 inches or 15 to 17 inches. A typical thickness for the mat is at least about 4 inches and preferably approximately 6 inches, with the central layer providing a thickness of about 1 to 4 inches and the upper and lower layers providing a thickness of about 1 to 3 inches. Generally, the boards have a narrower width than the softwood beams, but of course, the dimensions can vary depending upon the specific end use intended for the mat. Also, the beams can be manufactured to any particular thickness, width and length, but the preferred dimensions disclosed herein approximate those of conventional mats of white oak or other materials which are in use in the industry.

In a most preferred embodiment, the mat includes a core structure of an environmentally resistant material, an outer upper layer positioned above the core structure and an outer lower layer positioned below the core, wherein each outer layer includes a plurality of elongated members each having a modulus of 1.6 M psi. As noted, the core structure is made of materials that provide a load bearing capacity that is able to withstand a load of at least 600 to 800 psi or more without damaging or permanently deforming the core structure.

The core structure can include one or two outer layers as desired or necessary for a particular installation and stiffness. The core structure components can be made be of sections or smaller portions that are joined together to form the desired size of the core. As an example, for a thermoplastic core structure of HDPE, sections may be welded together to provide the desired size, e.g., four HDPE 4×8 foot sections can form the core structure of a mat that is 8×16 feet. Similarly, eight 4×4 foot sections can be joined by welding to form the same 8×16 foot mat. The same is true of wood, metal or elastomeric components, which can be joined mechanically, by adhesives or where applicable by welding. The core structure can also be made of upper and lower half sections that can be joined together by welding, a mechanical interlocking, by fasteners or by adhesives.

Additional layers or components can be added to the core structure or mat, but the most preferred construction includes outer layers above and below the core structure as noted herein. The outer layers are preferably made of white oak as disclosed in U.S. Pat. No. 4,462,712 (three layer) and U.S. Pat. No. 5,822,944 (two layer), the entire content of each of which is expressly incorporated herein by reference thereto. The mats are generally designed with water channels on the outer layer(s) to drain water from the mat. This is achieved by the spacing of the elongated members or by the provision of grooves in a sheet or other wider surface that is presented on the outermost layers of the mat. The grooves are generally rectangular in shape and typically have a width of about 1.25 inch and a depth of about 1 inch. It is of course also suitable to use channels that are U-shaped instead of being rectangular and that have a similar size as this achieves the same purpose of providing a path for moisture to be removed from the mat.

And while symmetrically formed mats are preferred, it is also possible to provide a core structure that has a different number of layers or plies on one surface than another. For example, the top surface of the core than include two layers or plies of components such as elongated or sheet members, while the lower surface can include only a single layer or ply of such components. And the materials used for the components of one outer layer does not have to be the same as the materials used for other outer layers. Thus, the mat designer has abroad range of possibilities for mat construction to tailor a specific mat for a particular installation or need.

Instead of wood, it is also possible to use engineered lumber for the outer plies or layers that are present above and below the core structure, either as a solid sheet or in the form of boards. Other materials that can be used our plastic layers or layers of recycled materials that are extruded into a final form of a plate or boards. These recycled materials can include material from carpets, tires, water bottles, food containers or other industrial plastic materials, as well as plastic resins that include components obtained from rice hulls, soybeans or other organic materials. Rice hulls can also be used as a filler in plastic materials. These recycled plastic materials have good environmental and impact resistance and can be made extruded into a desired shape of any length. They typically can be made into boards although with the sight sized equipment, sheets can also be provided.

Figure 2:
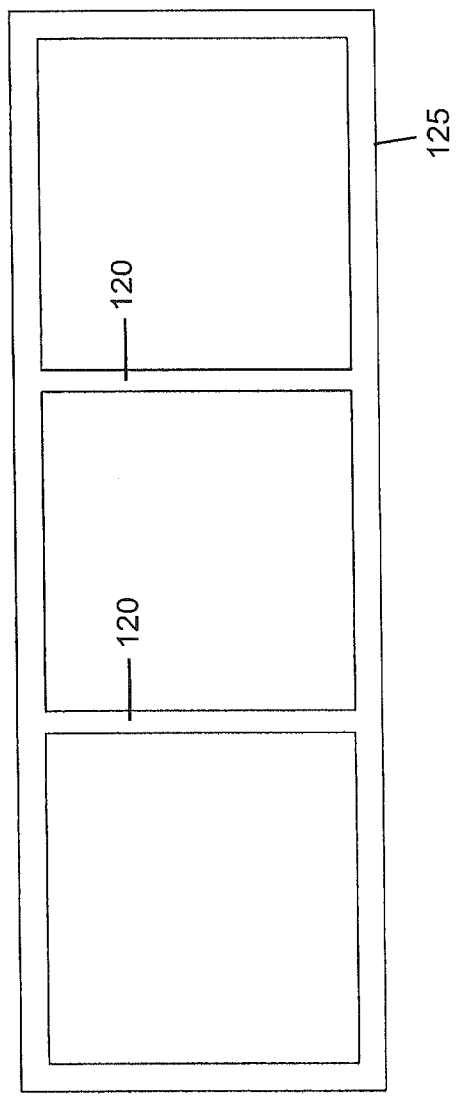
FIG. 2 is a side view of a reinforced polyester beam for use in the mat of FIG. 1.

Referring now to the Figures, FIG. 1 illustrates mat 100 that includes an upper outer layer 105 and lower outer layer 110 which are used to surround core structure 115. The core structure includes a plurality of reinforced polyester beams 125 and the outer layers include single width wood boards 130. The reinforced polyester beams 125 are oriented perpendicular to the boards of the upper and lower outer layers. As shown in FIG. 2, the reinforced polyester beam 125 is in the form of a rectangular tube that has two internal wall supports 120 running along the interior of the tube.

Boards 125 are applied to the core structure 115 by nailing, screwing, bolting or riveting of the boards 125 to the reinforced polyester beams 125 of the core structure 115. When bolting is used, the bolts can extend from the upper boards to the lower boards through the reinforced polyester beams 125. The nails, screws or bolt heads and nuts are recessed below the top surface of boards 130 and below the bottom surface of boards 130 to present relatively smooth upper and lower surfaces of the mat 100.

Alternatively, the boards can be attached to the core structure 115 by an adhesive or other means that provide a secure attachment. For example, when the core structure is made of a thermosetting material, the sheet and boards can be made of the same material as a unitary component. For a metal core, holes can be drilled to allow the bolts to pass therethrough.

Figure 3:
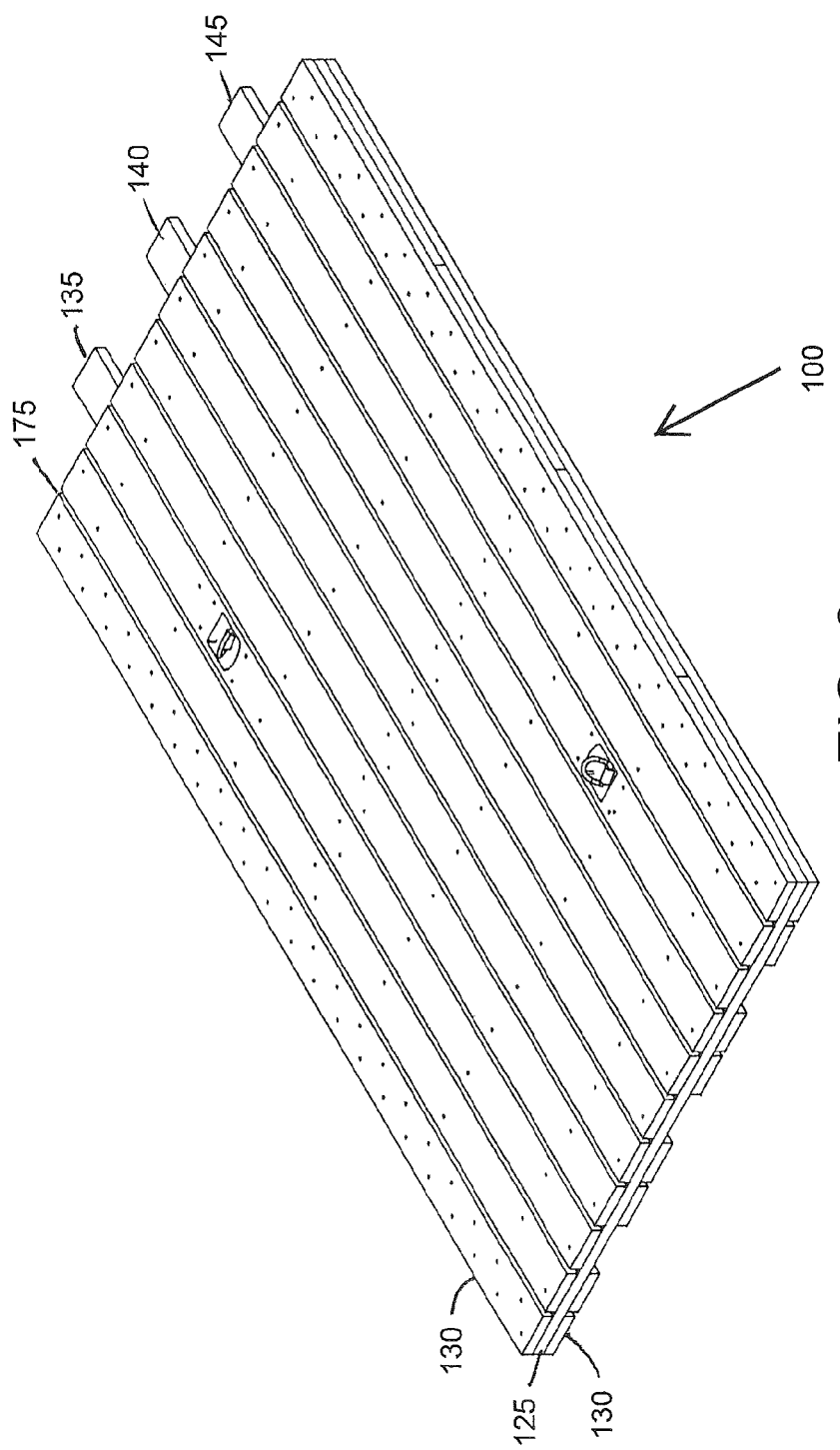
FIG. 3 is a view of the assembled mat of FIG. 1.

As shown in FIGS. 1 and 3, eleven (11) boards are used. The third, sixth, and ninth boards (135, 140, 145 respectively) of the lower outer layer are offset to provide an interlocking feature for the mat. And while offsetting of certain boards is preferred for providing an interlocking with adjacent mats, this is not always needed such that interlocking can be considered to be an optional yet desirable feature. Interlocking is often preferred to avoid staking of the mats to the ground or to avoid including other more complex components for use in connecting adjacent mats together.

And while the interlocking is shown on opposite sides of the mat, the mats can be interlocked together in any direction using the top or bottom layers with appropriate configuring of the components of those layers.

Lifting elements 150 are provided on the third and ninth boards of the upper outer layer. These lifting elements 150 are configured as D shaped rings which are attached to the boards in recesses 170 so that the lifting element 150 can remain flat when the mat 100 is in use. Two lifting elements are shown but a skilled artisan can determine how many elements are needed for lifting of any particularly sized mat. If desired, lifting elements can also be provided on the boards attached to the lower outer layer 110 for versatility in the handling and transportation of the mat. The lifting elements are provided on the boards that are attached to the skin portion so that if the lifting elements or boards are damaged they can be easily removed and replaced.

The provision of single width boards enables the upper and lower moldings to have water channels 175 on the upper surface of the skin to drain water from the mat.

FIG. 3 illustrates the final shape and configuration of the mat 100 after assembly.

Figure 4:
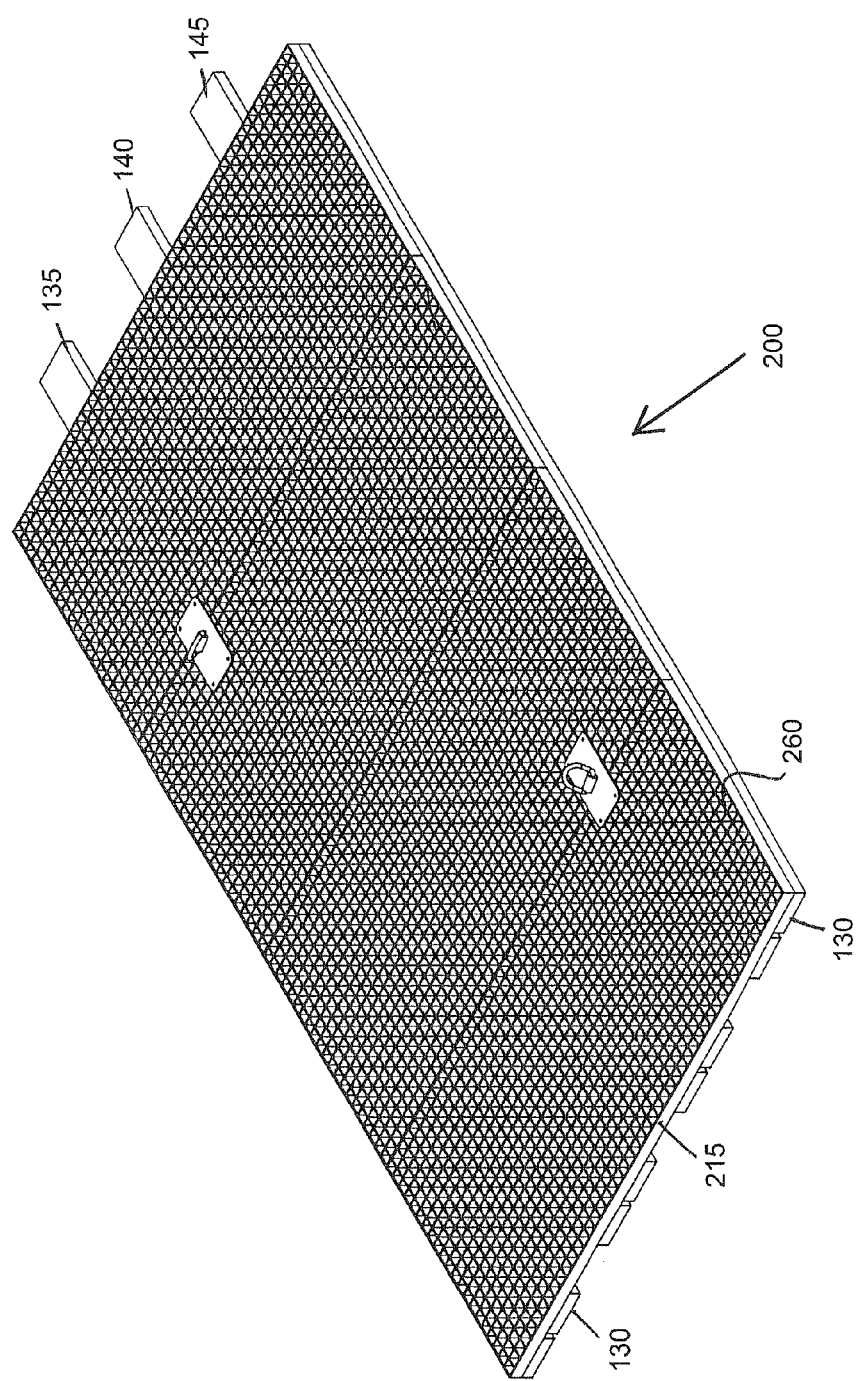
FIG. 4 is a perspective view of another embodiment of the mat of the invention to illustrate an open celled honeycomb structure for the core.

FIG. 4 illustrates a second mat 200 according to the invention which includes a lower outer layer 130 and a core structure 215 that has a plurality of cells 260. As some of the components are the same as in FIGS. 1-3, the same numerals used are used to designate the same components for the mat of FIG. 4. The core structure 215 may be made of a thermoplastic or metal and the cells can be left open or filled as disclosed herein. The core structure can also be a fiberglass reinforced thermosetting material in the form of a grating having square or rectangular openings therein. The openings or cells of the core structure may be filled with a foam or other material that expands to fill the cells 260 and remains adhered thereto. In this situation, no cover member is needed to retain the filler material in the core structure 215. For that situation, or for the situation where the cells are filled with particulate matter, upper and lower layers 130 as described above can be applied to the core structure 215 to assist in retaining the particulate material in the cells 260.

Figure 5:
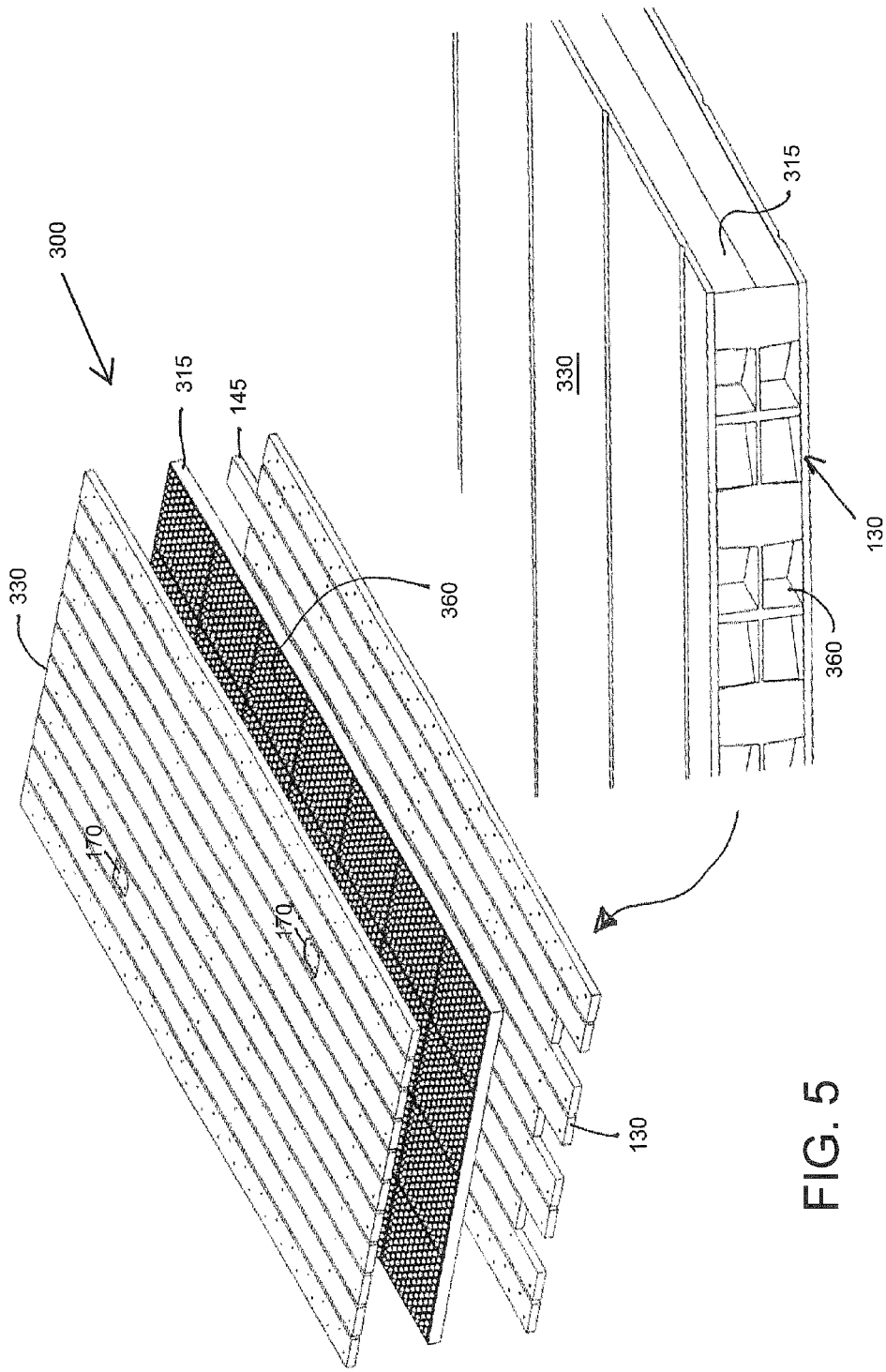
FIG. 5 is a perspective view of another embodiment of the mat of the invention to illustrate an open celled hexagonal honeycomb structure for the core structure and the presence of additional sheet members to retain particulate filler in the cells.

FIG. 5 illustrates a third mat 300 according to the invention which includes a lower outer layer 130, an upper outer layer 330 and a core structure 315 that has a plurality of cells 360. As some of the components are the same as in FIGS. 1-4, the same numerals used are used to designate the same components for the mat of FIG. 5. The core structure 315 may be made of a thermoplastic material or metal and the cells 360 are of hexagonal shape to provide larger openings can be left open or filled with particulate material as disclosed herein. In particular, the cells may be filled with foam, particulates or other non-adherent materials, e.g., rubber crumbles from recycled automobile tires. For such particulates, the cells 360 can be covered by one or more sheet members either above, below or both above and below the core structure to retain the non-adhering filler materials in the cells. The sheet members can be made of wood boards, plywood, plastic sheeting, metal sheeting, e.g., steel or aluminum, or the like. When the sheet members are only provided to hold the filler materials in the cells, they can be relatively thin e.g., ⅛ to ½ inch is sufficient although larger thicknesses can be used if desired to add weight to the mat. The core structure and sheet members can then be used as a core structure with outer layers applied as in the other embodiments.

Alternatively, when sheet members are not needed, the lower layer 130 and upper layer 330 can be wood boards that retain the filler in the cells 360 as shown in FIG. 5. In this embodiment, when the core structure 315 is molded of plastic material, the areas between where the boards are placed would be made of solid plastic rather than open cells so that the particulate material does not exit the cells through the spacing between the boards. These boards would have a thickness of 1.6 inch or greater depending upon the needed weight of the mat. The filler also contributes to the weight of the mat.

Of course, if the material of the core structure 315 and lower 130 and upper 330 layers provides sufficient weight, the cells do not need to be filled and the additional sheet members are not needed. Additional sheet members are also not needed if the cells are filled with an adherent filler material. The boards 130 of the upper and/or lower outer layers can be attached by bolting which passes through the cells. If desired, and preferably, the upper outer layer 330 is provided so that the final mat structure has an appearance that is similar to that of FIG. 3.

Another embodiment of the invention is a variation on that of FIG. 5. The core structure is made of a plastic material that has cells made with flat upper and lower surfaces. These surfaces support the sheet members if the cells are filled and instead support the lower and upper layers if the cells are not filled. These cells thus act as shock absorbers to provide resilient compression to the mat.

In a preferred embodiment of the invention, the mat includes bumpers which protect the sides of the mat from damage during transport and installation. These bumpers are generally configured as a rails, rods or beams of a material that protects the sides and core structure of the mat from damage when being moved around from warehouse to truck to jobsite. As the mats are relatively heavy, around 2000 pounds, they are moved by heavy equipment such as front end loaders or cranes, and are typically dragged or dropped into position. The bumpers also provide protection to the side edges of the mats due to such movements and manipulation as well as some resistance to penetration by teeth or tines of the moving equipment. In one embodiment, the bumpers are made of a durable, tough and resilient material such as a plastic or elastomer, in particular, HDPE or a rubber material having a Shore D hardness of 10 to 50 is preferred. The bumpers are preferably molded or extruded into the desired shape or shapes for releasable attachment to the mat.

Figure 6:
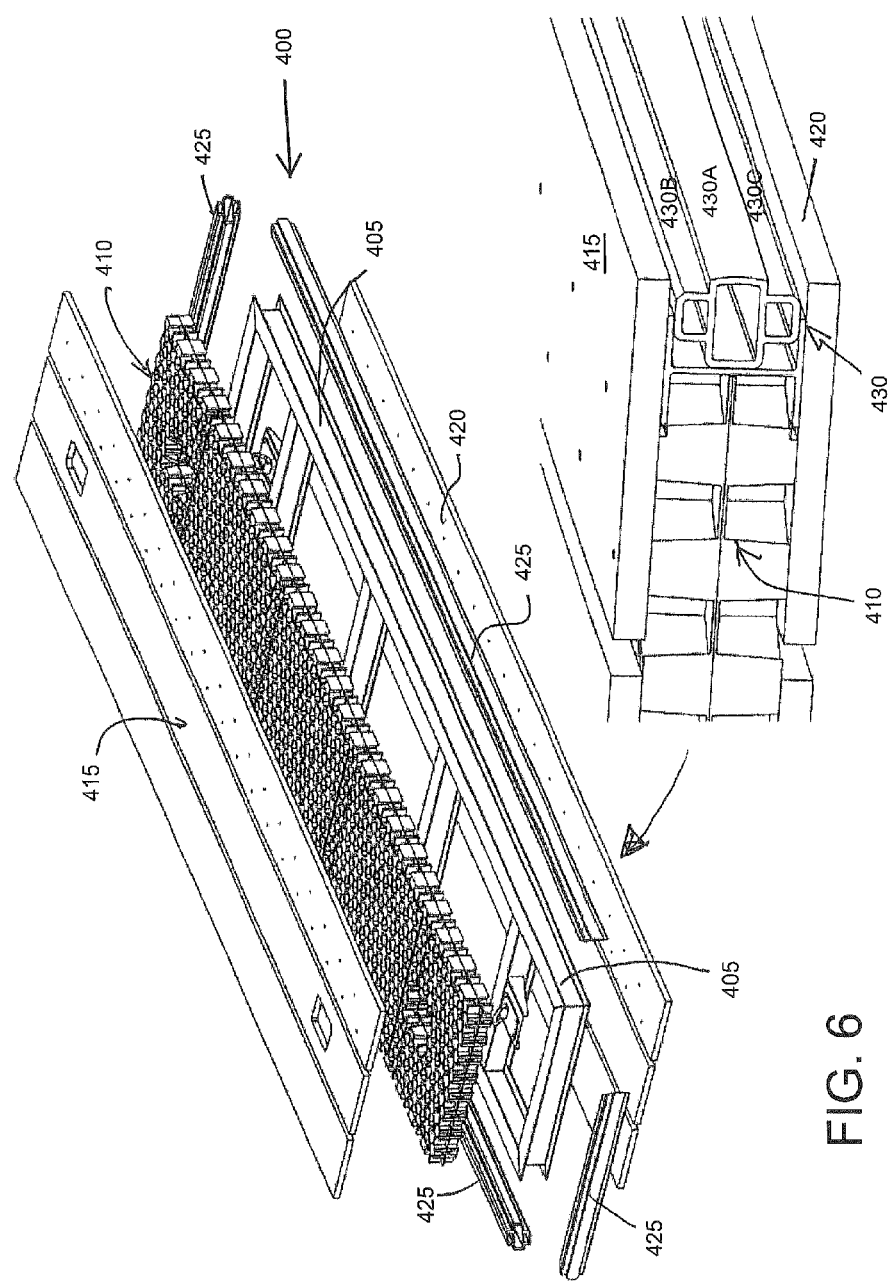
FIG. 6 is an exploded view of a mat that includes a steel I-beam frame, wood skins, a foam core structure and bumpers on all sides of the mat.

FIG. 6 shows mat 400 which is configured as a Crane/Pipeline mat, typically having dimensions of 8 inches thick by 4 feet wide and 18 feet long. These are used primarily for drilling rigs and similar applications such that these mats are much more robust and tough compared to mats for temporary roadways. To provide sufficient strength, the mat preferable includes a steel ladder frame 405 that provides the periphery of the mat. The frame 405 includes a number of cross-members to provide rigidity and strength to the frame to support the other mat components. The openings are provided to allow connections to be made and to reduce the overall weight of the mat compared to one made of solid steel. A core structure 410 is present within the ladder frame 405 and upper and lower wood skins 415, 420 are provided to protect the core structure 405. The core structure 410 of the mat is a solid or foam core structure preferably molded from HDPE or a similar polymer. The use of a polymeric core structure and the geometry/shape of the cells helps reduce the overall weight of the mat while providing sufficient internal support so that the mat can provide the necessary strength against compression and compaction. The wood skins 415, 420 provide sufficient durability to equipment or vehicles that move over or that are supported by the mat. Also, the mat has openings that allow water or other liquids to pass through during use. As the core structure is made of environmentally resistant materials, there is no need to provide a hermetic seal about the core structure components of the mat.

As shown in FIG. 6, the bumpers 425 are configured as an extruded or molded rail or rod that protects the sides of the mat. Generally, a single bumper structure is provided that is received in the open area of the I-beam that forms the periphery of the mat. The bumpers have a shape that fits within the open cavity of the I-beam without completely filling the area, as this allows the bumper to be compressed to absorb shock. If desired, the bumpers can be bolted, riveted or joined to the I-beam by an adhesive so that they are retained in position.

As shown, the bumpers in the enlarged view of mat 400 have a tri-tube arrangement 430, of a "+" shape, that has a larger tube 430A in the center and the smaller tubes 430B, 430C located above and below the central tube. The tubes can be extruded in the shape that is shown or separate tubes can be made and then joined by welding, adhesive bonding or even by mechanical fasteners. This shape is not critical, however, and other shapes that are round, polygonal or that have combinations of different shapes can be used for the bumpers if desired. For certain materials, the bumper can fill the entire open side cavity of the I-beam, or it can partially fill the cavity provided that the bumper contacts the inner wall of the I-beam and extends towards the periphery of the mat so that it can absorb shock or impact forces.

In other embodiments disclosed herein, the bumpers can be made of wood. Wood is a useful relatively low cost material that has a history of good service in oil field mat applications.

The bumpers are preferably located on all sides of the mat. To retain the bumpers in position in the I-beams, rather than using an adhesive of bolting, the upper and lower layers of the mat can be provided with an additional member that is nailed to the upper and lower wood skins to retain the bumpers in place to prevent their dislodgement from the I-beam. The bumpers provide protection to the sides of the mat as well as to avoid damage to the core structure components.

Figure 7:
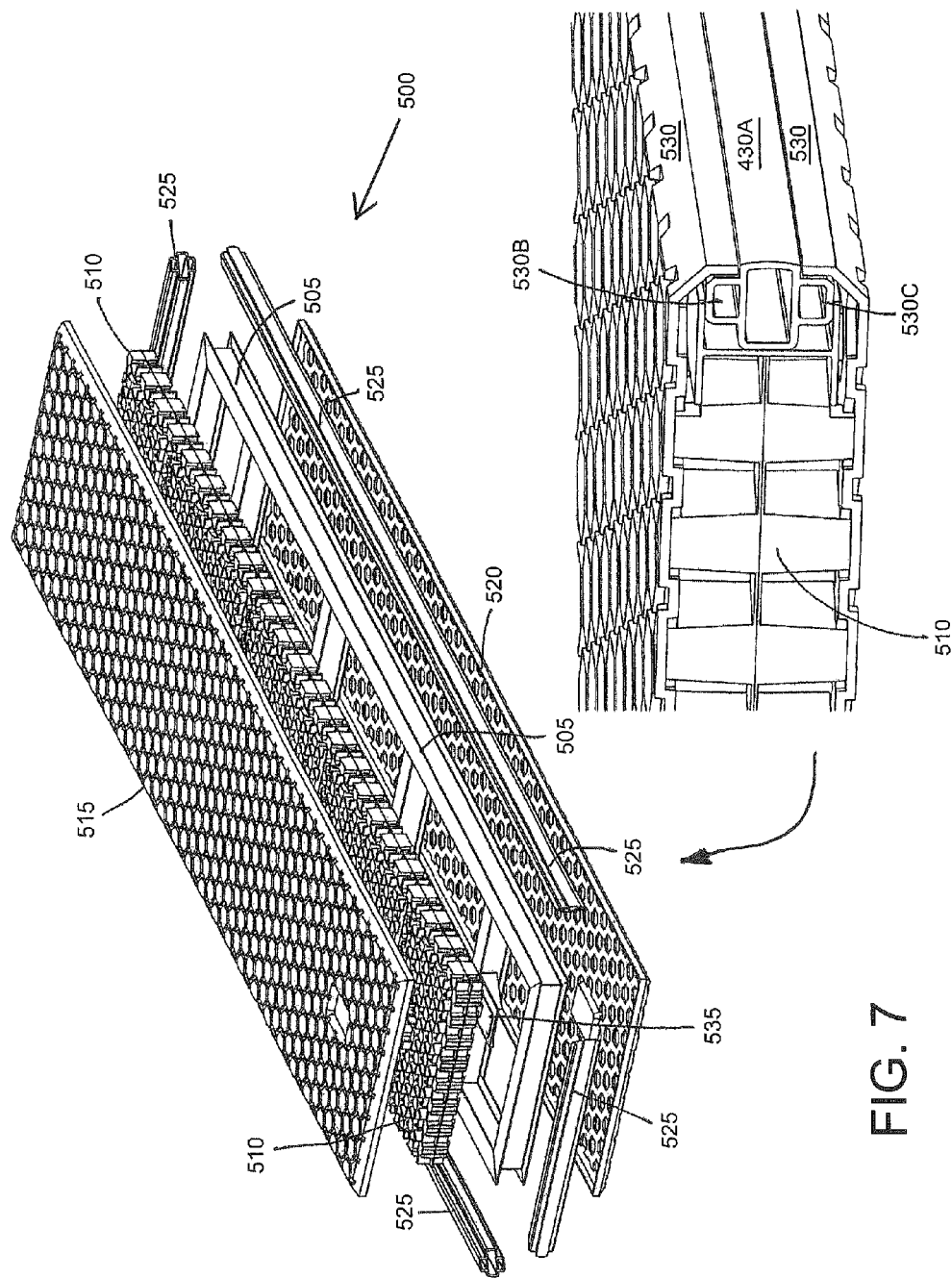
FIG. 7 is an exploded view of a mat that includes a steel I-beam frame, polymer skins, a foam core, and bumpers on all sides of the mat.

FIG. 7 illustrates another Crane/Pipeline mat 500 that also includes a steel ladder frame 505 that provides the periphery of the mat. A similar foam core structure 510 is present within the ladder frame 505 and upper. Instead of upper and lower wood skins, however, the mat 500 of FIG. 7 includes upper 515 and lower 520 vacuum formed polymer skins to protect the core structure 510. These skins can be formed to a thickness of up to 00.6" or greater. The skins preferably include lips 530 that engage the upper and lower portions of bumpers to retain them in place in the I-beams. Again, the bumpers are shaped as a plurality of joined tubes as shown in FIG. 6 with upper and lower tubes being of smaller cross section than the center tube. The upper and lower tubes can also be shaped to engage in full contact the I-beam inner surfaces while being recessed from the end of the central tube so that the lips 530 can maintain the bumpers in place. Other shapes for the bumpers are acceptable provided that they can fit in the I-beam and provide an outer surface that can absorb shock and impact. For the configurations shown the tubes can collapse somewhat to absorb such forces.

The lip portions of the upper 515 and lower 520 skins can be a separate component that is attached to those layers or it can be molded or formed as an integral part of those layers. Generally, the upper 515 and lower 520 skins are made of a molded plastic or elastomeric material because such materials provide environmental resistance and impart durability and toughness to the mat. Also, the core structure 510 can be provided in two halves, an upper half that is attached to the upper skin and a lower half that is attached to the lower skin. These halves can be designed with protrusions or raised and lower areas so that they can be joined together by engagement of the protrusions and recesses or raised and lower areas. This reduces installation time and also assures that the core structure and skins interlock to provide the best resistance against compressive forces.

In the embodiments of FIGS. 6 and 7, the steel frame can be painted or coated with a sacrificial metal (i.e., galvanized or phosphatized) to provide improved environmental resistance to the mat. While rusting of the steel is not detrimental to the operation of the mat, it does not provide a good cosmetic appearance such that the painting and coating compensate for that by minimizing rusting. Stainless steel can also be used but that material is more expensive. Aluminum can also be used but some strength to the mat is lost with that lighter weight construction. The metal ladder frame is advantageous because, in addition to its strength and ease of working, it can be configured to allow direct attachment of the lifting elements to the frame 505 to provide a more robust connection that facilitates lifting and manipulation of the mat.

As in FIG. 6, the mat of FIG. 7 has a reduced overall weight by incorporating the molded or structural foam core structure in the steel frame. Whether the upper and lower layers are made of wood or of a plastic or elastomeric material, the entire structure is bolted or riveted together to form the final mat.

Figure 8:
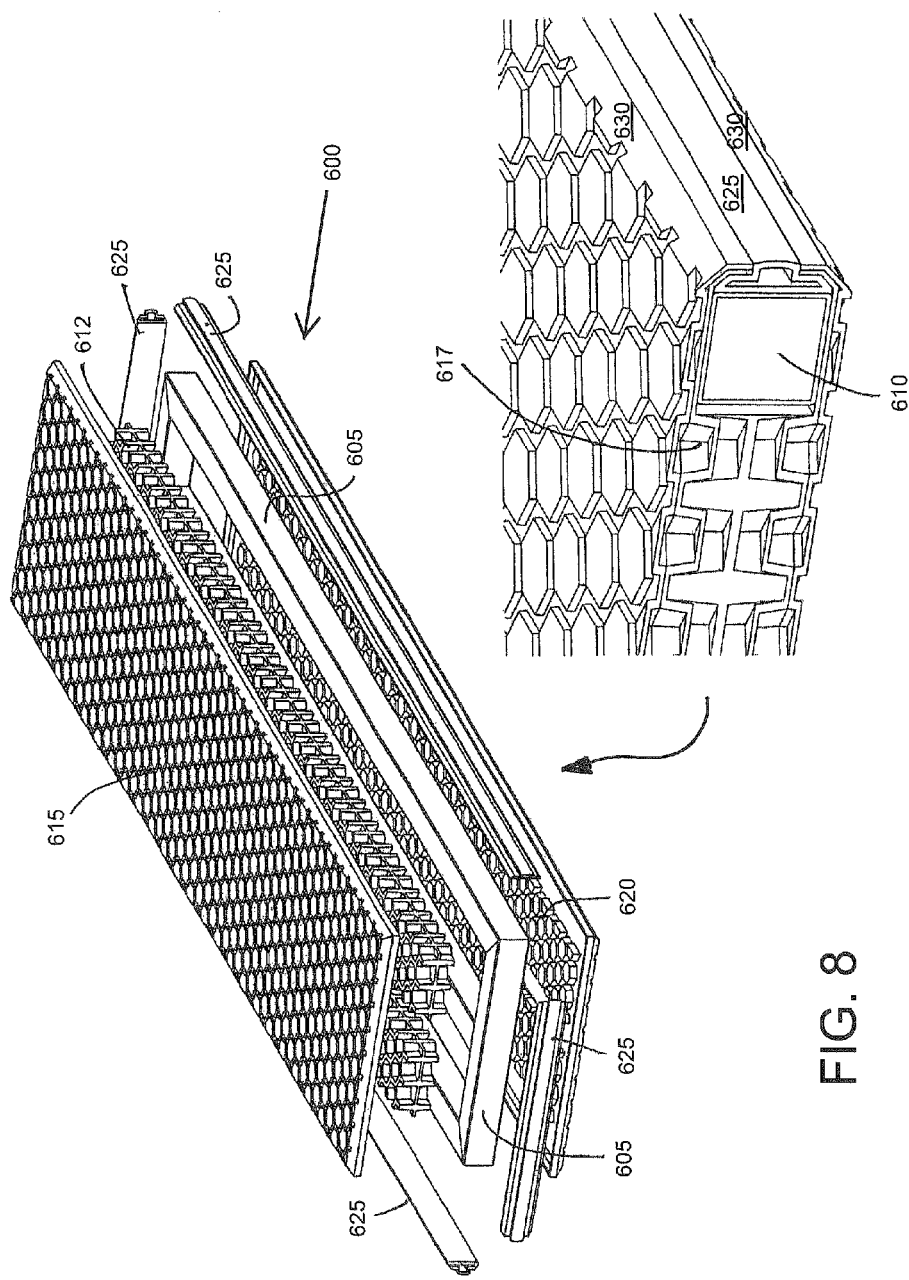
FIGS. 8 and 9 are exploded views of a mat that includes a fiberglass reinforced tube section frame, polymer skins, a foam core structure that interlocks with the skins and bumpers on all sides of the mat.

To further reduce the weight of the mat while also improving its environmental resistance, a box frame of fiberglass reinforced plastic (FRP) can be used instead of the steel frame. This is shown in FIG. 8, in mat 600, that has a FRP box frame 605. The box frame 605 may be made of rectangular or square tubular structures. If desired, the FRP box frame 605 can be configured as a ladder frame as shown in FIGS. 6 and 7. The FRP frame provides lower weight and good durability and resistance to moisture of other liquids that may permeate into the core. To provide additional crush resistance to the frame 605, the open center portions of the tubes can be filled with foam, recycled rubber tire material or other filler material 610. A polyurethane foam can also be used for this purpose. The filler material can also be selected to provide additional weight to the mat if desired.

The plastic of the FRP material would be any one of the thermosetting plastics of the types mentioned herein but thermosetting polyesters and epoxies are preferred.

FIG. 8 illustrates another feature of the invention where the molded foam core structure 612 is locked in place by engaging pockets 617 in the upper 615 and lower 620 polymer skins.

When a box frame is used, the bumpers 625 are configured with a flat surface to abut against the frame 605. The bumpers 625 are configured with upper and lower portions that are less wide than the central portion of the bumpers so that the skins 615, 620 can include lips 630 that engage the bumpers 625 to hold them in place against the box frame 605. These lips are essentially the same as those shown in FIG. 7. The bumpers protect the FRP box frame from damage since the FRP box frame is not as strong as the steel ladder of FIGS. 6 and 7. The FRP beams may be made by a pultruded process as this results in a light but strong construction.

In FIG. 8, the upper 615 and lower 620 polymer skins can be configured with protrusions or honeycombs that interlock with the core structure 612 to form a more rigid structure. Alternatively, the foam core structure 612 can be omitted and the open center of the mat filled recycled rubber tire material or other particulate filler material as is done with the central opening of the pultruded FRP box frame.

Alternatively, rather than fit into the structure on the sides of the mat, the bumpers can be designed with a "C" shaped cross section so that they can contact the top, side and bottom of the pultruded FRP box frame members. The top and bottom surfaces of the bumpers can extend above the upper and lower surfaces of the mat or they can be designed to remain flush with those surfaces by providing a thickness on the top and bottom bumper portions that correspond to the thickness of the top and bottom layers. Alternatively, the bumpers can be bolted, screwed, snap riveted or adhered to the FRP box frame with an adhesive.

Figure 9:
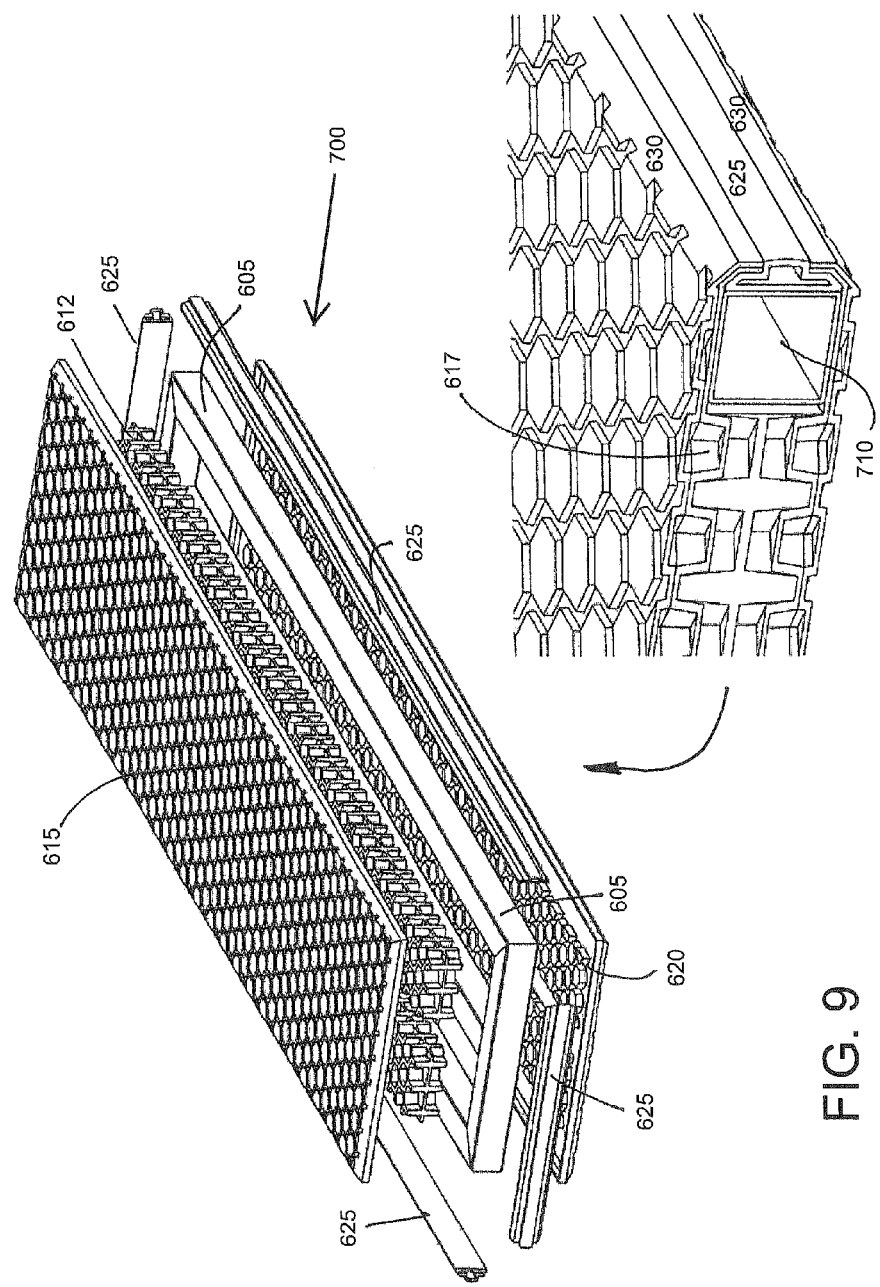

FIG. 9 illustrates the same type of mat as in FIG. 8 such that the same numbers are used to describe it. The main difference in the mat 700 of FIG. 9 is that the box fame 605 is not filled and is open 710 as for certain embodiments, the filler is not necessary. The bumpers in FIGS. 8 and 9 have a "T" shape with the central portion protruding beyond the sides of the mat to provide protection of the FPR frame and core.

Figure 10:
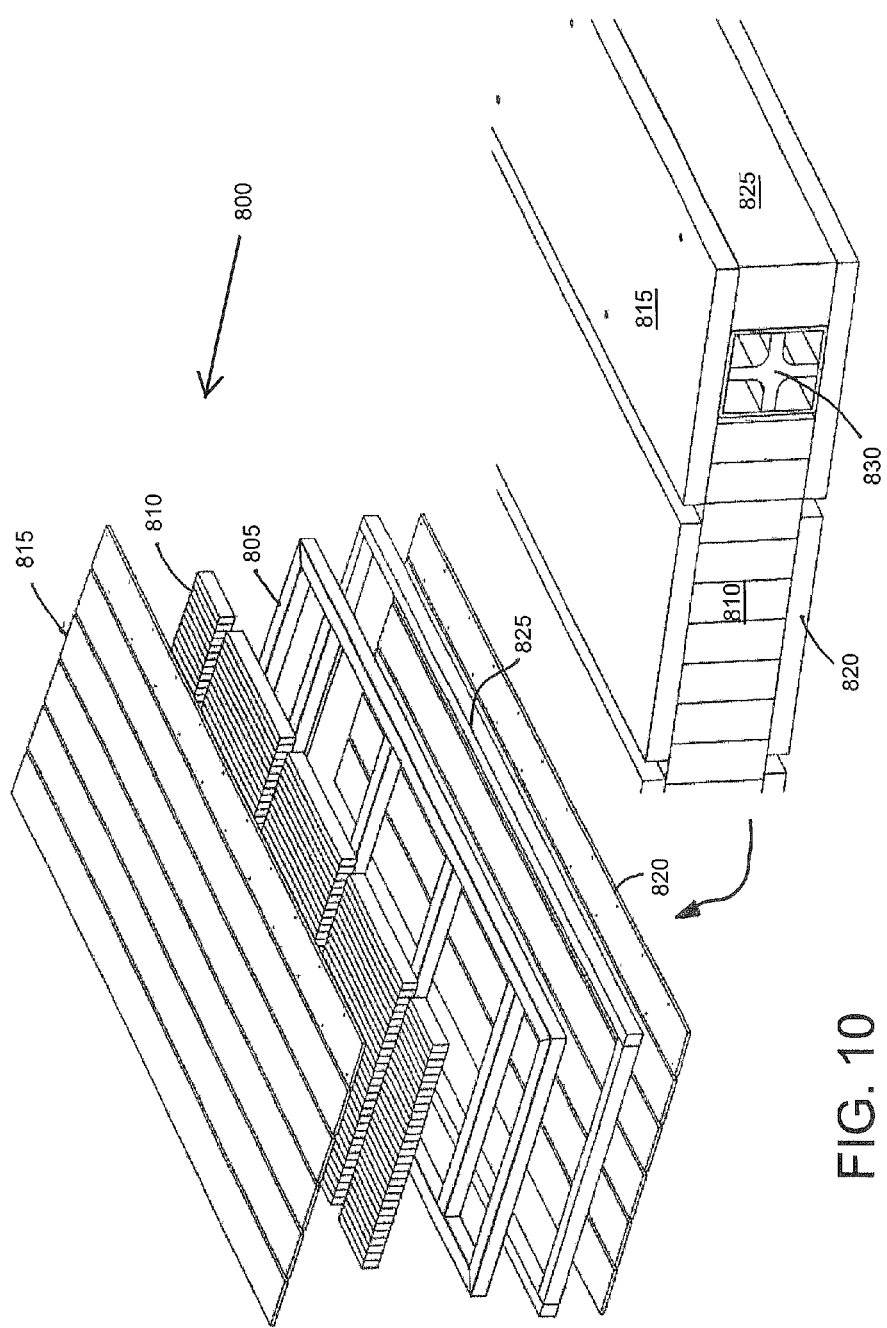
FIG. 10 is an exploded view of a mat that includes a fiberglass reinforced tube section frame, wood boards, a laminated oak core structure and an outer oak edge construction that protects the tube section.

FIG. 10 illustrates another embodiment of a Crane/Pipeline mat 800 that includes a box frame 805 of an FRP square tube. The box frame 805 surrounds a laminated wood core 810. Although the wood core 810 is heavier than the foam core of the other embodiments, it is much less expensive and can be used in certain installations where the greater weight or ruggedness of the mat is needed. The oak core boards are configured to fit within the openings of the box frame 805 and are bolted together so that they do not move around inside of the mat. Oak boards are also used as the top 815 and bottom 820 surfaces of the mat 800.

The FRP frame 805 is protected by a rectangular wooden structure 825 which is also made of oak boards. The boards are joined together to form a square structure that is approximately the same size as the box frame 805 in width and height dimensions although the perimeter is larger so that the structure 825 sits outside or and adjacent to the box frame 805. The wood structure 825 acts as a bumper to protect the FRP box frame from damage during loading, transport and installation.

To provide additional protection to the box frame 805, the open area of the frame can be provided with a stabilizer 830 of foam or extruded polymer. As in FIG. 8, the open area can be can be filled with recycled rubber tire material or other particulate or solid filler material. One variation of the stabilizer 830 is shown in FIG. 10 but the bumpers and solid foam inserts of the other embodiments can be used as well, depending upon the desires of the designer of the mat. The wood structure most likely obviates the need for stabilizers for most installations.

Figure 11:
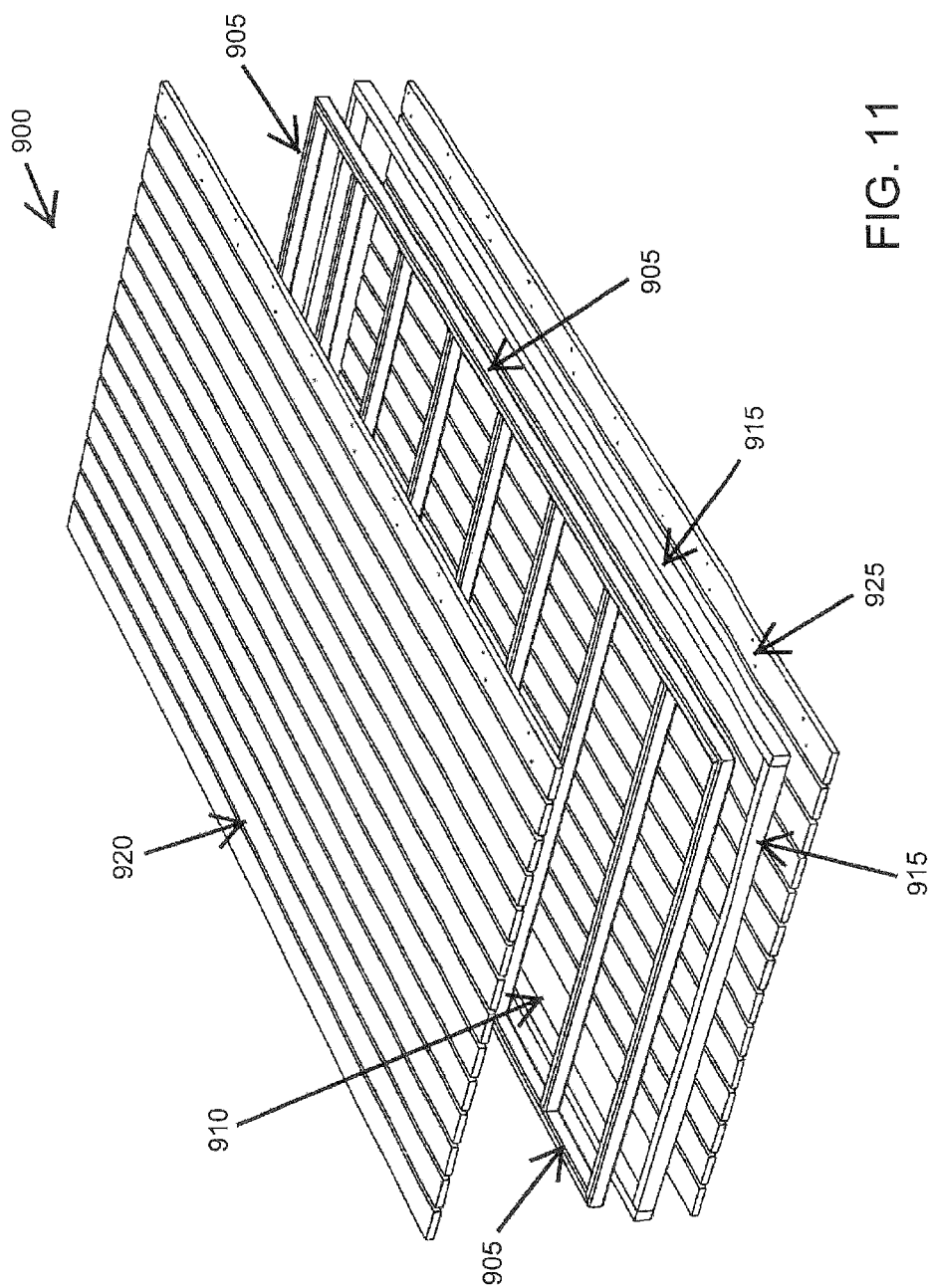
FIG. 11 is an exploded view of a mat that includes a metal frame, upper and lower wood boards and wood bumpers.

FIG. 11 illustrates another embodiment of a mat 900 that includes a frame 905 constructed of a metal such as aluminum, stainless steel or steel. The frame 905 is made of square or rectangular tubing that is welded together to provide a high strength core component for the mat. The frame 905 can remain as an open structure as shown or areas 910 between the cross members can be provided with a particulate filler or foam that is retained in place by a mesh, screen or sheets that are secured to the top and bottom of the frame. Also, if desired, the tubes can be filled with a foam, rubber particles or even sand to add weight and strength to the mat. If desired, a wood core can be used along with or instead of the fillers. Preferably, however, the areas are left free of any filler.

The mat 900 includes top 920 and bottom 925 wood boards preferably of oak that provide a flat surface for movement of vehicles or supporting equipment thereupon. These boards also provide upper and lower surfaces of the mat and protection of the core structure 905. These boards 920,925 also have spacings between them to allow water to drain from the upper surface of the mat, into the core structure and out of the lower surface of the mat. As the core structure 905 is made of an environmentally resistant material, there is no concern of deteriorating the core structure due to contact with water. The top and bottom wood boards are joined together about the frame using nails or bolts. Also, the tubular members of the frame 905 can also be provided with holes passing therethrough to accommodate bolting that is used to attach the wood boards 920,925 to the frame 905.

The frame 905 is also protected by wood boards 915 that provide replaceable bumpers for the frame 905. These can be attached to the frame by bolting that engages holes in the tubular members, or the wood boards 915 can be attached to the upper or lower boards 920, 925. As an alternative connection member, the frame 905 can be provided with studs or bolts that are welded to the tubular members and that receive the bumpers 915 or the upper 920 or lower 925 boards by passing through correspondingly located holes in those boards. The boards are then secured to the frame by appropriate nuts and washers or by flattening of the studs. This provides a simple yet robust construction for mat 900 which as noted allows replacement of boards that may become damaged during use. In the embodiments of FIGS. 9 to 11, the top boards can be 1.25" by 16" wide although smaller sections can be joined together if desired. The box frame has a preferred size of about 5.5 by 5.5 inches so that the mat has an overall thickness of about 6 inches.

All of the mats according to the invention are to be installed on properly prepared ground so that they will perform acceptably. Ground preparation must be on a uniform material of uniform flatness (i.e., within +/−12 inches over an 8×14 foot surface). Crushed stone or rock no larger than 4 inches diameter is acceptable for preparing the ground as a substrate for supporting the mats.

All mats according to the invention are designed to meet the following product specifications for preferred implementations as temporary roadways, equipment support surfaces, platforms and similar applications. The mats of the invention do not cause contamination of the ground surfaces upon which they are applied.

Preferred overall mat dimensions are approximately 8 feet wide×6 inches thick and are either 12, 14 or 16 feet in length. The interlocking feature will extend the length of the mats by about 1 ft at three locations at one end of mat. U.S. Pat. No. 4,462,712 discloses mats which contain interlocking fingers and recesses which are preferred for use in the present invention.

The mats typically include two (2) outer layers of individual wood or composite boards, having cross section dimensions of 1.75 by 8 inches.

The spacing between individual boards or components in the upper outer layer is preferably approximately 1.25 inch to allow water to drain from the mat. This spacing is retained in the upper portion of the skin. The slip resistance of the mat is improved by the draining of the excess water, especially when used in locations that experience heavy rain or snow conditions. The spacing between the individual boards or components can also be provided on the lower outer layer of the mat to allow the mat to provide better gripping onto the ground. The spacing or similar grooves on the lower outer layer on the bottom of mat will keep the mat from moving around on the ground as traffic moves across it. The spacing or grooves re even more important when the lower portion of the mat is made of an elastomeric or thermoplastic material so that the mat would it grip the ground sufficiently and will avoid or reduce sliding or slipping thereon.

The preferred mats have physical properties that meet or exceed the physical properties of a conventional white oak mat.

The mat must also provide sufficient load bearing capacity: A fully supported mat (one that is properly installed on an approved ground surface preparation) must withstand a 10 ton load, spread over a 12" diameter surface without degradation of mat properties or permanent deformation of core structure of the mat. The core structure would have a crush resistance of between about 600 and 800 psi depending upon the application. This provides resistance against compression while not detracting from resistance to torsion forces that applied to the mat by vehicles passing thereover. Generally, the cores are designed so that they provide some degree of compressibility as large vehicles or equipment move over or are placed upon the mat. After the vehicles or equipment are removed from the mat, it retains its original thickness. In wet environments, this can cause some water to be sucked into the mat, which is another reason why the core structure components are designed to withstand moisture. Also, for some embodiments, the mats may be designed with apertures so that any water that enters the mat can later exit.

And while the preferred crane or timber mat sizes are about 6×6, 8×8 or 12×12 inches by 8 feet wide and 20 to 40 feet long, a related type of mat that is used with these large mats are the ramp mats or transition mats. These both have the same type of construction as the crane mats but are cut down in size to 3×3 inch or 4×4 inch in various lengths of 10 or 20 feet or more. These ramp or transition mats are positioned along one or more of the sides or ends of crane mats to act effectively as a "step" that allows heavy equipment to more easily move onto the larger crane mat.

Optionally and preferably, the perimeter edges of the mat are provided with additional protection to prevent or reduce damage to the core structure construction of the mat from side entrance or egress onto the mat from large vehicles with steel tracks. The edge material helps protect the core structure and bumpers and is preferably easily removable so that it can be replaced when necessary.

When plastic materials are used for the core, they are formulated to be relatively inflammable. Flammability of mat shall be defined as Class 2 (B) flame spread when measured by ASTM E84 test criteria. The flammability properties of these materials can be enhanced by adding the appropriate conventional flame retardant or other additives that are known to impart such properties.

The core structure can also be formulated to allow dissipation of static electricity. For this purpose, carbon black, metal particles or other conductive fillers can be added to plastic materials that are used for the core. Of course, a metal core structure is conductive without any additives.

Although relatively protected by the outer layers, the core, when made of plastic materials, can contain UV inhibitors as necessary and in an amount sufficient to reduce deterioration of physical properties or color.

For ease in moving of the mats, attachment points can be provided that allow for lifting and handling of individual mats. Lifting hardware preferably includes D-shaped rings, O-shaped rings, chain, or cables at 2-4 locations on the upper surface of the outer layer of the mat. The exact position and attachment of lifting hardware is designed based on the size and weight of the mat and is intended to avoid damage to mat during transport and installation.

The core structure of the mat may or may not be hollow. If hollow components are used for the core, whether as tubes of cells that have openings, these openings are preferably filled with a non-absorbent filler material. A wide variety of different plastic, elastomeric or foam materials in particulate or other forms can be used for this purpose. The hollow portions can be used as is or can be provided with the filler material to increase or decrease weight as needed. Fillers of glass, ceramic or metal particles can be included to provide additional weight or strength to the mat. Other materials such as recycled rubber tire material or other environmentally friendly materials can instead be used. Preferably, the mat has a weight that is on the order of an oak mat of similar size.

When elongated members are used for the upper and lower layers of the core structure construction, they provide additional weight to the mat and can be configured in different ways. One way would be to replicate a conventional oak mat and provide a single width construction where eleven 6 inch wide (by 12, 14 or 16 feet long) boards are provided in the upper and lower layers with three boards (nos. 3, 6, and 9) in the lower layer offset for interlocking. Alternatively, a double width construction may be used where four 12 inch wide (by 12 or 16 feet long) boards are provided in the upper and lower layers: each one separated by a 6 inch board with the three 6 inch boards in the lower layer offset to provide interlocking. Other configurations can be used as desired for the particular end use of the mat.

If desired, the boards can made of wood or engineered lumber (preferably with a tolerance of ±1/16 inch) or they can be made of tubes of metal or of a thermoplastic, elastomeric, or thermosetting material, with pultruded thermosetting tube being one example of a preferred alternative material. The sizes mentioned herein are not critical and can be varied depending upon the intended use of the mats. The values mentioned above are representative of typical mats.

The upper, central and lower layers are typically nailed and/or bolted together to form the mat. The structure preferably has a modulus of about 1.6 M psi although plastic mats may have a lesser modulus when greater flexibility of the mat is desired. The mat compression property of 600 to 800 psi is suitable for most applications.

Figure 12:
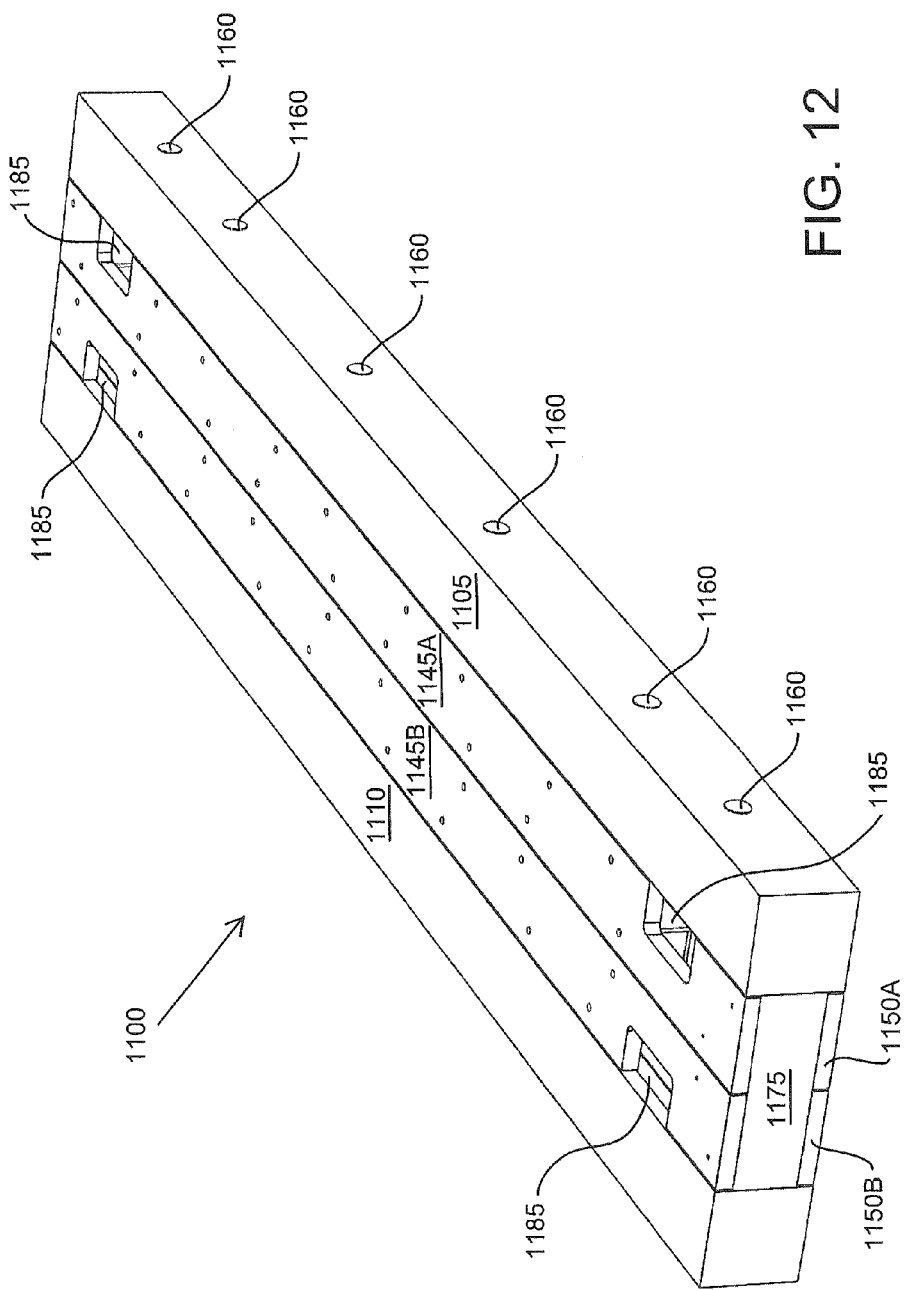
FIG. 12 is a perspective view of another embodiment of a mat according to the present invention.
Figure 13:
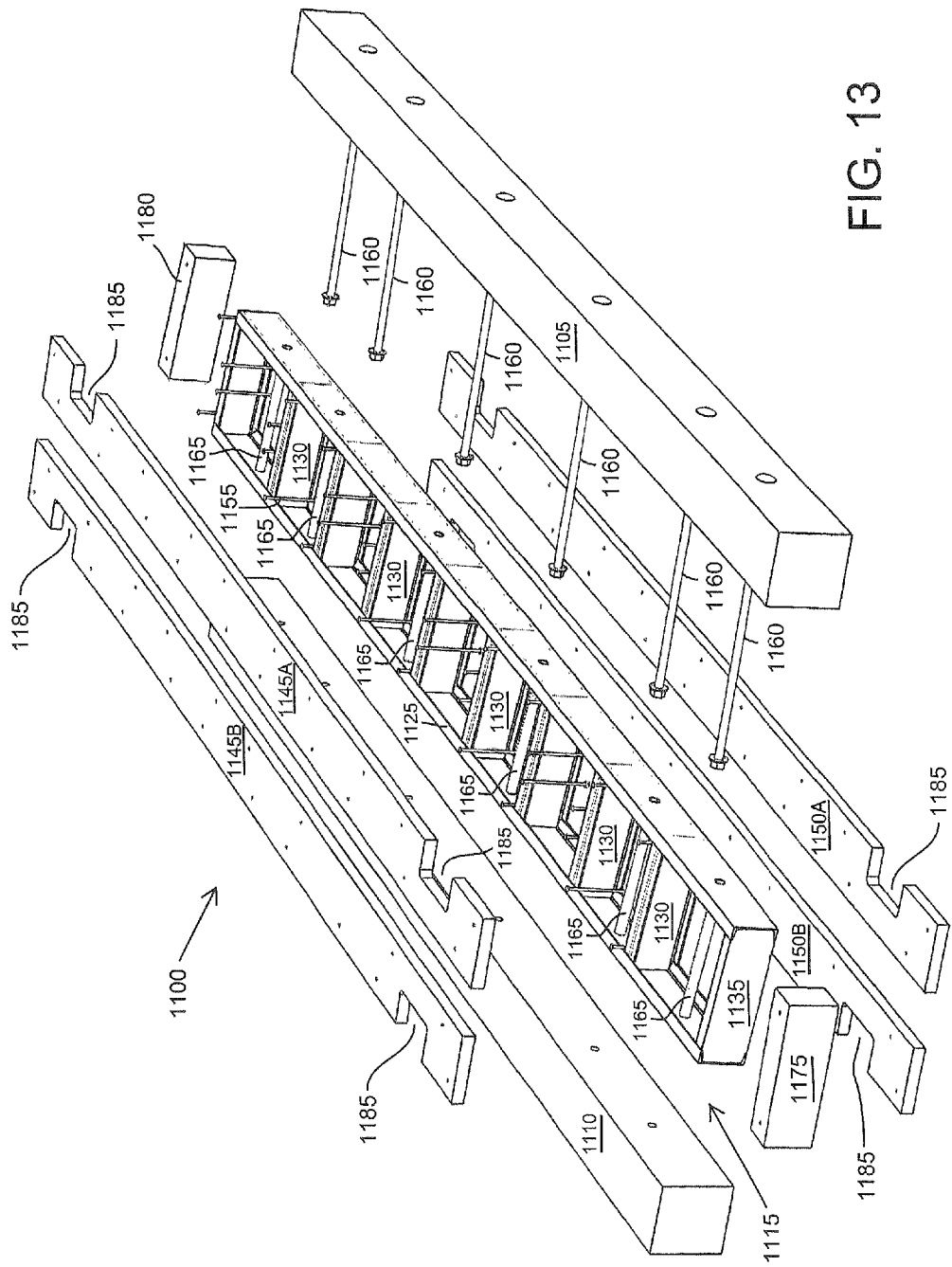
FIG. 13 is an exploded view of the mat of FIG. 12 to illustrate the various components present therein.

FIGS. 12 and 13 illustrate a first embodiment of the invention in the form of a mat 1100 having substantially flat top and bottom surfaces. Although the bottom surface of the mat is not shown in these figures, the mat is preferably made with the same structure on both surfaces so that either one can be used as the upper surface of the mat that is to receive equipment or vehicles thereon. While this facilitates installation in that there is no requirement for placement of the mat in a particular orientation, it also allows the installer to select the surface of the mat that is in better condition to be used as the upper surface of the mat.

The mat 1100 includes first and second side beams (1105, 1110) having top, side and bottom surfaces, with the beams having width and height dimensions of between 6×6 inches and 24×24 inches and a length of at least 4 feet and typically between 10 and 60 feet. Preferably the lengths of the beams are in the range of 20 to 40 feet and preferably 30 to 40 feet as these length mats are easier to transport and ship compared to longer mats. Other dimensions that are typically used for the side beams are 8×8, 10×10, 12×12, 14×14 and 16×16 although a skilled artisan can select other dimensions as desired.

Typically, the widths and heights of the side beams are of the same dimension so that the beams have a square cross-section. Alternatively, for certain designs, the beams may be rectangular in cross section, with the width being about twice the dimension of the height or vice versa. Other typical dimensions are 6×12, 6×18, 8×10, 8×12, 12×14, 12×16, 12×24, and 18×24. These rectangular beams may be connected to the support structure with the longer side as the height or with the longer side as the width, depending upon the desired use of the mat. Using the longer side as the width is generally preferred for interlocking mat arrangements.

A support structure 1115 is located between and connecting the first and second side beams (1105, 1110), with the support structure having upper, lower and side portions, a height that is less than that of the side beams, a width and a length. The support structure, which is set forth in more detail in FIG. 14, includes first and second longitudinal members (1120, 1125) that are joined together by a plurality of cross members 1130.

The support structure 1115 may be made of steel components with the cross members 1130 welded to the longitudinal members 1120, 1125 to form a ladder type structure which forms a frame for the support structure. At the front and rear ends of the frame, additional cross members 1135, 1140 may be provided to form a peripheral rectangular structure. For this embodiment, it is preferred that both the longitudinal members and additional cross members 1135, 1140 be C-shaped beams having a relatively flat plate with upper and lower flanges directed away from one side of the plate. The surface of the flat plate opposite the flanges of the longitudinal members faces the side beams 1105, 1110 so that a close and secure connection can be made between the two. The flanges of the C-shaped beam also serve as a point of connection for elongated members (1145 A, 1145B: 1150A, 1150B). Bolts 1155 can be attached to the flanges or to the cross members for this purpose. The flanges of cross-members 1135, 1140 also face the interior of the support structure so that the ends of the ladder frame have relatively smooth faces.

Figure 14:
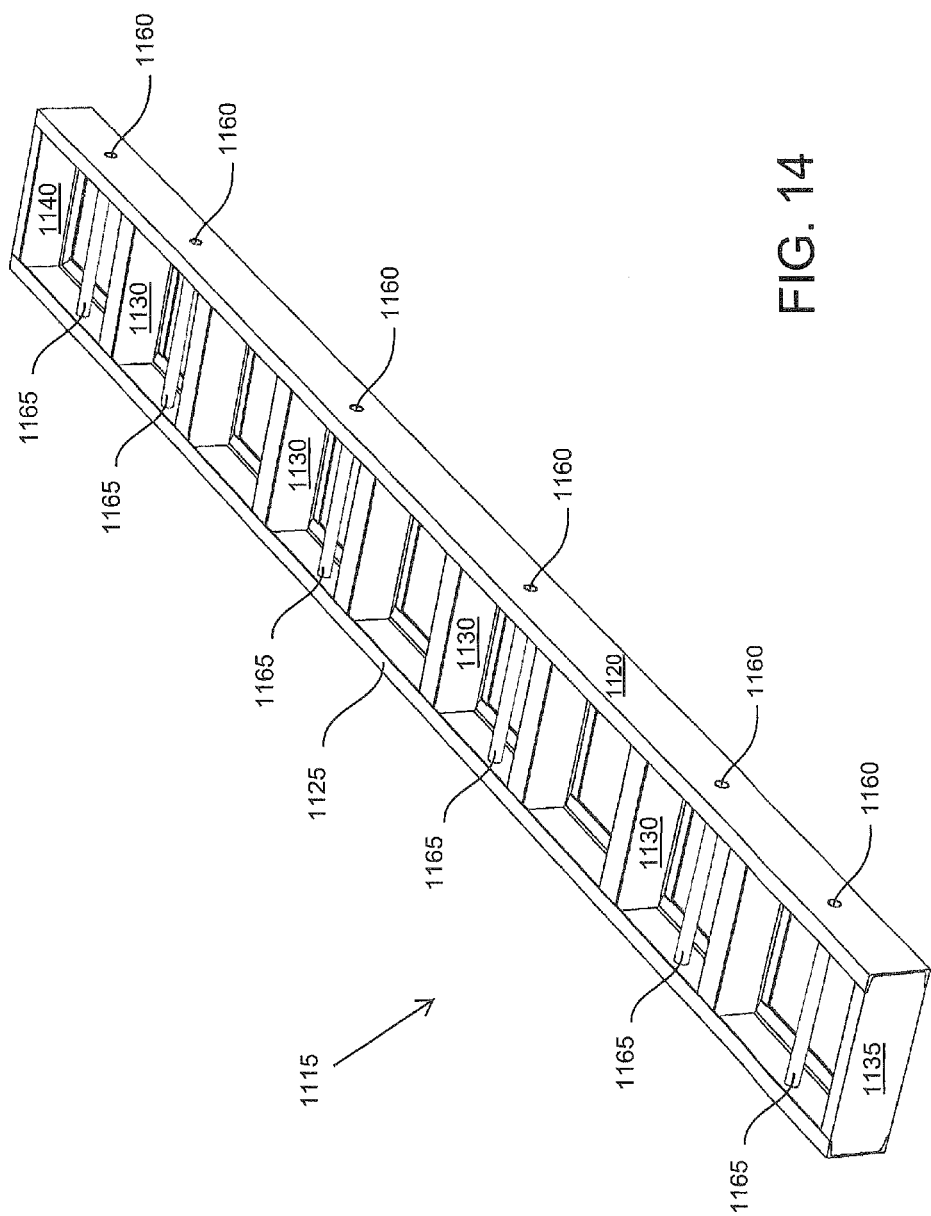
FIG. 14 is a perspective view of the support structure for the mat of FIG. 12.

The cross members 1130 can be attached to the C-shaped beam between the top and bottom flanges to form vertical connectors of the support structure that provide the desired strength and rigidity. As shown in FIGS. 13 and 14, the resulting structure is a rectangular box frame with spaced cross members on the front, back, top and bottom.

The cross members 1130 of the support structure greatly contribute to the stiffness and rigidity of the frame. These members are typically spaced 12 to 24 inches apart for support structures that are used for the smaller sizes of height and width beams. For larger size beams, the spacing can be reduced to 10 to 16 inches in order to provide sufficient strength to hold the mat together. The determination of the spacing of the cross members can be calculated for any particular size mat using generally known engineering guidelines and equations so a more detailed explanation is not needed herein. The cross members typically have a height that is at least half the height of the longitudinal members to which they are attached and preferably are about the same height as the longitudinal members. If desired, reinforcement members can be added to the structure. In one such arrangement, additional plates, rods, beams or other structural components can be added to the top and/or bottom portions of the support structure between the longitudinal members. This is certainly advantageous when supporting the largest or heaviest equipment on the mat. Also, other structural members can be provided between the cross members however in most situations this is not necessary. If additional reinforcement is needed, care must be taken for positioning such members to avoid blocking or interfering with the passage of the joining rods through the longitudinal members and into the support structure.

The C-shaped beam and cross members are typically made of a metal such as steel so that the structure can be made by welding the cross members to the beams. While the preferred construction of the metal frame of the support structure is by welding, the frame components can instead be joined together by brazing, rivets or bolting if desired depending upon the size and configuration of the overall support structure. Instead of a C-shaped beam, a flat plate (i.e., one without flanges) of the appropriate thickness can be used. For this arrangement, the cross members may have an I-beam shape to provide further strengthening of the support structure. A C-shaped steel beam is preferred for the longitudinal members, however, because the flanges provide additional rigidity and support to the structure as well as support for the cross members during installation. Of course, this can be compensated for by using a thicker flat plate for the longitudinal members when that embodiment is to be used. And the I-shaped beams can be used for the cross member when a C-shaped longitudinal member is used, with appropriate adjustments made where the flanges of each come into contact with each other.

When the components of the support structures are made of metal, steel is typically used as that material is readily available and of low-cost. Although not necessary for most applications, the support structure can instead be made of a more corrosion resistant material such as stainless steel, copper, bronze, or other alloys. When carbon steel is used, however, the corrosion resistance can be enhanced by painting or coating the structure so that it would be more resistant to moisture. Also, steel can be galvanized or provided with another type of protective coating so that it would have a lower tendency to rust when contacted by moisture.

Aluminum or titanium can also be used for the support structure in specialty applications. All of these materials generally have higher cost than steel and can present joining the problems of greater difficulties in welding or brazing the cross members to the longitudinal members. It is possible in an alternative embodiment as noted to use rivets or bolting to connect the various longitudinal and cross members together to form the frame of the support structure. The sizing of the rivets or bolts as well as the dimensions for the welding and brazing, can be readily determined by a skilled artisans using routine testing if necessary. The same is true for the thickness of the beams or members that are used in the frame structure.

Alternatively, the support structure may be made of a fiberglass reinforced thermosetting plastic material resin, which is typically a polyester or epoxy resin. The components of the structure may be pultruded in the form of a rectangular or square tube which may be hollow or filled with other materials depending on the overall weight and compressibility desired for the construction.

When fiberglass reinforced thermosetting plastic material is used to form the support structure, the box or ladder frame can be prepared in the desired shape with the cross members and longitudinal members joined together with resin prior to curing. It is also possible to utilize bolting or other mechanical fasteners to connect these components together.

A plurality of joining rods 1160 are used to attach the side beams to the support structure, with the joining rods passing through the sides of the beams and support structure. These joining rods 1160 are typically large carriage bolts that include threaded ends to receive nuts that when assembled will hold the components together. These rods are spaced about 3 to 6 feet apart depending upon the size of the mat. FIG. 13 shows the rods 1160 passing through side beam 1105 and toward the side structure: FIG. 14 shows how the rods 1160 would appear when present in the support structure. These carriage bolts are typically made of a high strength steel. Also, in some embodiments, the beams can include a sleeve that facilitates passage of the bolts through the support core. The sleeve can be a flanged hollow tube that extends through the support core and if desired into one side beam and part of the opposite side beam. The tube would terminate in the opposite beam so that it would not interfere with the net that engages the threaded end of the bolt. The sleeves are shown in FIG. 14 as elements 1165.

To form a substantially flat surface on the mat, various elongated members for upper and lower elongated members (1145A, 1145B, 1150A, 1150B) are provided. A first plurality of elongated members (1145A, 1145B) are attached to an upper portion of the support structure 1115 while a second plurality of elongated members is attached to a lower portion of the support structure 1115. Thus, the top surface of the mat is formed by the top surfaces of the side beams 1105, 1110 and the first plurality of elongated members 1145A, 1145B, while the bottom surface of the mat is formed by the bottom surfaces of the side beams 1105, 1110 and the second plurality of elongated members 1150A, 1150B. The flat top surface of the mat is best shown in FIG. 12.

As the upper and lower surfaces of the mat must be somewhat uniform, the support structure and upper and lower elongated members generally have a combined height that is the same as that of the side beams. Typically, the support structure is centered vertically with respect to the side beams. As an example, the side beams can be 12×12 and the support structure would have a height of 8 inches so that the beams extend 2 inches above the top of the support structure and 2 inches below the bottom of the support structure. This provides room on the top and bottom of the support structure to accommodate 2 inch thick elongated members so that the top and bottom of the mat has substantially uniform surfaces. This type construction is preferred in that it minimizes the different types of thickness that need to be used for the elongated members and also provides a symmetrical mat that be oriented with wither surface facing up to receive equipment thereon. In other embodiments, different thicknesses of elongated members can be used on the top than on the bottom with the intent being that the thinner members are used on the bottom to prevent dirt or other materials from entering the support structure, while the elongated members on the top surface are provide to support the equipment or vehicles that are located or move upon the mat. In this embodiment, it is possible to provide a flat plate on the support structure of the lower surface rather than elongated members.

The same is true for the ends of the support structures. The longitudinal members 1120, 1125 can be shorter than the length of the side beams 1105,1110 by a distance of about 1 to 24 inches on each end or by a total of 2 to 48 inches. The distance of the shortened ends can correspond to the width of the side beams, if desired. The space between the shortened ends of the support structure 1115 and the side beams can be filled in with bumper members 1175, 1180 which then allow the mat to have substantially flat front had rear ends. These bumper members can be of the same width as the elongated members so that the same material for the elongated members can be used to provide bumper members for the front and rear of the support. This creates a symmetrical structure but different thicknesses of the bumper members can be used if desired.

Alternatively, in FIG. 12, timbers 1105, 1110 can instead be made of a plastic material. In one embodiment, the entire timber can be made of a thermoplastic material. As it is sometimes difficult to obtain such large sections of one solid material, it is less expensive and easier to produce the same size timber in multiple layers of thinner sheets of the thermoplastic materials. The sheets can be joined together by welding, and adhesive or by the rod members 1160 that extend through the width of the mat.

Another possibility for these large size timbers would be to make a box structure of a fiberglass reinforced plastic material which can be prepared by hand or with pultruded tubes. It is also possible to fill in the hollow tubes with any one of a variety of filler materials including crumb rubber, foam, pellets, gravel, sand, dirt or any other material necessary to provide further strength and impact resistance to those components. Elastomeric materials such as vulcanized rubber can also be prepared as a solid material, in layers, or in the form of an elongated tube. And while the drawing shows the timbers as being rectangular or square in cross-section, it is also contemplated in this invention that the timbers 1105, 1110 can be prepared with one flat side to meet and join with the inner timbers 1145A, 1145B and with the opposite side having a rounded or different outward configuration. Of course, the rectangular or square configuration is preferred when mats are to be placed adjacent each other to provide a decking or platform rather than being aligned end to end to make a temporary roadway.

In a less preferred embodiment, the longitudinal members 1120, 1125 can be substantially the same length as that of the side beams 1105,1110 so that the front and rear cross members 1135, 1140 form with the ends of the side beams the front and rear end surfaces of the mat.

The mat must also provide sufficient load bearing capacity: A fully supported mat (one that is properly installed on a suitable prepared ground surface) must be able to withstand a 10 ton load, spread over a 12 inch diameter surface without degradation of mat properties or permanent deformation of the mat. The support structure would have a crush resistance of between about 500 and 800 psi to possibly as much as 1000 psi depending upon the application and when properly installed on a suitably prepared ground surface. This provides resistance against compression as large vehicles or equipment move over or are placed upon the mat.

The side beams of the mat prevent or reduce damage to the support structure from side entrance or egress onto the mat from large vehicles with steel tracks. These beams can be replaced when necessary while the support structure can be reused to make a new mat.

The elongated members as well as the side beams are preferably made of any type of wood although oak is typically preferred. These members may also be made of engineered wood or lumber since that will be easier to make long lengths without having to obtain one piece virgin wood lengths. Additionally a layered veneer laminate can also be used for these members or beams. It is expected that the cost for that material would be about the same as the price for oak thus making it an attractive alternative.

Engineered lumber (or engineered wood) includes a range of derivative wood products which are manufactured by binding or fixing the strands, particles, fibers, or veneers or boards of wood, together with adhesives, or other methods of fixation to form wood composite materials. These materials provide the surprising benefit of repeatable consistency of the required sizes, the ability to mix different wood species to arrive at the final product, and exceptional properties generally exceeding what is provided from monolithic boards.

There are three types of engineered wood that can be used in the present invention:
  parallel strand laminate (PSL), which is a beam that can be manufactured up to about 12×12 inches in any length due to the production of the beam by a continuous process;
  layered stand laminate (LSL), which is a billet that can be made at thicknesses of from about 1 to 4 inches, in widths from about 2 inches to 54 inches, and in lengths of about 8 to 64 feet; and
  layered veneer laminate (LVL) which is also a billet that can be made up to about 4 feet square by any length.

Alternatively, the side beams and elongated members may be made of a fiberglass reinforced thermosetting plastic material such as fiberglass reinforced polyester or epoxy resins. These materials may be pultruded into a solid form or preferably as a rectangular or square tube. If desired, hollow tubes can be filled with any one of a variety of materials to contribute to the overall strength or compression resistance of the tube. Typically, crumb rubber, recycled tires or other plastic or elastomeric materials, sand, crushed rock or polyurethane foam may be provided inside the tube either before or after attachment to the support structure. A polyurethane foam is preferred for this purpose as it can be injected in a liquid form after the pultrusion is attached to the support structure. For stronger or heavier filler, the joining rods may be initially placed into the beam so that the filler does not block the insertion of the rods when joining the side beams to the support structure. Additionally, a metal or pultruded plastic tubular sleeve can be provided in the beams at the locations where the rods are to be inserted, so that the rod has an opening that remains after the filler is placed into the beams.

As these mats are relatively massive, provision should be made for moving, transporting and installing the mat at the desired field location. For this purpose, holes are provided in the upper surface, lower surface, or both to provide access to one or more of the joining rods. These holes are formed as cut out portions 1185 of the elongated members 1145, 1150. In this way, the holes allow access by a hook from a crane or other mechanical attachment to the joining rods for lifting or manipulation of the mat. For convenience, the attachment openings 1185 are provided both on the upper and lower surfaces of the mat so that either surface can contact the ground or be exposed on top as the surface upon which the equipment is to be installed, thus facilitating installation.

Figure 15:
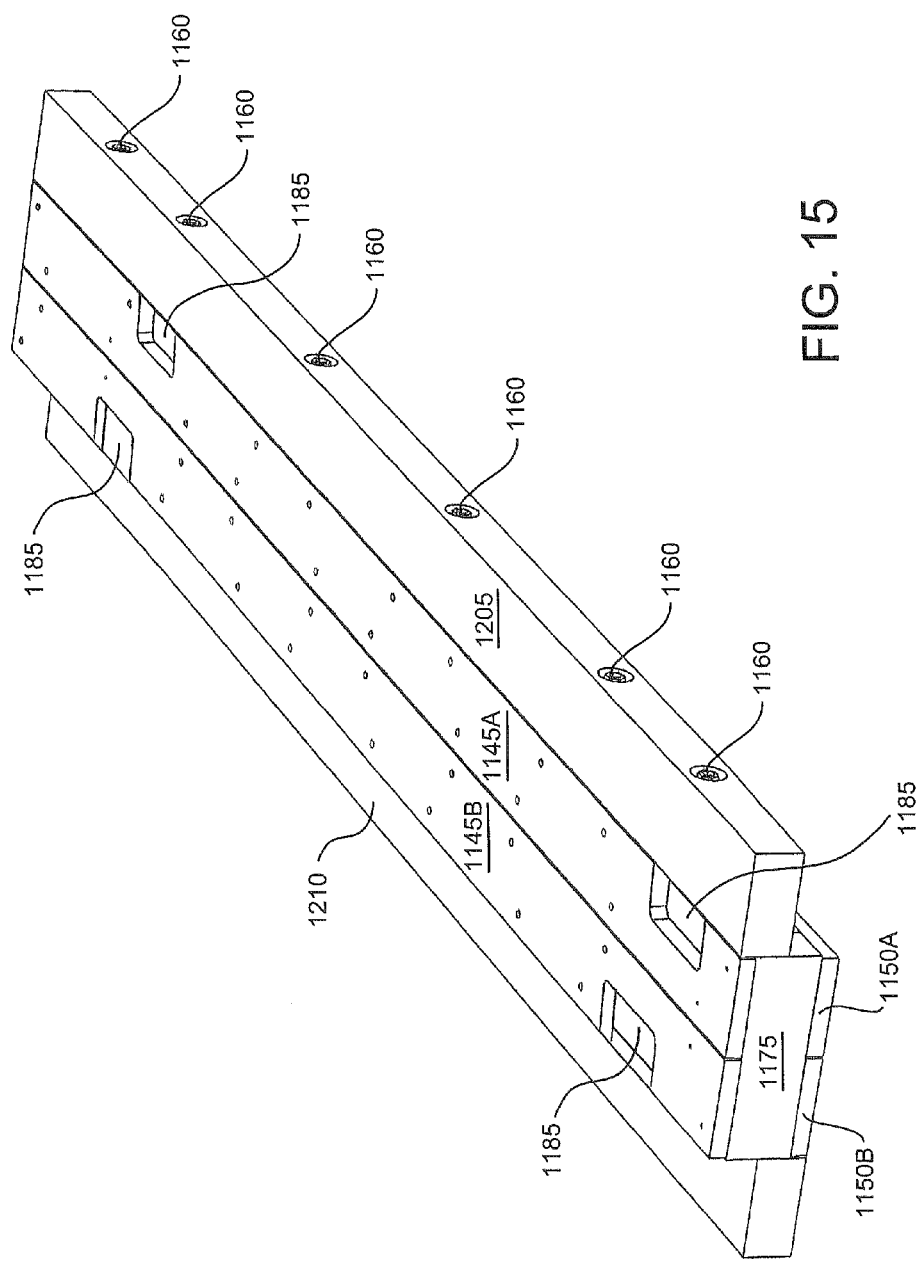
FIG. 15 is a perspective view of yet another embodiment of a mat according to the present invention.
Figure 16:
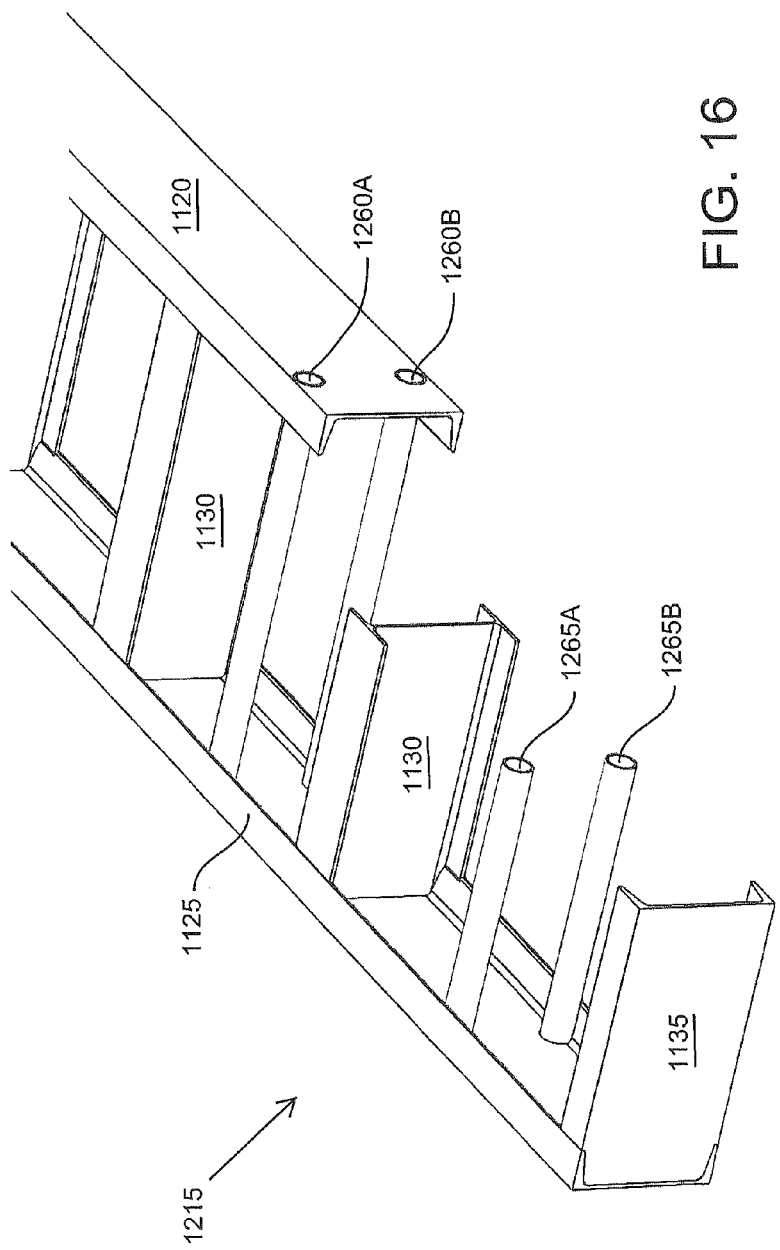
FIG. 16 is a partial sectional view of the support structure for the mat of FIG. 15.

Turning now to FIGS. 15 and 16, an alternative embodiment of the present invention is illustrated, in the form of a mat having side beams configured and dimensioned to allow interlocking of adjacent mats. Where like components are used from the previous embodiment, the same reference numerals will be used in FIGS. 15 and 16 and only the different features of this alternative embodiment will be described.

Mat 1200 includes side beams 1205, 1210 which are configured and dimensioned to represent only one half of the thickness of the mat. On one side of the mat, beam 1205 is attached to the upper portion of the support core 1215. This is done in a manner to extend the upper surface of beam 1205 above the top surface of the support structure 1215. As in the prior embodiment, elongated members 1145A, 1145B can be provided on the top portion of the support structure 1215 so that the top surface of the mat adjacent the side beam 1205 is relatively flat. In a similar manner, side beam 1210, which also has a thickness that is one half the thickness of the entire mat, is mounted to a lower end of the support structure 1215. The lower surface of side beam 1210 extends below the lower surface of the support structure to allow elongated members 1150A, 1150B to be accommodated to form a substantially flat surface for the bottom of the mat adjacent beam 1210.

This structure allows one mat to be initially placed on the ground with an adjacent mat placed such that beam 1205 sits upon beam 1210. This arrangement can be continued for as many mats as necessary to achieve a desired working base for cranes or other equipment.

The top surface of mat 1200 has a step on the opposite side from beam 1205, above beam 1210, while there remains an open space or step below beam 1205 adjacent the lower surface of the mat opposite beam 1210. While these surfaces allow interlocking of adjacent mats, it does not provide a stable mat surface on the outermost sides of the working base. To compensate for this, modified mats can be provided wherein the outermost end mats on one side of the working base can be made with beam 1105, which is the full thickness of the mat, on one aside and with beam 1210 on the opposite side to allow interlocking with adjacent mats that are configured like mat 1200. Similarly, the outermost end mats on the opposite side of the working base can be made with beams 1110 instead of 1210 on one side beam 1205 on the opposite side.

Alternatively, when the full extent of the entire working base is not known, of if an insufficient number of modified mats are not available, the mats on the outermost sides of the final working base can be provided with stabilizing beams of the same size and dimensions as beam 1205 provided in the space below attached beam 1205 so that the side of the mat can be stabilized. The same thing can be done for the outermost mats that have a step above beam 1210. A separate stabilizing member can be provided of the same size as beam 1210 to finish the upper surface of the mat at those locations. The stabilizing members can be attached to the beams of the mat if desired.

Mat 1200 requires a different system for connecting the beams 1205, 1210 to the support structure 1215. The connection of beam 1205 to the support structure 1215 will require that the joining rods 1260A pass through an upper portion of the support structure, whereas beam 1210 is connected to the support structure with joining rods 1260B passing through the beam and a lower portion of the support structure 1215. This is best shown in FIG. 16 where the relative positions of the joining rods 1260A, 1260B are illustrated, along with sleeves 1265A, 1265B. A number of additional features may be provided in the mats of the present invention.

The beams or timbers 1205, 1210 of FIG. 15 can also be made of plastic or elastomeric material. This gives the further advantage of allowing the mats to interlock when placed adjacent each other side-by-side. Alternatively, the last mats of the platform can be configured with a full size timber or bumper member on the side of the core structure that is not conjoined to an adjacent mat so that the top surface is fully supported by the timber or bumper member.

Figure 17:
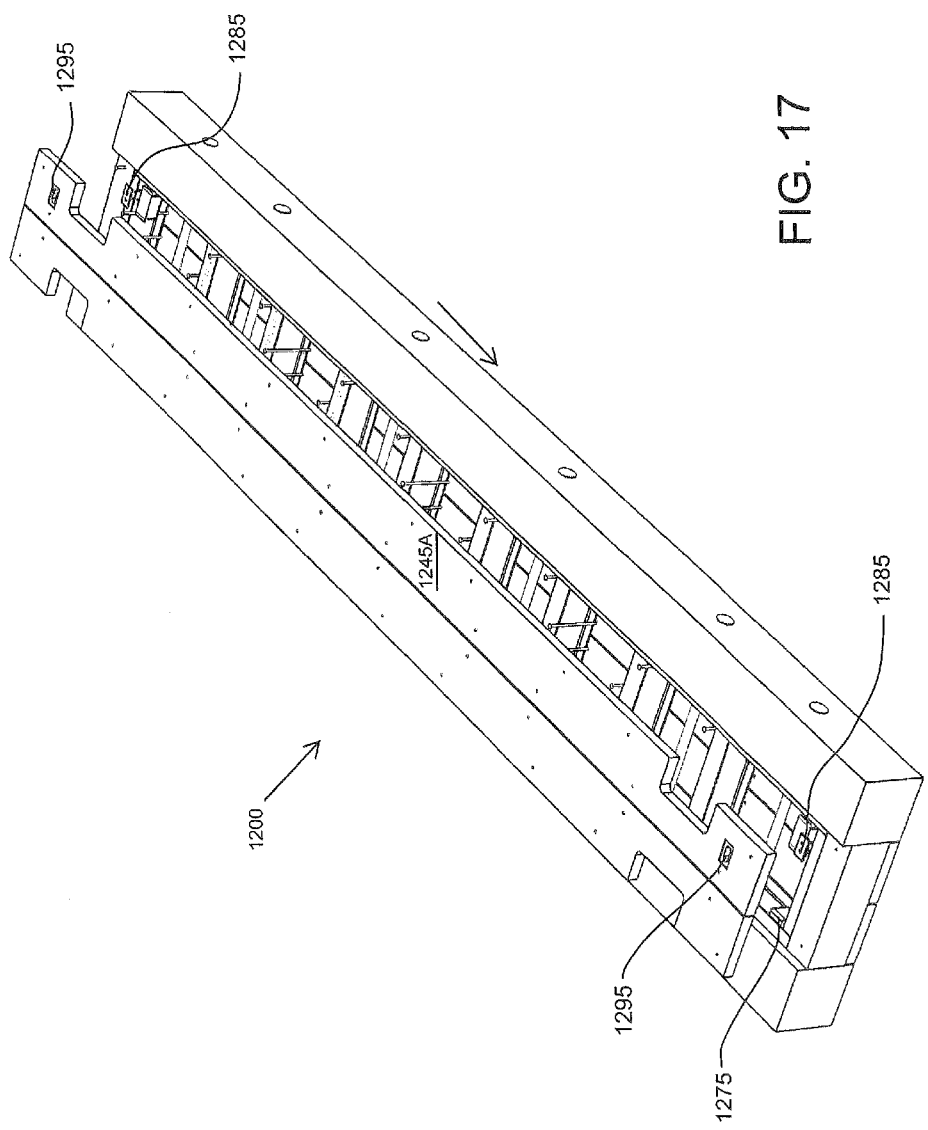
FIG. 17 is a view of certain peripheral components for the mat of FIG. 12.

FIG. 17 illustrates a further variation of the invention, wherein mat 1200 includes an radio frequency identification (RFID) tag 1275 which is located in the core. Alternatively, this RFID tag 1275 can be embedded in an outer layer in an opening or a routered pocket to enable the mat to be monitored in an inventory system or when rented for use. The tag provides a unique identification serial number for each mat, such that the mats which are being used or rented can be tracked and accounted for as to location of use. The mats can be scanned when in a warehouse, when loaded on trucks for delivery, when delivered to a job site, or when collected from a jobsite after use. The RFID tags can be active or passive and if desired, other tracking devices such as barcodes could similarly be for the same purposes. It is preferred, however, that the RFID tag be embedded in the outer layers or core structure of the mat so that it is protected from damage during use. When a barcode or other surface mounted tag or indicia is used, it should be placed on a surface portion of the mat that is less likely to experience wear or abuse. Thus, the tag may preferably be applied onto the side of the mat so that it is not directed exposed to traffic on the mat. It also may be covered with a plexiglass film to prevent its removal by abrasion.

In order to manipulate the mats for loading/unloading, or moving from one location to another or for installation and retrieval, the mats can include a retractable lifting element. This can be the lifting elements described above and those elements lie in a recess in the top surface of the mat during use for ease of access and to prevent tripping or damage to items moving over the mat or damage to the lifting elements themselves. Alternatively, a more complicated design such as that of US patent publication 2008/0292397 can be used.

To assist in the use of the mat during the night or on days that are dark due to poor weather conditions, the mat may include one or more lighting elements, such as those disclosed in International application WO 2006/048654. These lighting elements would preferably be embedded in the outer layer. FIG. 17 illustrates the locating of LED lights 1285 in the core structure beneath elongated member 1245A. The lighting is covered with a clear material 1295 of plexiglass, so that the lighting element may be better protected against damage during use. To achieve the desired lighting brightness, the skilled artisan can provide the necessary number of lighting elements, or can include lighting elements of larger size.

Another feature of the invention is the use of color coding to identify the specific layers that are used in the construction of the mat. This can also be used to identify mats for a particular customer or end user. When mats are rented or leased, the color coding can be used to identify which mats belong to the leasing company compared to mats provided by others. The color coding can be of a single color or of certain stripes, patterns, dots or other indicia that provides a "signature" that identifies the specific core structure that is present in the mat or a particular end user or owner of the mat.

Figure 18:
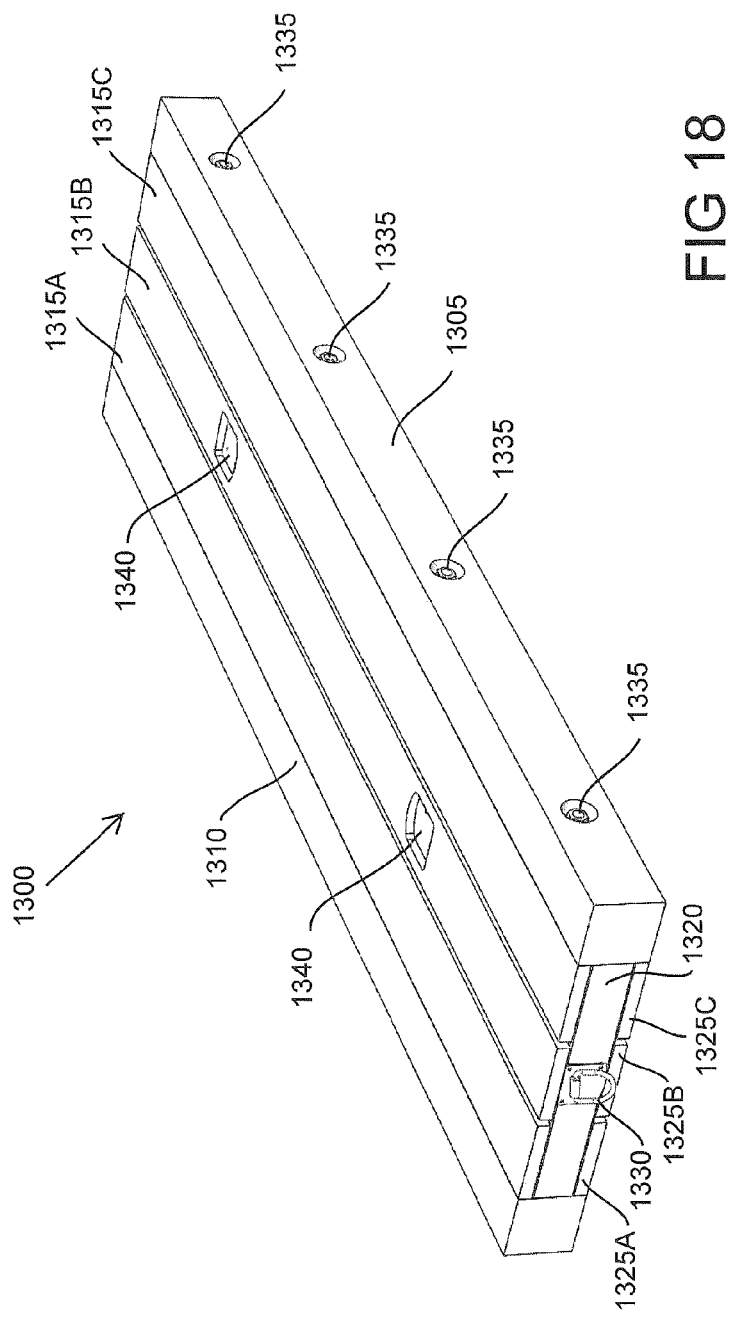
FIG. 18 is a perspective view of a crane or pipeline mat according to the present invention.
Figure 19:
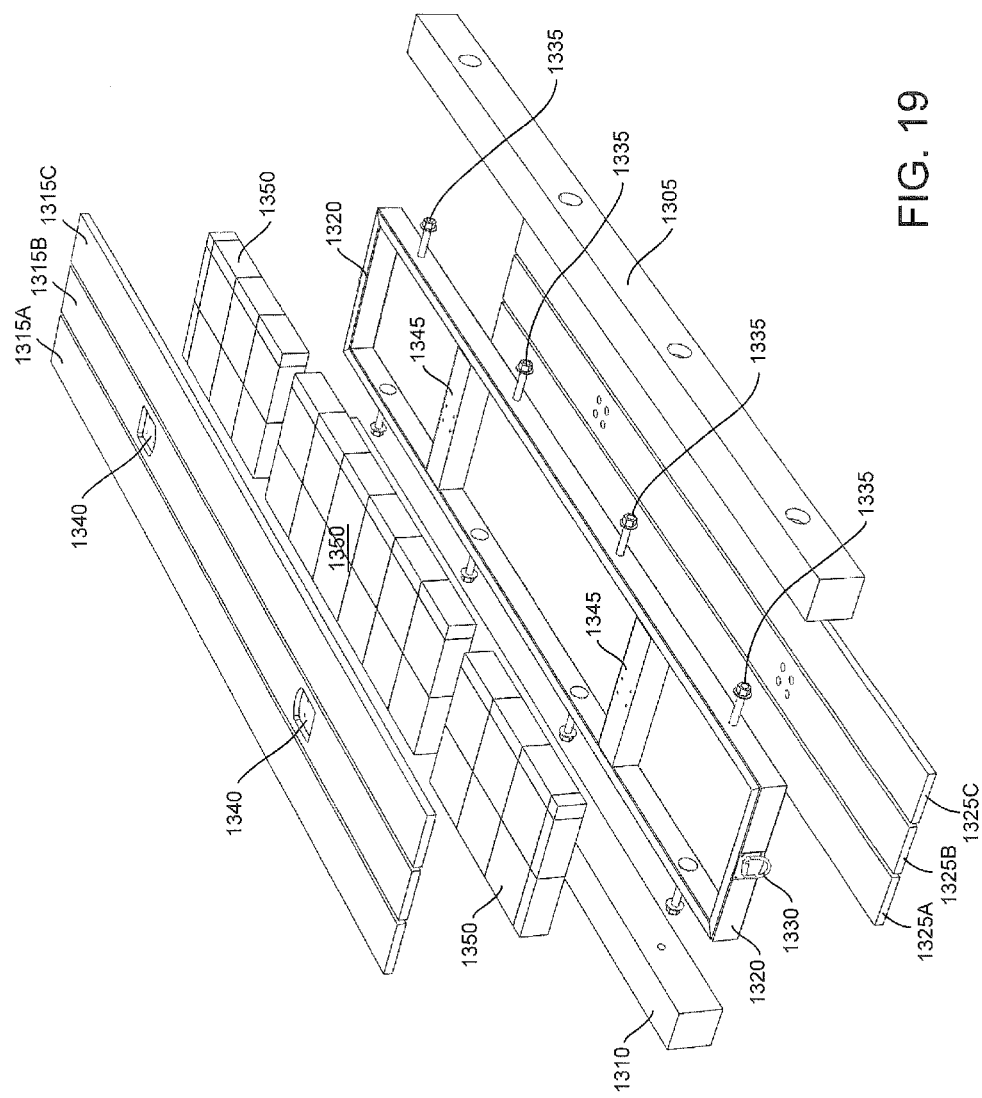
FIG. 19 is an exploded view of the crane or pipeline mat of FIG. 18.

FIGS. 18 and 19 illustrate a crane/pipeline mat 1300 that has a typical thickness of about 8 to 12 inches, a typical width of about 4 feet and a typical length of between 12 and 20 feet. The mat 1300 includes two side beams 1305, 1310, a steel box frame 1320, an upper layer of elongated members 1315A, 1315B, 1315C, and a lower layer of elongated members 1325A, 1325B, 1325C. The core structure can be between 2 and 3 feet wide depending upon the width of the side beams.

The steel frame 1320 includes a forward lifting element 1335 and two upper side lifting elements 1340. If desired, a rear lifting element and two lower side lifting elements (not shown) can also be provided. These lifting elements allowed the mat to be lifted overhead by a crane having a suitable lifting capacity to facilitate loading, unloading, and installing of the mats.

The lifting elements can be constructed as desired. If cables or chains are to be used—any holes made in the mat for such cables or chains must be drilled through the entire mat, and not just looped in between board or component spacings. The chains or cables must have at least three drop forged clamps. Cable must be new ¾ inch steel core, extra improved plow (EIPS), right regular lay wire rope, having a minimum breaking strength of over 29 tons. Chains should be ⅜" high test chain, having a working load limit of 5400 lbs. and a minimum breaking strength of 16,200 lbs. with ⅜ inch double clevis links, in order to provide a safe working load limit of about 5400 lbs.

Other lifting elements may be used, such as those described in U.S. patent application 62/211,664 filed Aug. 28, 2015, the entire content of which is expressly incorporated herein by reference thereto. Those lifting elements can be used with any of the mats disclosed herein provided that the appropriate core structure is present.

The components of mat 1300 are more clearly shown in the exploded drawing of FIG. 19. The steel frame 1320 is shown as having a plurality of components including two elongated side components, a front component, a back component and two cross members 1345, all of which are welded or bolted together to form the frame 1320. Side beam bolting members 1335 are also welded to the box frame 1320. These bolting members are configured to pass through openings in the side beams 1305, 1310 to secure the side beams to the steel box frame 1320. This is done by tightening nuts onto the ends of the bolting members 1335 after they pass through the holes in the side beams. The side beam holes are recessed so that the bolting and nuts do not extend beyond the sides of the beams.

The lifting elements 1330, 1340 are preferably in the shape of a D ring which is welded or bolted to the box frame 1320 or its cross members 1345 as best shown in FIG. 19. The upper layer elongated members 1315A, 1315B, 1315C, and lower layer elongated members 1325A, 1325B, 1325C are also bolted to the box frame 1320.

As the box frame 1320 defines open areas therein, it is best to fill those open areas with material that will contribute to the ruggedness and weight of the mat. In particular, a filler of wood members 1350 that either are scrap pieces from the production of other mats or are end grain or engineered wood can be used. It is also possible to use a less expensive wood material such as treated pine because the purpose of these filler materials is simply to add weight to the mat and they are not exposed to wear or abuse. And instead of wood material, the open areas of the core may be filled with other materials of the types disclosed elsewhere herein.

Figure 20:
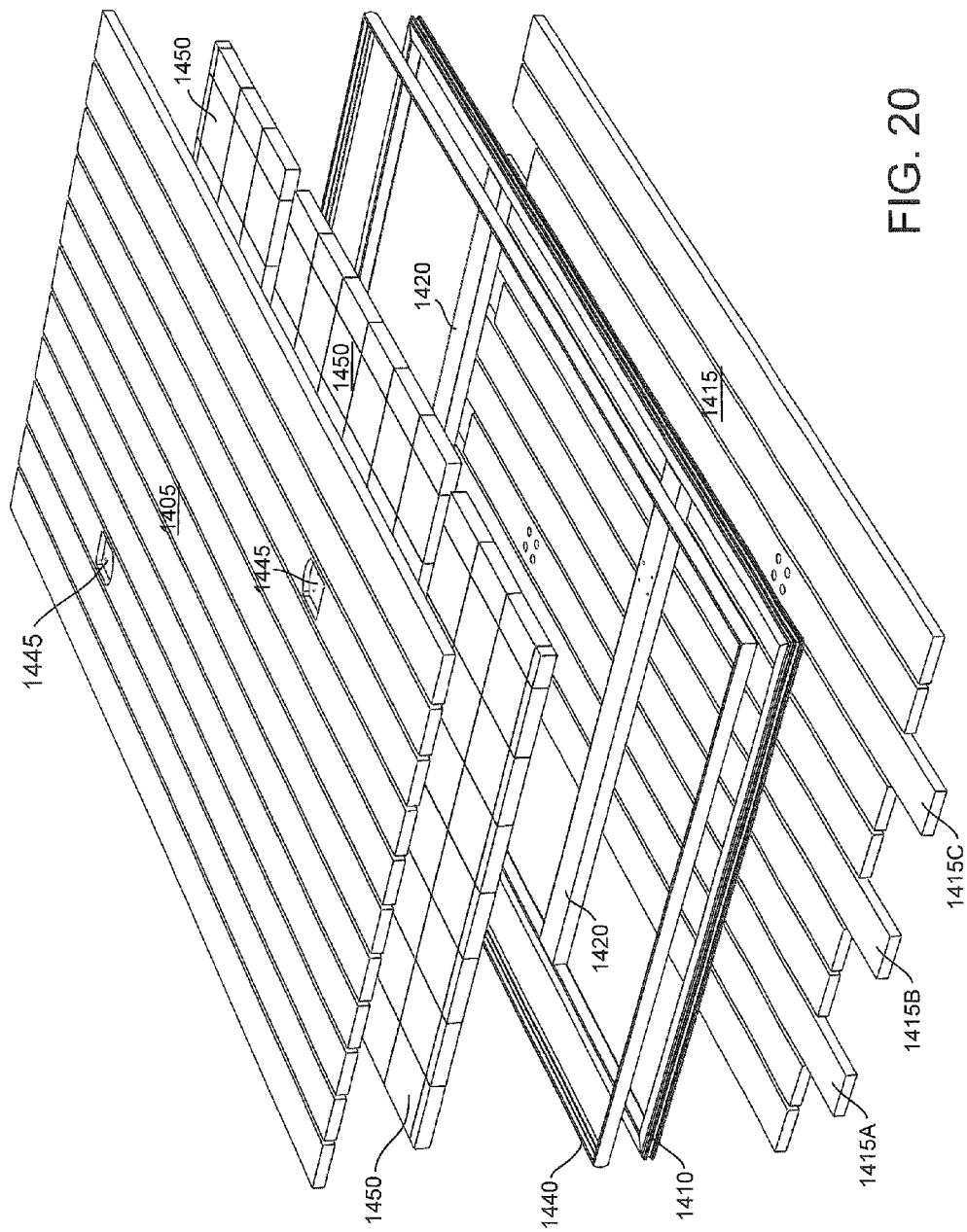
FIG. 20 is an exploded view of an interlocking mat having a steel frame and woodblock core.
Figure 21:
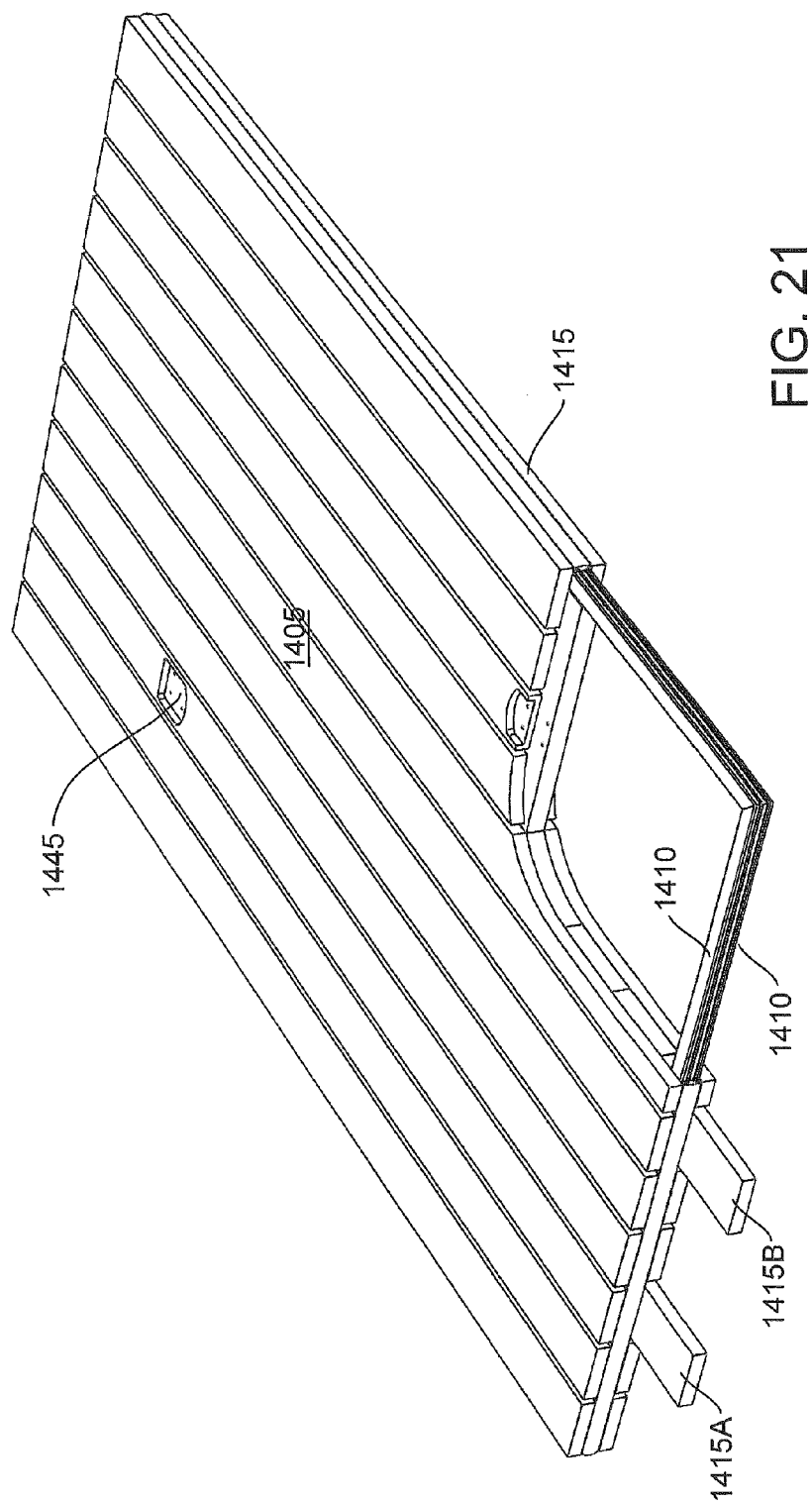
FIG. 21 is a view of the constructed mat of FIG. 20 with a portion of the corner removed to show the welded frame and core structure.

FIGS. 20 and 21 illustrate yet another mat 1400 that includes a steel frame core 1410. The core is used on an interlocking mat that has upper 1405 and lower 1415 layers of elongated members. These elongated members may be made of wood, engineered wood, or of a thermoplastic, elastomeric, rubber, or thermosetting plastic material. The plastic and elastomeric or rubber materials can be used alone or can be reinforced as known in the art to provide additional strength, abrasion or wear resistance or to otherwise improve physical properties. Preferably, wood is preferred as it provides abrasion and abuse protection to the mat at a relatively low cost. And as shown, three elongated members 1415A, 1415B, 1415C of the lower layer are offset from the others to form a configuration for interlocking with an adjacent similarly configured mat as disclosed elsewhere herein.

The steel frame 1410 includes four side members and two cross members 1420 which can be welded or bolted together to form the frame. The open space in the box frame can be filled with material that will contribute to the ruggedness and weight of the mat. In particular, a filler of wood members 1450 that either are scrap pieces from the production of other mats or are end grain or engineered wood can be used. It is also possible to use a less expensive wood material such as treated pine because the purpose of these filler materials is simply to add weight to the mat and they are not exposed to wear or abuse. And instead of wood material, the open areas of the core may be filled with other materials of the types disclosed elsewhere herein.

To protect a steel frame from damage, a rectangular bumper configuration 1440 is provided along all outer side surfaces of the steel box frame.

And as in the other embodiments, D-shaped lifting elements can be 1445 can be provided in various locations on the top and bottom of the mat in positions where they can be welded to the cross members 1420 of the steel frame. These would allow lifting of the mat and transport as well as placement into the appropriate locations during installation.

Figure 22:
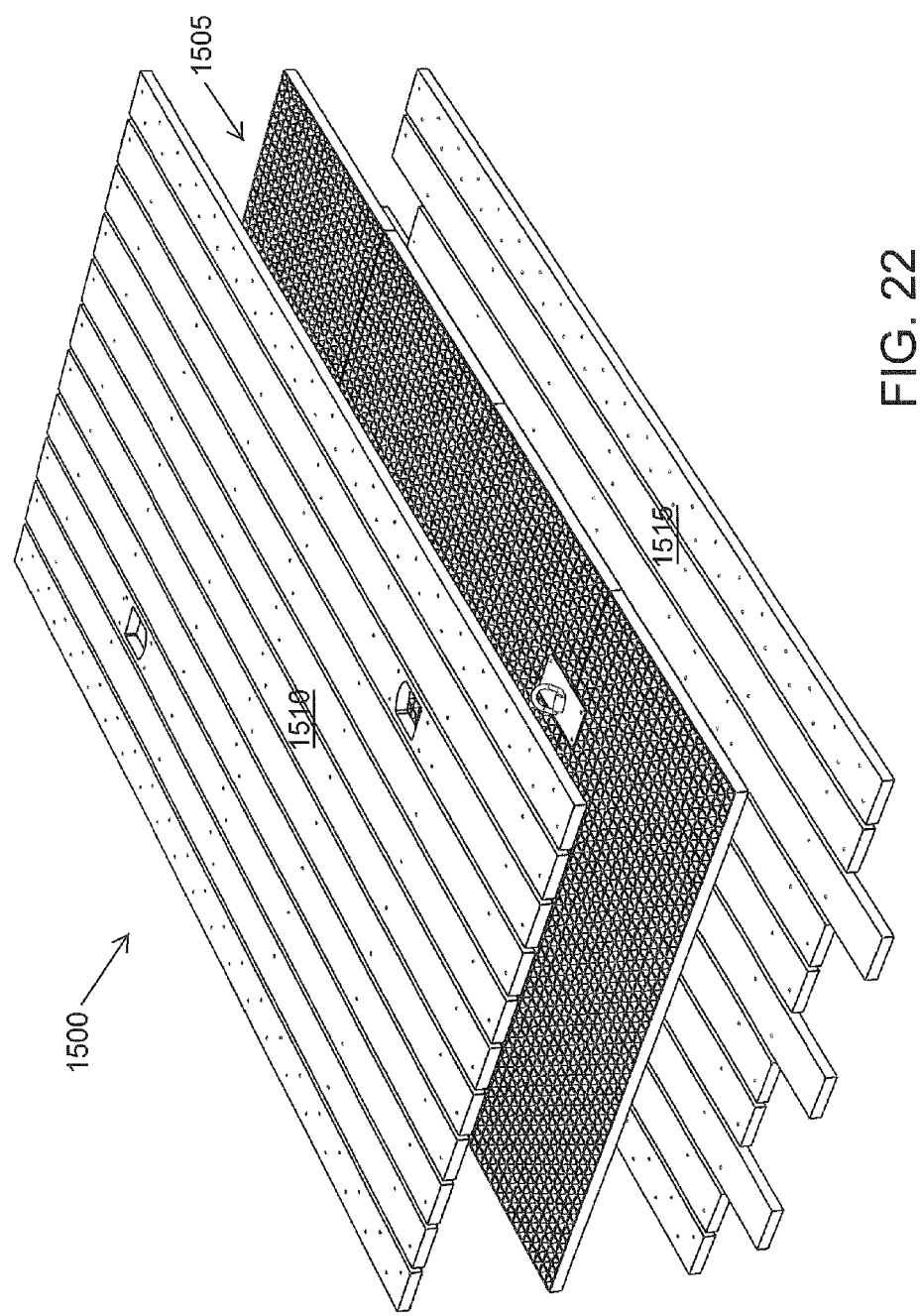
FIG. 22 is an exploded view of an interlocking mat having a grating of a fiberglass reinforced thermosetting material.
Figure 23:
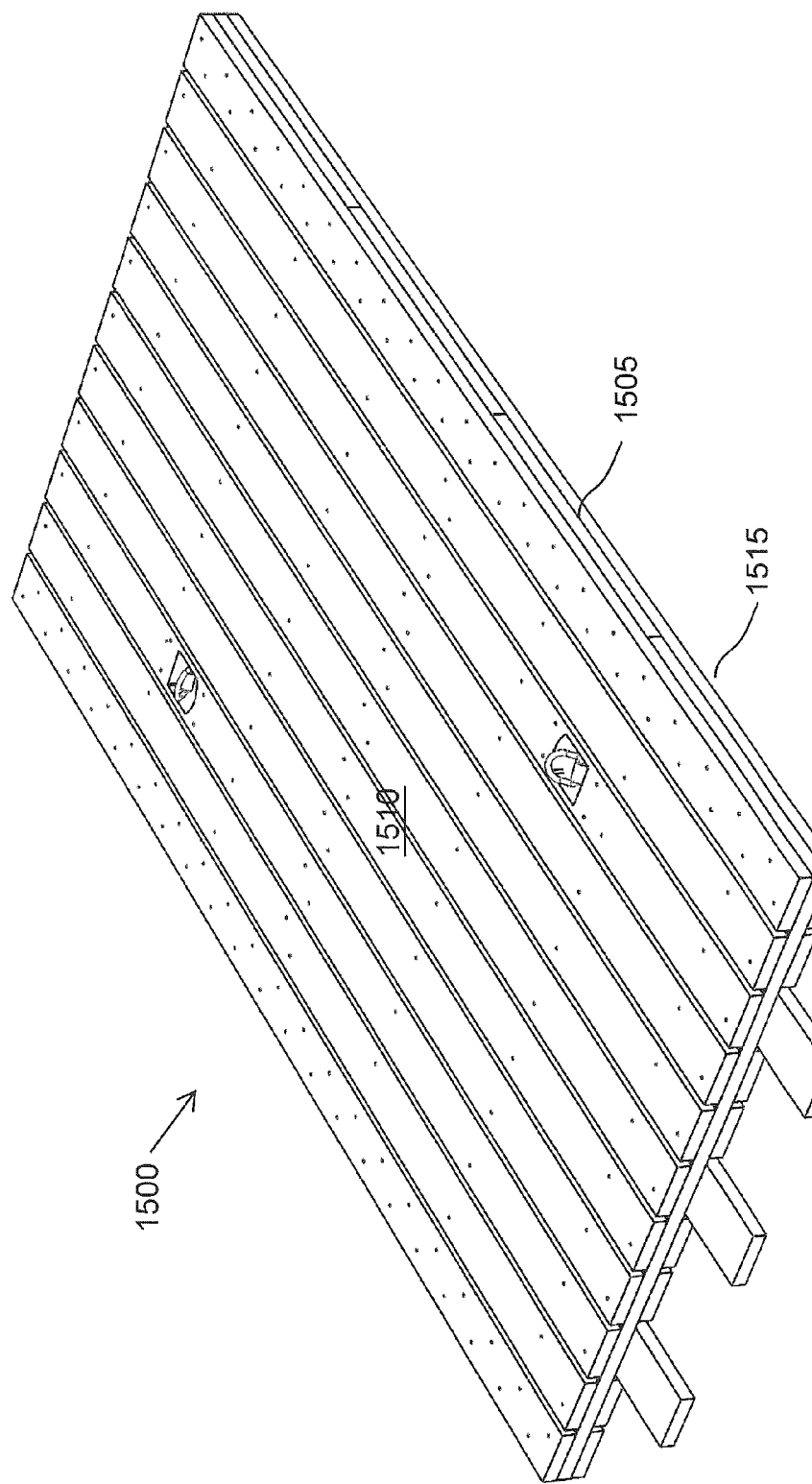
FIG. 23 illustrates the assembled mat of FIG. 22.

FIG. 22 illustrates a preferred embodiment of the invention wherein the environmentally resistant core of the mat 1500 is a fiberglass reinforced polyester or epoxy grating 1505 having a thickness of 3 inches and with grating openings of 2×2 inches. The same upper 1510 and lower 1515 wood structures of FIGS. 20-21 can also be used for this mat, with all of the components bolted together. As noted herein, the grating can have a greater or lesser thickness ranging from about 2.5 to 4 inches in thickness with openings of between 1.5×1.5 inches and 3×3 inches. Of course, it is also possible to utilize a solid fiberglass reinforced thermosetting resin sheet of the thicknesses mentioned herein either by itself or with apertures or openings cut therein. As shown, the bolting would pass through the entire construction in order to provide the greatest strength and are placed in recessed holes so that the bolts and nuts do not extend past the upper and lower surfaces of the mat.

For alternative embodiments to FIG. 22, the grating can instead be a metal sheet with apertures therein to reduce the weight of the mat. The metal sheet can be 2 inches thick with openings both for the bolts that are used to join the mat components together as well as with additional openings to reduce the weight of the sheet. The openings can be random or uniform and can range from 1 to 6 inch in diameter for circular openings and from 2×2 to 4×4 inch rectangular or square openings. A metal grating or welded rod arrangement can also be used if desired.

From the foregoing, it is seen that there are numerous combinations and arrangements of new and useful mats that include an environmentally resistant core structure. Certain additional specific embodiments include the following combinations of a mat components:

(1) a top outer layer of elongated wood or laminated wood members; a core construction of elongated thermoplastic boards or monolithic units of a sheet or molded structure, and a lower outer layer of elongated wood or laminated wood members. The thermoplastic boards would preferably be HDPE boards about 2 inch×8 inch by 8 feet, while the monolithic unit would be made of HDPE, sized 8 feet×12, 14 or 16 feet long and about 2 inches thick, with a flat, closed cell or open cell geometry. The wood members would be about the same size as the HDPE boards.

(2) a top outer layer of elongated wood or laminated wood members; a core construction of elongated a thermoplastic monolithic unit of a sheet or molded structure, and a lower outer layer of elongated thermoplastic boards. The thermoplastic would preferably be HDPE for the monolithic unit and/or the boards, while the size of the monolithic unit would be 8 feet×12, 14 or 16 feet long and about 2 inches thick, with a flat, closed cell or open cell geometry, and wherein the elongated members would be about 2 inch×8 inch by 8 feet. Again, the wood members would be about the same size as the HDPE boards.

(3) a top outer layer of elongated wood or laminated wood members; a core construction of a grating of fiberglass reinforced thermosetting plastic material, and a lower outer layer of elongated wood or laminated wood members. The wood members would have a size of about 2 inches×8 inches by 8 feet. The grating would be 2 inches thick and have openings of 2×2 inches and would be sized to match the mat, i.e., 8 feet×12, 14 or 16 feet long, or segments representing portions of the mat can be used (e.g., a 3, 4 or 4.5 foot long section of an 8 foot wide mat with 4 sections used in the mat).

The present invention provides unexpected benefits over the art in that the outer layer(s) can provide resistance to abrasion and abuse of the construction core structure while the core structure is resistant to moisture, water or even certain chemicals encountered from the surrounding environment. This enables the core structure to provide a much longer service life than when conventional wood components are used since the core structure is resistant to rotting or other chemical degradation that would otherwise affect wood components of the core. Finally, to the extent that any of the components of the upper or lower outer layers are damaged, they can be replaced so that a new mat can be made with the reuse of all of the core.

FIGS. 24 to 27 illustrate another crane mat 1600 in accordance with the present invention. For this embodiment, the crane that includes internal beams made of softwood such as pine timbers to reduce the overall cost of the mat. As these timbers are not as abrasion and abuse resistance as other materials or components, they are protected on all sides by one or more different mat components. In the simplest construction, the adjacent pine timbers can be assembled into the core of the mat and protected on either longitudinal side with oak beams. The pine timbers would also be configured to be shorter than the longitudinal oak beams with the upper and lower surfaces of the pine timbers protected by more durable elongated members. In a further embodiment, a steel or metal plate can be placed between each adjacent pine timbers as well as between the oak beams and the adjacent pine timbers to further strengthen the mat.

Figure 24:
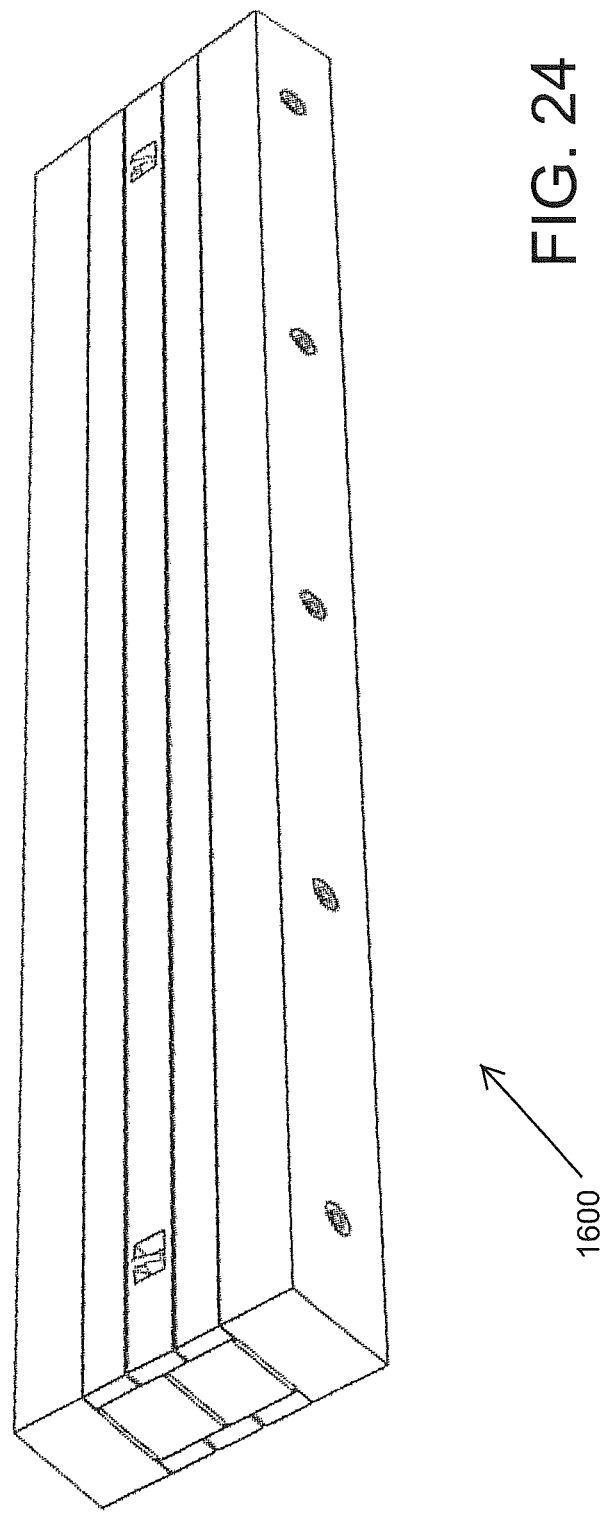
FIG. 24 is a perspective view of a crane mat having a core construction of pine timbers that are protected by oak beams and boards.

The plastic beams, timbers or bumper members disclosed herein can also be used in the same manner shown in FIG. 24 where the upper and lower boards are provided to protect the core timbers.

Figure 25:
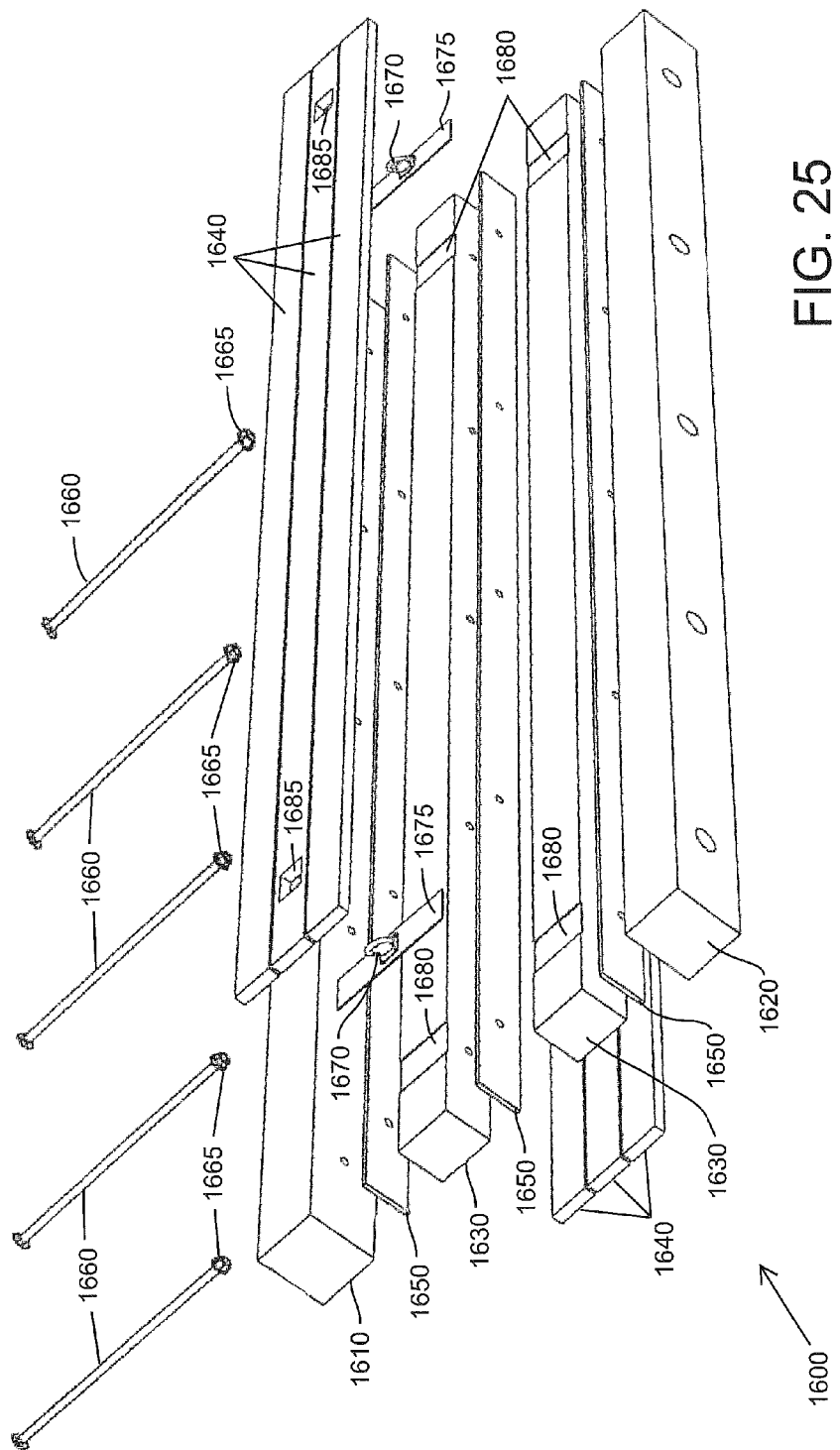
FIG. 25 is an exploded view of the crane mat of FIG. 24 to illustrate the various components of the mat.
Figure 26:
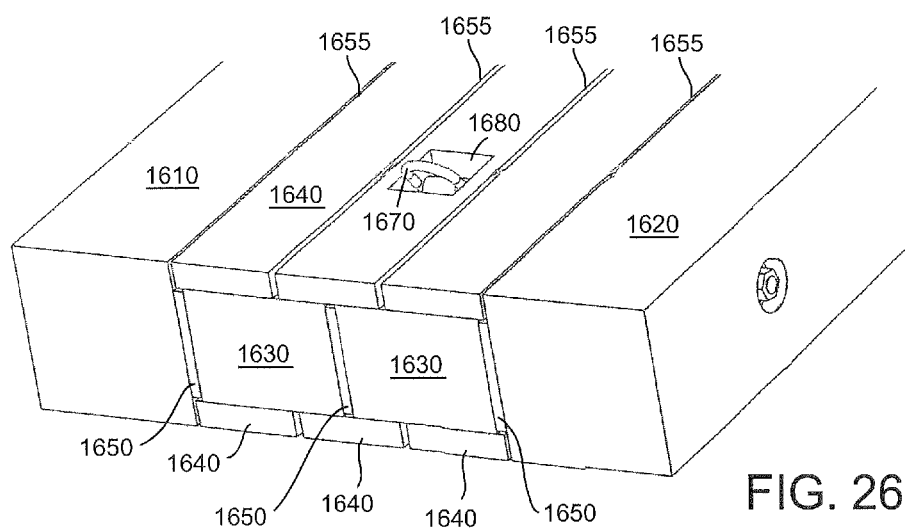
FIG. 26 is a partial perspective view of the end of the crane mat of FIG. 24.
Figure 27:
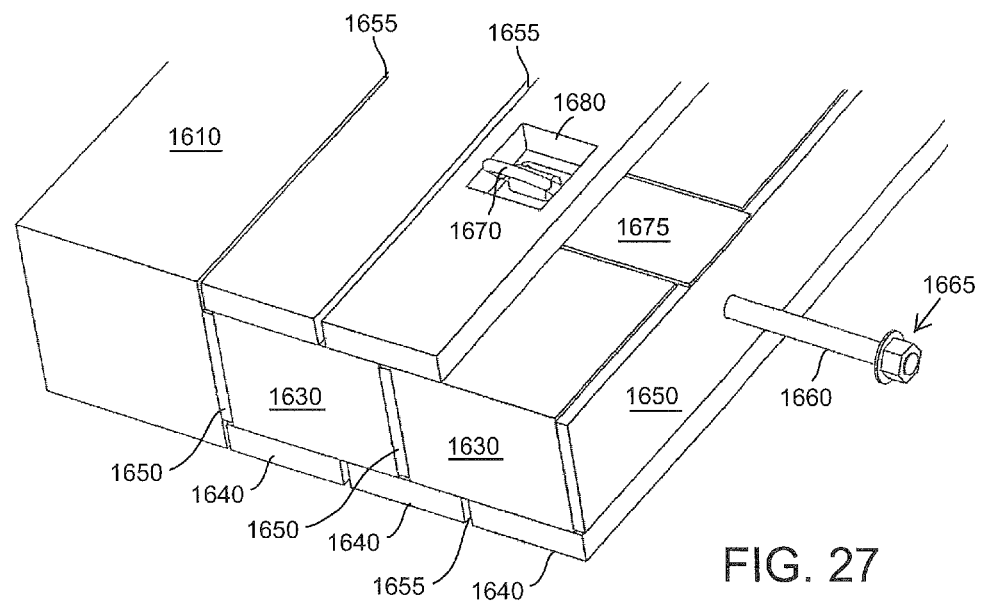
FIG. 27 is a partial perspective view of the end of the crane mat of FIG. 24 with certain out components removed to better illustrate the internal components of the mat.

All mat components and their arrangement in the mat are best illustrated in FIG. 25. This crane mat 1600 includes two side beams 1610, 1620 which are made of white oak and which have dimensions of about 12×12 inches and a length of approximately 16 feet. The core of the mat is made primarily of three pine timbers, each labeled 1630, which have dimensions of approximately 12 inches wide and 8 inches high. The pine timbers are located adjacent the center of the height of the side beams such the side beams extend approximately 1 to 2 inches above and 1 to 2 inches below the pine timbers. To prepare uniformly flat upper and lower surfaces of the mat, boards 1640, each of which is approximately 2 inches thick, 8 inches wide and 16 inches long, are provided above and below the pine timbers as shown. The boards can be made of wood, engineered lumber, plastic or recycle materials. The oak beams and boards thus protect the pine timbers from abuse while reducing the cost of the mat due to the substitution of the pine timbers for oak timbers. And when these boards are spaced apart, channels 1655 are formed between them which allow water to drawing from the mat during use.

And although the pine timbers are exposed at the forward in rearward ends of the mat, these are not usually subjected to great abuse. Additionally, if desired, bumper members can be provided on the forward and rearward word ends of the mat to provide further protection.

Another embodiment of the invention that is shown in FIG. 25 is the use of rectangular steel plates 1650 that are approximately ⅜ of an inch thick and have dimensions of 12 inches high and 16 feet long. Four plates are shown, one between each beam and timber, to provide additional strength to the mat. While these plates are shown as being the same height as the side beams, alternative embodiments utilize plates that are 1 to 2 inches shorter than the side beams of the mat. When such shorter plates are used, the upper and lower surfaces of the mat are thus provided with channels that allow water to drain from the mat during use. The plates can be of the same height and length as the pine timbers, or they can be 1 to 2 inches shorter than those timbers. The shorter steel plates reduce the overall weight of the mat compared to larger steel plates while still providing additional ruggedness to the mat.

The side beams, pine timbers and plates are joined together by bolting 1660 which extends across the width of the mat. A number of bolts are used spaced every 3 to 6 feet of length of the mat. The bolts pass through each of the beams, plates and timbers and are secured in placed by a washer and nut arrangement 1665. The upper and lower boards 1640 are either nailed or bolted to the pine timbers.

To facilitate lifting of the mats, a new lifting element arrangement is provided. This arrangement includes a D-shaped ring 1670 that is pivotally attached to a steel plate 1675 that is welded to the steel plates 1650 that are present on the outer sides of the pine timbers 1630 and as well as in between the pine timbers. The plate is accommodated in the pine timbers by a formed slot 1680 into which the plate can be seated. Also, the lifting element plate 1675 would be welded at its ends to two or three of the longitudinal reinforcement plates 1650 to provide a very secure connection that will would allow overhead lifting of the mat for installation or removal as well as to facilitate loading or unloading of the mats on a truck or train bed. And the D-shaped ring is provided in an opening 1685 in the center board in such a way that when not used to lift the mat, the D-shaped ring lies flat in the opening so as to not hinder movement of personnel over the mat. And while the two lifting elements are shown on the upper surface of the mat, it is desirable to also provide the same arrangement on the lower surface of the mat. Furthermore, the number and precise location of the lifting elements is not critical but can be selected by a skilled artisan depending upon the overall size and weight of the mat.

Although the mats are provided with different internal core constructions, in many situations, the outer surface of the mats are very similar in appearance, such that it is not readily observable as to which mat has a particular internal construction. For this reason, another aspect of the invention relates to the providing of each mat with identification means that indicates the core or internal construction of the mat. Thus, when a number of different mats are maintained in an inventory, the identification means enables operators to readily determine which mats have a certain core or internal constructions of wood, engineered wood, thermoplastics, elastomers, thermosetting plastics, metal, or of coated or encapsulated components, so that the correct mats can be selected and provided to a jobsite for use by the customer. This would be necessary whether the mats are being purchased by the customer or whether the mats are being leased for use. There are a number of ways to identify the different core or internal construction of a mat depending upon the specific type of identification means that are applied to the mat. The preferred types of identification means include an external color code, a radio frequency identification (RFID) tag, or an alphanumeric indicator applied to an outer surface of the mat or that is provided upon a plate that is applied to an outer surface of the mat.

The easiest identification means to use is an external color code that is placed upon the mat, preferably in an area that does not receive much abrasion or wear. Different colors or strips or color combinations can be used to identify the different core constructions of the mat. And it is highly useful to apply the color code to the same relative positions on each mat for easy identification. For example, placing the external color code along a longitudinal side of each mat allows the color coding to be visible when the mats are stacked upon each other. This simple visual confirmation can be used to make sure that the proper mats are selected: even when the mats are just stacked in the work yard, one can see which ones have the correct color code for the desired core construction.

Another use of color can be to identify mats for a particular customer. This would assist in making sure that the mats are properly collected and delivered. This color can be an additional color beyond that which is used to identify the mat core, or the mats can have a single unique color or color pattern (e.g., stripes, dots etc.) that identifies both the customer and the mat core. And further, the color can be provided in a particular location or area to confirm who the customer is to assist in quality control regarding the correct shipping and delivery of the mats.

Another type of identification means comprises a RFID tag that is attached to the mat and that can be scanned to identify the core or internal construction of the mat. One example of such a tag is seen in FIG. 17. This tag can be read by a scanner so that the mat core construction can be identified prior to shipping of the mat to the customer.

A simpler type of identification means is one that comprises an external alphanumeric indicator that is applied to an outer surface of the mat or that is provided upon a plate that is applied to an outer surface of the mat. These can be carved, burnished or stamped into or onto the mat again is a location that is not expected to experience severe abrasion or wear. This can also be used to identify a particular customer.

And as noted herein, in addition to the mat identification means, each mat can further be provided with a surface color that indicates a potential use or non-use of the mat. This can assist in allowing personnel to properly operate on the mat and to promote safety. These colors can include, for example, red to indicate that portions of the mat need to be kept free of equipment, yellow for indicating that caution is needed, green to indicate portions of the mat that are designed to accommodate travel or movement by trucks or heavy equipment over the mat.

It is also possible to include in the paints or coatings additives that can facilitate movement upon the mat, such as fine particles or grit that can impart slip resistance, or greater sized particles of materials that can provide bumps similar to a rumble strip that would indicate to a moving vehicle that it is approaching the end of the mat. And the different sized particles can be provided in different colored paints or coatings.

Of course other colors can be used in any of the foregoing embodiments according to a particular code or correspondence of each color to a specific use or prohibited use. These colors can be tailored to the mat user's particular requirements so that work operations upon or around the mats can be optimized for safety, efficiency and expediency. Coloring can also be used to define certain areas of the worksite or to help the mats blend into surrounding areas, so that the jobsite can look as clean and undisturbed as possible. For these reasons to use of conventional paints and other surface coatings enhance the usefulness of the mats for any particular application.

Therefore, in sum, it is to be realized that the optimum dimensional relationships for the parts of the invention can include variations and tolerances in size, materials, shape, form, function and use are deemed readily apparent and obvious to the skilled artisan, and all equivalent relationships to those illustrated in the drawings and described in the specification are intended to be encompassed by the claims appended hereto.

Unless defined otherwise, all technical and scientific terms used herein have same meaning as commonly understood by one of ordinary skill in the art to which this invention belongs. Also, as used herein and in the appended claims, the singular form "a", "and", and "the" include plural referents unless the context clearly dictates otherwise. All technical and scientific terms used herein have the same meaning.

The foregoing detailed description is considered as illustrative only of the principles of the invention. Further, since numerous modifications and changes will readily be apparent to those having ordinary skill in the art, it is not desired to limit the invention to the exact constructions demonstrated. Accordingly, all suitable modifications and equivalents may be resorted to falling within the scope of the invention.

What is claimed is:

1. An industrial mat comprising:
    a core structure having a height, width and length, the core structure comprising elongated members configured, arranged and positioned to form a mat having upper and lower surfaces, front and rear ends and outer sides;
    first and second beams or bumper members having a height, width and length with top and bottom surfaces and inner and outer sides, with the inner side of the first beam or bumper member positioned adjacent an outer side of the mat and the inner side of the second beam or bumper member positioned adjacent the other outer side of the mat, and with the beams or bumper members having sufficient properties to absorb impact and shock to protect the core structure from damage due to impact during transport or installation of the mat; and
    a plurality of fasteners that attach the beams or bumper members to the core structure;
    wherein the first and second beams or bumper members are made of a thermoplastic, thermosetting plastic, or elastomeric material in the form of a solid structure, a hollow structure that optionally includes a filler material therein, or layers of sheets or elongated members.

2. The mat of claim 1, wherein the first and second beams or bumper members each has a height that is essentially the same as the height of the core structure, so that both the top and bottom surfaces of the beams or bumper members align respectively with both the top and bottom surfaces of the core structure to extend the upper and lower surfaces of the mat.

3. The mat of claim 1, wherein the first and second side beams or bumper members are made of a thermoplastic, thermosetting plastic, or elastomeric material in the form of a hollow structure that includes a filler material therein.

4. The mat of claim 1, wherein the first and second beams or bumper members are made of layers of sheets or elongated members that are joined together by additional fasteners, adhesives, welding, or any combination thereof.

5. The mat of claim 1, wherein the beams or bumper members are made in plural sections to obtain its overall length and are attached to the core structure by the plurality of fasteners.

6. The mat of claim 1, further comprising beams or bumper members removably attached to the front and rear portions of the mat by additional fasteners.

7. The mat of claim 1, wherein the core structure comprises elongated members of wood, engineered wood, thermoplastics, thermosetting plastics or elastomers that are joined together by the plurality of fasteners or by additional fasteners, adhesives, welding, or any combination thereof.

8. The mat of claim 1, wherein one beam or bumper member is sized to provide about one half the height of the core structure and is attached to an upper portion of one outer side of the core structure, or the other beam or bumper member is sized to provide one half the height of the core structure and is attached to the opposite outer side of the core structure in a lower position, or both bumper members are sized as recited in this claim in order to facilitate and form an interlocked structure of conjoined adjacent mats.

9. The mat of claim 1, wherein the core structure comprises at least first and second longitudinal members which have top and bottom surfaces and inner and outer sides with the top and bottom surfaces of the longitudinal members forming upper and lower surfaces of the mat, the plurality of fasteners removably attach the beams or bumper members to the longitudinal members of the core structure so that the beams or bumper members can be replaced when damaged, the beams or bumper members have a generally rectangular or square cross-sectional configuration and are located in positions that align at least the top surfaces of the beams with the top surfaces of the core structure to extend the upper surface of the mat.

10. The mat of claim 9, wherein the core structure includes two or three longitudinal members are present in the mat and are made of oak or other hardwoods, pine or other softwoods, or mixtures thereof, and wherein the beams or bumper members are attached to the core structure by fasteners comprising joining rods that pass through the beams or bumper members and the longitudinal members of the core structure.

11. The mat of claim 10, further comprising a metal plate located between each pair of adjacent beams or longitudinal members, wherein each metal plate has a height and length which is essentially the same as that of the longitudinal members and beams or bumper members on each peripheral side of the metal plates.

12. The mat of claim 1, wherein the core structure comprises at least two layers or plies of elongated members with the uppermost layer or ply having a top surface that forms the top surface of the mat and the lowermost layer or ply having a bottom surface that forms the bottom surface of the mat; the plurality of fasteners removably attach the beams or bumper members to the core structure so that the beams or bumper members can be replaced when damaged; the beams or bumper members have a generally rectangular or square cross-sectional configuration, and each bumper member has a height that is essentially the same as that of the core structure so that the upper and lower surfaces of the bumper members continue the relatively flat upper and lower surfaces of the core structure.

13. The mat of claim 12, wherein the core structure comprises two or three layers or plies of elongated members of wood, engineered wood, plastics or elastomers which are joined together by a plurality of fasteners.

14. An industrial mat comprising:
    a core structure having a height, width and length, the core structure comprising elongated members configured, arranged and positioned to form a mat having upper and lower surfaces, front and rear ends and outer sides;
    first and second beams or bumper members having a height, width and length with top and bottom surfaces and inner and outer sides, with the inner side of the first beam or bumper member positioned adjacent an outer side of the mat and the inner side of the second beam or bumper member positioned adjacent the other outer side of the mat, and with the beams or bumper members having sufficient properties to absorb impact and shock to protect the core structure from damage due to impact during transport or installation of the mat; and
    a plurality of fasteners that removably attach the beams or bumper members to the core structure;
    wherein the first and second beams or bumper members have a generally rectangular or square cross-sectional configuration and are located in positions that align the top and bottom surfaces of the beams or bumper members with the top and bottom surfaces of the core structure respectively to extend the upper and lower surfaces of the mat;
    wherein the first and second beams or bumper members are made of a thermoplastic, thermosetting plastic, or elastomeric material in the form of a solid structure, a hollow structure that optionally includes a filler material therein, or layers of sheets or elongated members that are joined together; and wherein the core structure has a thickness of between 6 and 24 inches a length of between about 4 and 60 feet, and each beam or bumper member has width by height dimensions of between about 1×6 inches and about 24×24 inches and a length of between about 4 and 60 feet.

15. The mat of claim 14, wherein the core structure has a width of about 4 to 8 feet, a height of between 8 and 16 inches and a length of between about 6 and 30 feet and wherein the beams have width and height dimensions of between about 8×8 inches and about 16×16 inches and lengths of between about 6 and 30 feet.

16. An industrial mat comprising:
a core structure having a height, width and length and comprising elongated members;
external components including an upper layer of elongated members located above and attached to the core structure to form an upper surface for the mat and to protect the core structure, and a lower layer of elongated members located below and attached to the core structure to form a lower surface of the mat and to also protect the core structure;
first and second beams or bumper members having a height, width and length with top and bottom surfaces and inner and outer sides, with the inner side of the first beam or bumper member positioned adjacent an outer side of the mat and the inner side of the second beam or bumper member positioned adjacent the other outer side of the mat, and with the beams or bumper members having sufficient properties to absorb impact and shock to protect the core structure from damage due to impact during transport or installation of the mat; and
a plurality of fasteners that attach the beams or bumper members to the core structure;
wherein the first and second beams or bumper members are located in alignment with the core structure and upper and lower layers of elongated members so that the top and bottom surfaces of the beams or bumper members and elongated members form essentially flat upper and lower surfaces of the mat;
wherein the first and second beams or bumper members are made of a thermoplastic, thermosetting plastic, or elastomeric material in the form of a solid structure, a hollow structure that optionally includes a filler material therein, or layers of sheets or elongated members that are joined together.

17. The mat of claim 16, wherein the core structure comprises at least first and second longitudinal members, and the plurality of fasteners removably attach the beams or bumper members to the longitudinal members of the core structure so that the beams or bumper members can be replaced when damaged.

18. The mat of claim 16, wherein the core structure includes two or three longitudinal members are present in the mat and are made of oak or other hardwoods, pine or other softwoods, or mixtures thereof, and wherein the beams or bumper members are attached to the core structure by fasteners comprising joining rods that pass through the beams or bumper members and the longitudinal members of the core structure.

19. An industrial mat comprising:
a core construction that provides strength and rigidity to the mat made of a thermoplastic, thermosetting or elastomeric material or a mixture thereof that has top and bottom surfaces and a thickness sufficient to provide environmental resistance; and
an upper surface of the mat formed by a plurality of elongated members positioned above the core construction, a lower surface of the mat formed by a plurality of elongated members positioned below the encapsulated core construction, or both upper and lower surfaces;
wherein the elongated members of the upper and/or lower surfaces are arranged in spaced relation in at least one layer and are attached together or to the core construction for protecting the core construction from abrasion and impact during transport, installation and use of the industrial mat;
wherein the industrial mat has a load bearing capacity that is able to withstand a load of 600 to 1000 psi without permanent deformation.

20. The mat of claim 19, wherein the core construction comprises: (a) at least one layer or ply of a thermoplastic material in the form of a sheet member that optionally includes open or closed cells therein or therethrough, (b) a plurality of adjacently arranged elongated members of a thermoplastic, thermosetting or elastomeric material, or (c) a thermosetting plastic support structure in the form of a plate, beam, grid, grating, ladder or pultruded tubes, or (d) a metal support structure in the form of beams that are welded together to form a frame or ladder structure, or a plate that optionally contains apertures therein, or (e) at least two layers or plies of elongated, sheet, plate, beam, grid, grating, ladder or tube members wherein the layers or plies are fastened or joined together.

21. An industrial mat comprising:
a core structure having a height, width and length and comprising a plurality of longitudinal members;
external components including an upper layer of elongated members located above and attached to the core structure to form an upper surface for the mat and to protect the core structure, and a lower layer of elongated members located below and attached to the core structure to form a lower surface of the mat and to also protect the core structure;
a metal plate located between each pair of adjacent longitudinal members, with the metal plates having a height and length which is essentially the same as that of the adjacent longitudinal members; and
a plurality of fasteners that attach the elongated members to the core structure;
wherein the longitudinal members of the core structure are made of pine or other softwoods and wherein the elongated members are made of wood, engineered wood, or a thermoplastic, thermosetting plastic, or elastomeric material.

22. The mat of claim 21 wherein the core structure includes at least 3 longitudinal members and the upper and lower layers of elongated members are made of oak or other hardwoods.

23. The mat of claim 22, wherein the core structure further comprises a metal frame comprising metal longitudinal members that contain the other longitudinal members and metal plates of the core therein, and the mat further comprises lifting elements for moving or positioning the mat.

24. The mat of claim 23, further comprising a longitudinal beam or bumper member positioned adjacent each metal longitudinal member of the metal frame, wherein the fasteners include bolting or joining rods that pass through the beams or bumper members as well as the longitudinal members of the metal frame and the longitudinal members and metal plates of the core structure for joining the structure together.

25. A mat having substantially flat top and bottom surfaces and comprising:
- first and second side beams having top, side, and bottom surfaces;
- a non-wood support structure located between and connecting the first and second side beams, with the support structure having side portions, a height that is less than that of the side beams, a width and a length, with the support structure comprising first and second longitudinal members that are joined together to form a frame;
- a plurality of joining rods that attach the side beams to the support structure, with the joining rods passing through the sides of the beams and support structure; and
- a first plurality of elongated members attached to the upper portion of the support structure;
- wherein the top surface of the mat is formed by the top surfaces of the beams and the first plurality of elongated members.

26. The mat of claim 25 further comprising a second plurality of elongated members attached to the lower portion of the support structure; wherein the bottom surface of the mat is formed by the bottom surfaces of one or both of the beams and the second plurality of elongated members.

27. The mat of claim 25 wherein the first and second longitudinal members are a flat plate, an I-beam, or a rectangular or C-shaped beam; the side beams are made of solid cut wood, engineered lumber or a thermoplastic, thermosetting plastic or elastomeric material; the plurality of elongated members are boards made of solid cut wood, engineered lumber or a thermoplastic, thermosetting plastic or elastomeric material; and the first plurality of elongated members have substantially the same thickness.

28. The mat of claim 25 further comprising a core of wood members that provide greater weight, compressive strength or ruggedness to the mat, wherein the core of wood members are configured to fit within the support structure.

29. The mat of claim 28 wherein the joining rods comprise bolts that pass through the side beams and support core, and further comprising lifting elements for moving or positioning the mat.

30. The mat of claim 23 further comprising steel plates provided in the support core between adjacent wood members.

31. The mat of claim 26, wherein the elongated members of the upper and/or lower surfaces are made of wood, engineered wood, plastic, elastomeric or recycled materials, either in the form of a sheet, plate, boards or layers.

32. The mat of claim 19, wherein the elongated members of the upper and/or lower surfaces are made of wood, engineered wood, plastic, elastomeric or recycled materials, either in the form of a sheet, plate, boards or layers.

33. The mat of claim 1, wherein the elongated members of the upper and/or lower surfaces are made of wood, engineered wood, plastic, elastomeric or recycled materials, either in the form of a sheet, plate, boards or layers.

* * * * *

UNITED STATES PATENT AND TRADEMARK OFFICE
CERTIFICATE OF CORRECTION

Page 1 of 1

PATENT NO.         : 9,663,903 B2
APPLICATION NO.    : 15/188113
DATED              : May 30, 2017
INVENTOR(S)        : Penland, Jr.

It is certified that error appears in the above-identified patent and that said Letters Patent is hereby corrected as shown below:

On the Title Page

Item (63) Related U.S. Application Data, before "of application No. 15/155,685," delete "Continuation" and insert -- Continuation-in-part --.

Page 3, Item (56) References Cited, OTHER PUBLICATIONS, after "International Search Report and Written Opinion, Appl. No. PCT/", delete "US20161020067," and insert -- US2016/0020067, --.

Signed and Sealed this
Eleventh Day of July, 2017

Joseph Matal
*Performing the Functions and Duties of the
Under Secretary of Commerce for Intellectual Property and
Director of the United States Patent and Trademark Office*